United States Patent
Cuny et al.

(10) Patent No.: US 12,516,055 B2
(45) Date of Patent: Jan. 6, 2026

(54) PROTEIN KINASE INHIBITORS AND USES THEREOF FOR THE TREATMENT OF DISEASES AND CONDITIONS

(71) Applicants: University of Houston System, Houston, TX (US); Trustees of Tufts College, Medford, MA (US); Institute for Cancer Research, Philadelphia, PA (US)

(72) Inventors: Gregory Cuny, Houston, TX (US); Alexei Degterev, Brookline, MA (US); Sameer Nikhar, Nashville, TN (US); Siddharth Balachandran, Elkins Park, PA (US)

(73) Assignees: Trustees of Tufts College, Medford, MA (US); University of Houston System, Houston, TX (US); Institute for Cancer Research, Philadelphia, PA (US)

( * ) Notice: Subject to any disclaimer, the term of this patent is extended or adjusted under 35 U.S.C. 154(b) by 972 days.

(21) Appl. No.: 17/595,406

(22) PCT Filed: May 14, 2020

(86) PCT No.: PCT/US2020/032784
§ 371 (c)(1),
(2) Date: Nov. 16, 2021

(87) PCT Pub. No.: WO2020/232190
PCT Pub. Date: Nov. 19, 2020

(65) Prior Publication Data
US 2022/0194937 A1 Jun. 23, 2022

Related U.S. Application Data

(60) Provisional application No. 62/848,648, filed on May 16, 2019, provisional application No. 62/848,719, filed on May 16, 2019.

(51) Int. Cl.
A61K 31/4375 (2006.01)
A61K 31/519 (2006.01)
A61P 25/28 (2006.01)
A61P 29/00 (2006.01)
A61P 31/16 (2006.01)
C07D 471/04 (2006.01)

(52) U.S. Cl.
CPC ................. C07D 471/04 (2013.01)

(58) Field of Classification Search
CPC  C07D 471/05; A61K 31/4375; A61K 31/519; A61P 25/28; A61P 29/00; A61P 31/16
See application file for complete search history.

(56) References Cited

FOREIGN PATENT DOCUMENTS

| WO | 199634867 A1 | 11/1996 |
|---|---|---|
| WO | 199909030 A1 | 2/1999 |
| WO | 200155148 A1 | 8/2001 |
| WO | 2014031571 A1 | 2/2014 |
| WO | 2015179436 A1 | 11/2015 |
| WO | 2018213219 A1 | 11/2018 |

OTHER PUBLICATIONS

Aaes, Tania Løve, et al. "Vaccination with necroptotic cancer cells induces efficient anti-tumor immunity." Cell reports 15.2 (2016): 274-287.
Arrazola, Macarena S., and Felipe A. Court. "Compartmentalized necroptosis activation in excitotoxicity-induced axonal degeneration: a novel mechanism implicated in neurodegenerative disease pathology." Neural Regeneration Research 14.8 (2019): 1385.
Arrazola, Macarena S., et al. "Axonal degeneration is mediated by necroptosis activation." Journal of Neuroscience 39.20 (2019): 3832-3844.
Cougnoux, A., et al. "Necroptosis in Niemann-Pick disease, type C1: a potential therapeutic target." Cell death & disease 7.3 (2016): e2147-e2147.
Duprez, Linde, et al. "RIP kinase-dependent necrosis drives lethal systemic inflammatory response syndrome." Immunity 35.6 (2011): 908-918.
Kearney, Conor J., and Seamus J. Martin. "An inflammatory perspective on necroptosis." Molecular cell 65.6 (2017): 965-973.
Li, Jixi, et al. "The RIP1/RIP3 necrosome forms a functional amyloid signaling complex required for programmed necrosis." Cell 150.2 (2012): 339-350.
Lin, Juan, et al. "A role of RIP3-mediated macrophage necrosis in atherosclerosis development." Cell reports 3.1 (2013): 200-210.
Linkermann, A., et al. "Necroptosis in immunity and ischemia-reperfusion injury." American journal of transplantation 13.11 (2013): 2797-2804.

(Continued)

Primary Examiner — Bruck Kifle
(74) Attorney, Agent, or Firm — Quarles & Brady LLP

(57) ABSTRACT

Identified compounds demonstrate protein kinase inhibitory activity. More specifically, the compounds are demonstrated to inhibit receptor interacting kinase 2 (RIPK2) and/or Activin-like kinase 2 (ALK2) and/or receptor interacting kinase 3 (RIPK3). Compounds that are either dual RIPK2/ALK2 inhibitors or that preferentially inhibit RIPK2 or ALK2 or RIPK3 could provide therapeutic benefit. Compounds that function as RIPK3 inhibitors provide therapeutic benefit in the treatment of inflammatory and degenerative conditions.

13 Claims, 31 Drawing Sheets

(56) References Cited

OTHER PUBLICATIONS

Mandal, Pratyusha, et al. "RIP3 induces apoptosis independent of pronecrotic kinase activity." Molecular cell 56.4 (2014): 481-495.
Meng, Lingjun, et al. "RIP3-dependent necrosis induced inflammation exacerbates atherosclerosis." Biochemical and Biophysical Research Communications 473.2 (2016): 497-502.
Meng, Lingjun, Wei Jin, and Xiaodong Wang. "RIP3-mediated necrotic cell death accelerates systematic inflammation and mortality." Proceedings of the National Academy of Sciences 112.35 (2015): 11007-11012.
Moquin, David M., Thomas McQuade, and Francis Ka-Ming Chan. "CYLD deubiquitinates RIP1 in the TNFα-induced necrosome to facilitate kinase activation and programmed necrosis." PloS one 8.10 (2013): e76841.
Moriwaki, Kenta, and Francis KM Chan. "Necrosis-dependent and independent signaling of the RIP kinases in inflammation." Cytokine & growth factor reviews 25.2 (2014): 167-174.
Moriwaki, Kenta, and Francis Ka-Ming Chan. "RIP3: a molecular switch for necrosis and inflammation." Genes & development 27.15 (2013): 1640-1649.
Najjar, Malek, et al. "RIPK1 and RIPK3 kinases promote cell-death-independent inflammation by Toll-like receptor 4." Immunity 45.1 (2016): 46-59.
Newton, K., et al. "RIPK3 deficiency or catalytically inactive RIPK1 provides greater benefit than MLKL deficiency in mouse models of inflammation and tissue injury." Cell Death & Differentiation 23.9 (2016): 1565-1576.
Nogusa, Shoko, et al. "RIPK3 activates parallel pathways of MLKL-driven necroptosis and FADD-mediated apoptosis to protect against influenza A virus." Cell host & microbe 20.1 (2016): 13-24.
Ofengeim, Dimitry, et al. "Activation of necroptosis in multiple sclerosis." Cell reports 10.11 (2015): 1836-1849.
Pasparakis, Manolis, and Peter Vandenabeele. "Necroptosis and its role in inflammation." Nature 517.7534 (2015): 311-320.
Rodrigue-Gervais, Ian Gaël, et al. "Cellular inhibitor of apoptosis protein cIAP2 protects against pulmonary tissue necrosis during influenza virus infection to promote host survival." Cell host & microbe 15.1 (2014): 23-35.
Saleh, Danish, et al. "Kinase activities of RIPK1 and RIPK3 can direct IFN-β synthesis induced by lipopolysaccharide." The Journal of Immunology 198.11 (2017): 4435-4447.
Sarhan, Joseph, et al. "Constitutive interferon signaling maintains critical threshold of MLKL expression to license necroptosis." Cell Death & Differentiation 26.2 (2019): 332-347.
Silke, John, James A. Rickard, and Motti Gerlic. "The diverse role of RIP kinases in necroptosis and inflammation." Nature immunology 16.7 (2015): 689-697.
Vanden Berghe, Tom, Behrouz Hassannia, and Peter Vandenabeele. "An outline of necrosome triggers." Cellular and Molecular Life Sciences 73 (2016): 2137-2152.
Vitner, Einat B., et al. "RIPK3 as a potential therapeutic target for Gaucher's disease." Nature medicine 20.2 (2014): 204-208.
Mantis, Katerina, et al. "NEMO prevents RIP kinase 1-mediated epithelial cell death and chronic intestinal inflammation by NF-κB-dependent and-independent functions." Immunity 44.3 (2016): 553-567.
Yuan, Junying, Palak Amin, and Dimitry Ofengeim. "Necroptosis and RIPK1-mediated neuroinflammation in CNS diseases." Nature Reviews Neuroscience 20.1 (2019): 19-33.
Zhang, Jing, et al. "Necrosome core machinery: MLKL." Cellular and Molecular Life Sciences 73 (2016): 2153-2163.
Zhao, H., et al. "Role of necroptosis in the pathogenesis of solid organ injury." Cell death & disease 6.11 (2015): e1975-e1975.
International Search Report received in PCT/US2020/032784; received on Jul. 1, 2020.
Gautam, Avishekh, et al. "Necroptosis blockade prevents lung injury in severe influenza." Nature 628.8009 (2024): 835-843.

UH15-4: R2 = Et
UH 15-6: R2 = Et-O-Me
UH 15-10: R2 = iBu

UH15-4: R2 = Et
UH 15-6: R2 = Et-O-Me
UH 15-10: R2 = iBu

UH 15-18: X = F
UH 15-20: X = Me

| Compd | R1 (a-d) | R2 (a-d) |
|---|---|---|
| UH15PN1 | 2-Cl | 4-O(CH2)2NEt2 |
| UH15PN2 | 2-Cl | 3-SO2Me |
| UH15PN3 | 4-OH | 3-SO2Me |
| UH15PN6 | 3-pyridine | 3-SO2Me |

PROTEIN KINASE INHIBITORS AND USES THEREOF FOR THE TREATMENT OF DISEASES AND CONDITIONS

BACKGROUND

This application represents the U.S. national stage entry of International Patent Application Serial No. PCT/US2020/032784, filed May 14, 2020, which claims priority to U.S. Provisional Patent Application Ser. No. 62/848,648, entitled "Pyrido [2,3-d]pyrimidin-7-ones and Related Compounds as Inhibitors of RIPK3 to Treat Inflammatory and Degenerative Conditions," filed May 16, 2019, and to U.S. Provisional Patent Application Ser. No. 62/848,719, entitled "Protein Kinase Inhibitors and Uses Thereof for the Treatment of Diseases and Conditions," filed May 16, 2019, the contents of which are hereby incorporated by reference.

This invention was made with government support under grants CA190542 and AG058642 awarded by the National Institutes of Health. The government has certain rights in the invention.

BACKGROUND

This disclosure pertains to compounds that demonstrate protein kinase inhibitory activity. Protein kinases are important enzymes in cellular signal transduction. In many pathological conditions aberrant signal transduction occurs. Therefore, protein kinase inhibitors can be used as therapeutic agents for the treatment of various diseases.

Human auto-immune, auto-inflammatory and degenerative conditions involve a continuous loop of cell death and inflammation, leading to tissue injury and dysfunction. This is seen in progressive chronic diseases with inflammatory etiology, including atherosclerosis and TNF-driven pathologies such as rheumatoid arthritis and ulcerative colitis. This also occurs upon deleterious acute inflammatory responses, such as upon infection by influenza virus. Although treatments for some of these conditions exist, many inflammatory diseases remain poorly controlled and in significant need of new therapeutic strategies Influenza A virus (IAV) infections account for up to 700,000 hospitalizations and 50,000 annual deaths in the US alone. Worryingly, even though highly pathogenic H5 and H7 strains of avian IAV are thus far limited in their spread between humans, they require only a small number of mutations to become transmissible.

The lung epithelium is a primary site of mammalian Influenza A virus pathology. Influenza A virus (IAV) is a negative-sense RNA virus of the family Orthomyxoviridae. In aquatic birds, the primary IAV reservoir, virus replication occurs within the gastrointestinal tract and is typically asymptomatic. In contrast, mammalian IAV strains replicate in the respiratory tract and produce symptoms ranging from mild cases of 'the flu' to severe, sometimes lethal disease. IAV infects epithelial cells along the entire respiratory tract. Transmission is associated with infection of the upper tract, whereas severe disease is associated with infection in the lower lung, with the extent of lung involvement correlating with disease outcomes in humans and animal models.

As a lytic virus, IAV kills most lung cell types in which it replicates. But not all cell death by IAV is pathogenic. While programmed cell death is essential for early control of IAV replication and prevention of virus spread to the whole lung, the death of the lung epithelial layer is also one of the primary drivers of IAV infection-associated morbidity and mortality 10. In particular, the loss of Type I airway epithelial cells (AECs, which are essential for gas exchange) above a threshold of ~10% is strongly correlated with mortality in the mouse model of IAV infection. When cell death is well-controlled and apoptotic, it represents a host defense mechanism that limits both virus spread and immunopathology. But when cell death is uncontrolled or primarily necrotic (i.e., highly pro-inflammatory), it can lead to hyper-inflammatory responses, severe degradation of airway epithelia and consequent host mortality even if virus is cleared. Such severe pathology is observed in mouse models, where destruction of airway epithelia is a common feature of lethal IAV infection, and in humans, where death of distal pulmonary epithelia, marked by areas of bronchioalveolar necrosis, is a classic feature of IAV-induced Acute Respiratory Distress Syndrome (ARDS). Hence, the ideal treatment for IAV disease should encourage clearance-promoting death while inhibiting degradation-inducing inflammatory death, as well as of viral and secondary bacterial pneumonia.

Receptor-interacting protein kinase 3 (RIPK3) is a multi-functional protein involved in cell death pathways in various tissues. Prior work has demonstrated that loss of RIPK3 kinase activity provides a protection in a variety of animal models of inflammatory and degenerative conditions, including sepsis, brain trauma, acute kidney injuries, lung injury associated with influenza (JAY) infection, atherosclerosis, and many others. For example, RIPK3 was recently uncovered as a targetable signaling pathway that accounts for almost all IAV-activated pathogenic death in infected cells. This pathway is initiated when the host sensor protein DAI detects IAV genomic RNA and activates RIPK3 kinase. RIPK3 then triggers a form of cell death called necroptosis (or programmed necrosis), responsible for much of the lung injury seen during JAY infection. Fascinatingly, eliminating necroptosis not only drastically reduces lung damage and improves animal survival, but does so without impeding virus clearance. This is because RIPK3 also activates a parallel pathway of non-pathogenic cell death (apoptosis) that mediates virus clearance. As only necroptosis, and not apoptosis, relies on RIPK3 kinase activity, inhibitors of RIPK3 kinase function will be expected to ameliorate necrotic lung injury without affecting virus clearance, and potentially represent an entirely new strategy for treatment of JAY disease. Similarly, two separate studies showed that animals deficient in Ripk3 gene show resistance in the development of atherosclerosis due to the inhibition of macrophage cell death and systemic inflammation.

No selective RIPK3 kinase inhibitors are in clinical use or have been advanced into clinical trials. In 2014, a panel of RIPK3-selective inhibitors was reported, but these compounds displayed only modest activity in cells, and, unfortunately, induced an unanticipated conformational change in the structure of RIPK3 that resulted in toxicity. As current vaccines and antiviral strategies are either limited in their efficacy or susceptible to viral resistance and evasion, identifying new therapeutic entry-points for seasonal and virulent JAY pulmonary disease, preferably those that target pathogenic, host signaling pathways, is an urgent imperative. Clinically-viable inhibitors of RIPK3 kinase activity are a major unmet need.

SUMMARY

The present disclosure relates generally to compounds that demonstrate inhibitory activity of receptor interacting kinase 2 (RIPK2) inhibitory activity and/or Activin-like kinase 2 (ALK2) and/or receptor interacting kinase 3 (RIPK3).

RIPK2 mediates pro-inflammatory signaling and is an emerging therapeutic target in autoimmune and inflammatory diseases, such as inflammatory bowel disease (IBD) and multiple sclerosis. RIPK2 inhibitors could provide therapeutic benefit in the treatment of these and other conditions. Activin-like kinase 2 (ALK2) has been implicated in a number of diseases, such as bone disease (e.g. fibrodysplasia ossificans progressiva, ankylosing spondylitis), cardiovascular diseases (e.g. atherosclerosis and vascular calcification), some cancers (e.g. diffuse intrinsic pontine gliomas) and burns. Many of these maladies also have an inflammatory component that could exacerbate the condition and/or worsen the clinical outcome. Compounds that are either dual RIPK2/ALK2 inhibitors or that preferentially inhibit RIPK2 or ALK2 could provide therapeutic benefit in the treatment of these and other conditions.

The RIPK3 inhibitors potently and specifically inhibit RIPK3-driven necroptosis. These molecules are based on a pyrido[2,3-d]pyrimidine scaffold and target the ATP- and allosteric Glu-out pockets of RIPK3. This series is already ~10-fold more potent than previously reported RIPK3 inhibitor compounds at inhibiting necroptosis in cells. Importantly, compounds are identified that block necroptosis but do so without toxicity.

This disclosure describes a targetable signaling pathway that accounts for almost all IAV-activated pathogenic death in infected cells. This pathway is initiated when the host sensor protein DAI detects IAV genomic RNA and activates RIPK3 kinase. RIPK3 then triggers a form of cell death called necroptosis (or programmed necrosis), responsible for much of the lung injury seen during IAV infection. Fascinatingly, eliminating necroptosis not only drastically reduces lung damage and improves animal survival, but does so without impeding virus clearance. This is because RIPK3 also activates a parallel pathway of non-pathogenic cell death (apoptosis) that mediates virus clearance. As only necroptosis, and not apoptosis, relies on RIPK3 kinase activity, inhibitors of RIPK3 kinase function will ameliorate necrotic lung injury without affecting virus clearance, and represent an entirely new strategy for treatment of IAV disease.

RIPK3 is the central mediator of IAV-triggered epithelial cell death, or necroptosis. Necroptosis is activated by virus and microbial infections (including IAV), several innate-immune signaling pathways (most notably TNF, interferons, TLRs), certain pro-inflammatory stimuli (e.g., asbestos, oxidized LDL), and genotoxic stress. For decades, it was believed that the cell death accompanying acute infection by IAV was unspecified apoptosis, autophagy, or simply the passive, unprogrammed consequence of infection by a 'lytic' virus. These conclusions, however, were largely drawn from cell culture studies on transformed cell lines that were either grossly defective in cell death pathways (e.g., A549 cells) and/or irrelevant to IAV biology (e.g., HeLa, MDCK cells). In 2016, a cell death pathway was reported that is active in lung epithelial cells and that accounts for most cell death triggered by replicating IAV in these and other primary cell types. This pathway is initiated when the host protein DNA-dependent activator of interferon-regulatory factors (DAI) senses IAV genomic RNA and recruits RIPK3 kinase. RIPK3 then activates two distinct parallel arms of cell death: necroptosis and apoptosis. The necroptosis arm requires RIPK3 kinase activity and targets pseudokinase mixed lineage kinase domain-like (MLKL). The apoptosis arm requires FAS-associated protein with death domain (FADD) and caspase-8, and proceeds without need for the kinase activity of RIPK3. From within the necrosome, RIPK3 phosphorylates and activates MLKL, which then oligomerizes and traffics to the plasma membrane where it punches holes in the membrane, triggering cell swelling and lysis. Such necroptotic lysis of the cell causes the release of 'danger-associated molecular patterns' (DAMPs) into the extracellular space, and is considered highly inflammatory. In certain cases, such as upon IAV infection, RIPK3 can also activate a parallel pathway of apoptosis via caspase-8, which promotes viral clearance. Importantly, this pathway of apoptosis does not require the catalytic activity of RIPK3, and can actually be facilitated by RIPK3 kinase blockade.

FIG. 1 shows RIPK3-mediated cell death or nectroptosis pathways, including those activated by tumor necrosis factor (TNF) (left) and IAV (right). Collectively, this branched pathway is responsible for almost all cell death induced by replicating IAV. Most mammalian cell lines commonly used in IAV research (e.g., A549, HeLa, MDCK) do not express DAI, RIPK3 and/or MLKL, explaining why it went undiscovered for so long.

RIPK3 kinase blockade can prevent inflammatory pathology without affecting virus clearance. Mice deficient in the DAI-RIPK3 cell death pathway cannot control IAV spread in the lung and succumb to this virus, highlighting the importance of DAI-RIPK3 signaling in anti-IAV host defense. However, the necrotic branch downstream of RIPK3 is not only redundant for viral clearance, but actively promotes epithelial degradation and inflammation. Thus, it is believed that selectively blocking necroptosis downstream of RIPK3 will prevent pathology without affecting beneficial virus clearance, which will still proceed normally via caspase-8-mediated apoptosis. Excitingly, only RIPK3-mediated necroptosis, and not apoptosis, requires the kinase activity of RIPK3, and is therefore pharmacologically readily targetable by the use of RIPK3 kinase inhibitors. A clinically viable RIPK3 small-molecule inhibitor will represent a promising new therapeutic avenue for IAV-triggered necrotic death, epithelial degradation, inflammation, and consequent lung injury as seen in FIG. 1, right side.

RIPK3-mediated necroptosis potently amplifies inflammation in a variety of chronic conditions, including atherosclerosis and many TNF-associated pathologies, and underlies lung damage during acute IAV infection and ARDS. Moreover, RIPK3 can directly activate inflammatory gene expression independent of cell death, highlighting its centrality to host inflammatory processes. In agreement, genetic ablation of RIPK3 in mice ameliorated development of atherosclerotic plaques, almost-completely abolished TNF-triggered inflammatory shock, strongly reduced injury arising from chronically produced TNF, and eliminated IAV-induced necrotic lung damage without affecting virus clearance. In addition to the above mentioned examples, RIPK3 has been implicated in lipid and lysosomal storage diseases, such as Neiman-Pick and Gaucher disease, respectively. RIPK3 also has a pathogenic role in auto-immune diseases, including multiple sclerosis and lupus. Activity of RIPK3 has also been implicated in neurogeneration in different tissues and disease paradigms, indicating it to be a target for a broad range of neurodegenerative diseases. RIPK3 has also been found as a target in a broad range of ischemia-reperfusion injuries, such as stroke, myocardial infarction, kidney, retinal and liver ischemia and others The present disclosure relates to a new panel of RIPK3 inhibitors, which may be referred to as the UH15 series. These compounds are based on a pyrido[2,3-d]pyrimidine scaffold, structurally distinct from previous RIPK3 inhibitor molecules. Members of this series are ~10-fold more potent than other disclosed RIPK3 inhibitors at blocking necroptosis. Excitingly, the present UH15 compounds block RIPK3 without triggering apoptotic activity, and thus without the toxicity of other RIPK3 inhibitors. For most indications (e.g., TNF pathologies), blocking RIPK3 necroptosis without concurrently activating apoptosis is ideal. But for IAV, a RIPK3 inhibitor that can efficiently block necroptosis while concurrently potentiating apoptosis of infected cells will not only halt deleterious necrotic lung damage but will also accelerate eradication of virus. Of course, such induction of apoptosis must be limited to the infected cell (i.e., be stimulus-specific) or toxicity will ensue (as seen with the previous compounds).

In particular, the present RIPK3 inhibitors target RIPK3 necroptosis as a new therapeutic entry-point for IAV disease. Seasonal and pandemic strains of IAV trigger necrotic lung damage that underlies both ARDS and viral/bacterial pneumonia, each of which remain major causes of morbidity and mortality, with few effective therapeutic options. The ideal therapeutic for severe IAV disease is one that blocks RIPK3-dependent necroptosis but does not impede (or perhaps even simultaneously promotes) non-inflammatory virus clearance via RIPK3-dependent apoptosis.

In addition, the present disclosures support RIPK3 blockade as a fundamental new approach for acute and chronic inflammation. Evidence from genetic models demonstrates that RIPK3 is central to multiple inflammatory diseases, besides those seen during IAV infection. These include both acute and chronic inflammatory conditions known to be driven by TNF, such as colitis and rheumatoid arthritis. Moreover, RIPK3 is essential for all known pathways of necroptosis, while the allied kinase RIPK1 (currently the focus of efforts by others) only participates in a subset of necroptotic pathways, such as those activated by TNF (see FIG. 1, right). RIPK3 inhibitors thus will have benefit in a wider range of acute and chronic inflammatory conditions than serve as anti-TNF approaches or RIPK1 inhibitors.

DETAILED DESCRIPTION OF PREFERRED EMBODIMENTS

The present disclosure relates to protein kinase inhibitors and uses thereof.

The following figure depicts general structures of preferred embodiments of compounds that inhibit protein kinases, including receptor interacting kinase 2 (RIPK2), Activin-like kinase 2 (ALK2), and receptor interacting kinase 3 (RIPK3).

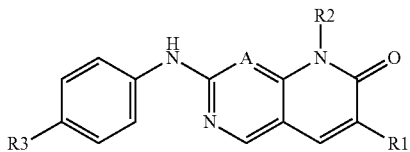

In the above structure, A can be N or CH. R1 can be Me,

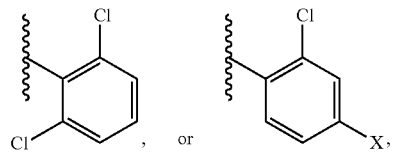

where X is F or Me, and where Me is methyl. R2 can be Me, Et, Et-O-Me, or isobutyl. R3 can be

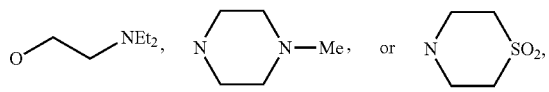

where Et is ethyl.

Figure 1:
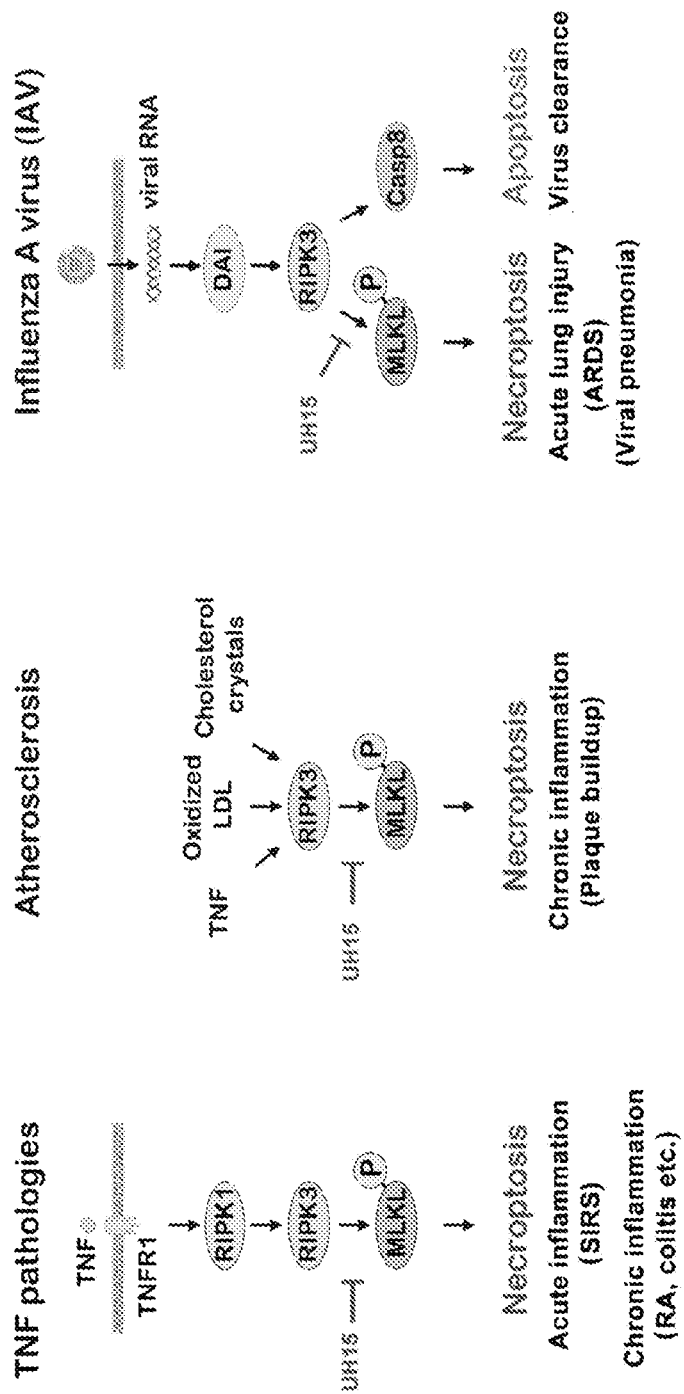
FIG. 1 shows diagrams of RIPK3-mediated cell death pathways activated by IAV (left) and TNF (right).
Figure 2:
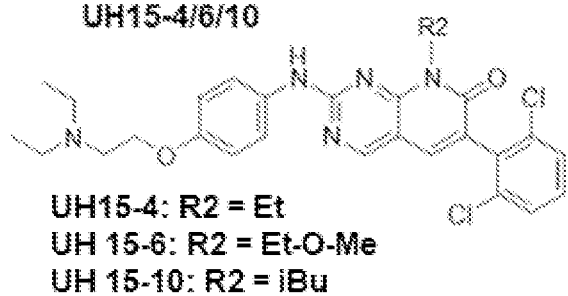
FIG. 2 shows structures of exemplary protein kinase inhibitors, identified as UH15 analogs.
Figure 2:
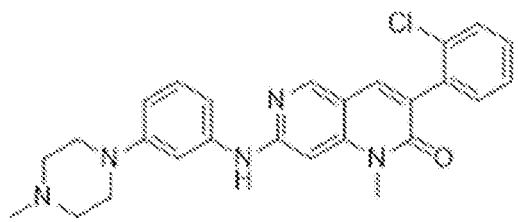
Figure 2:
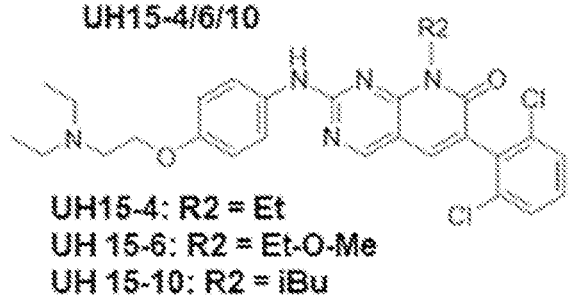
Figure 2:
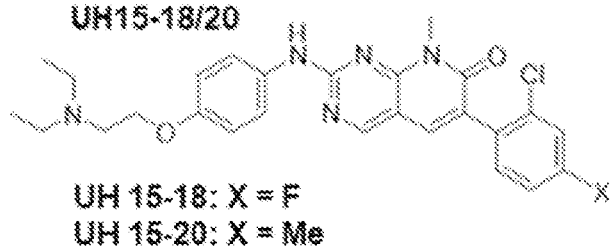

Additional preferred embodiments of compounds that inhibit RIPK2, ALK2, and RIPK3 are shown in FIG. 2.

Additional preferred embodiments of compounds that inhibit RIPK2, ALK2, and RIPK3 are shown below.

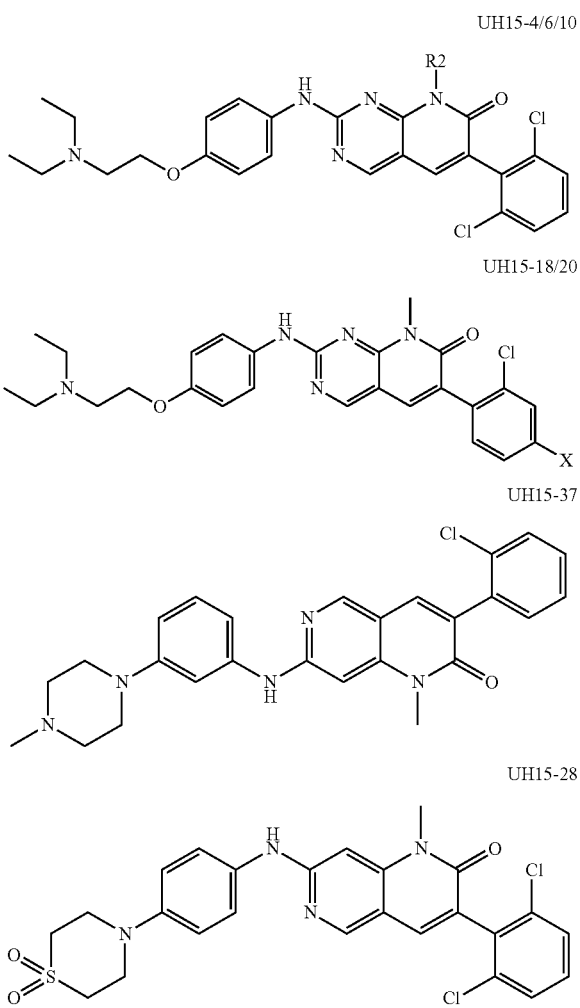

where R2 is Et (UH15-4), Et-O-Me (UH15-6), or isobutyl (UH15-10), and where X is F (UH15-18) or Me (UH15-20).

The following figure depicts general structures of additional preferred embodiments of compounds that inhibit RIPK3.

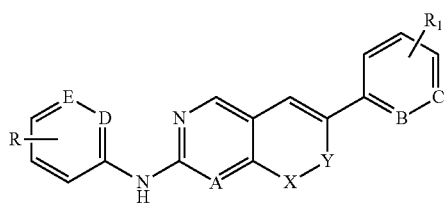

In the above structure, R can be H, or R can be a substituent on any one available position of the phenyl ring that is

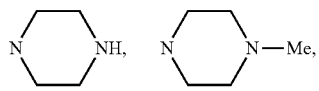 [SMILES: C1CNCCN1 ; CN1CCNCC1]

SO$_2$Me,

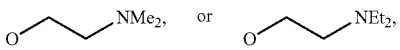

where Me is methyl and Et is ethyl. A and D can independently be N or CH. E can be N, CH, or C—R, with R defined as above. B and C can independently be N, CH, or C—Cl. R$_1$ can be H, or R$_1$ can be C—Cl, C—F, C—OCH$_3$, C—C(CH$_3$)$_3$, or C—OH at any one available position of the ring. X—Y can be C=C, or they can be

where R$_2$ is H, alkyl, including but not limited to methyl, ethyl or isobutyl, alkylhydroxyl, including but not limited to 2-hydroxyethyl, alkylalkoxyl, including but not limited to 2-methoxyethyl, or alkylaryl, including but not limited to benzyl or phenethyl.

The following figure depicts a general structure of additional preferred embodiments of compounds that inhibit RIPK3.

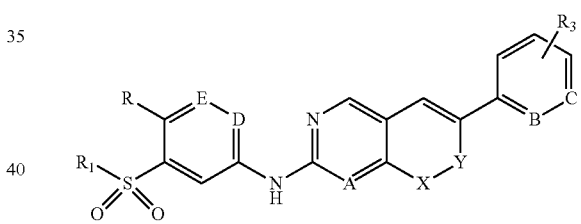

In the above structure, A and D can independently be N or CH. E can be N, CH, or C—R. B and C can independently be N, CH, or C—Cl. X—Y can be C=C, or they can be

where R$_2$ is H, alkyl, including but not limited to methyl, ethyl or isobutyl, alkylhydroxyl, including but not limited to 2-hydroxyethyl, alkylalkoxyl, including but not limited to 2-methoxyethyl, or alkylaryl, including but not limited to benzyl or phenethyl. R can be H,

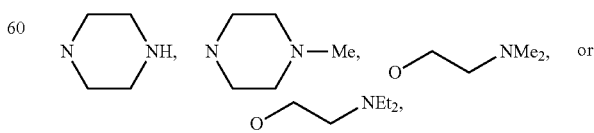

where Me is methyl and Et is ethyl. R$_1$ can be any alkyl group, including but not limited to methyl, ethyl, or propyl, or $R_1$ can be any aryl group, including but not limited to naphthyl, thienyl, indoyl, and the like. $R_3$ can be H, or $R_3$ can be C—Cl, C—F, C—OCH$_3$, C—C(CH$_3$)$_3$, or C—OH at any one available position of the ring.

Figure 3:
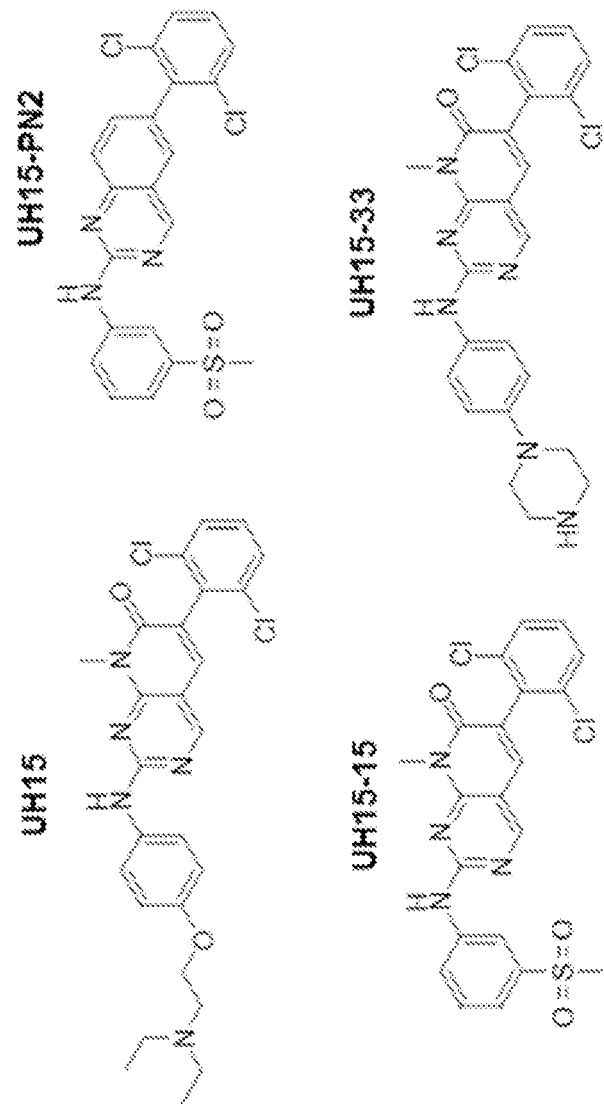
FIG. 3 shows structures of exemplary RIPK3 inhibitors.

Additional preferred embodiments of compounds that inhibit RIPK3 are shown in FIG. 3.

The exemplary compounds that inhibit protein kinases, including receptor interacting kinase 2 (RIPK2), Activin-like kinase 2 (ALK2), and receptor interacting kinase 3 (RIPK3), described herein may occur in different geometric and enantiomeric forms, and both pure forms and mixtures of these separate isomers are included in the scope of this invention, as well as any physiologically functional or pharmacologically acceptable salt derivatives or prodrugs thereof. Production of these alternate forms would be well within the capabilities of one skilled in the art.

The current invention also pertains to methods of prevention or therapy for inflammatory and degenerative conditions, including diseases involving protein kinase activity, such as Influenza A virus (IAV) infections and inflammatory conditions driven by TNF, including the step of administering a compound that inhibits protein kinase activity in accordance with preferred embodiments disclosed herein. In preferred embodiments, the methods of prevention or therapy for inflammatory or degenerative diseases involving protein kinase activity include the step of administering a compound that is a compound shown in FIG. 2 or in FIG. 3.

In another aspect of the present invention there is provided a pharmaceutical composition including a therapeutically effective amount of a compound that inhibits protein kinase activity as defined above and a pharmaceutically acceptable excipient, adjuvant, carrier, buffer or stabiliser. A "therapeutically effective amount" is to be understood as an amount of an exemplary protein kinase inhibitor compound that is sufficient to show inhibitory effects on protein kinase activity. The actual amount, rate and time-course of administration will depend on the nature and severity of the disease being treated. Prescription of treatment is within the responsibility of general practitioners and other medical doctors. The pharmaceutically acceptable excipient, adjuvant, carrier, buffer or stabiliser should be non-toxic and should not interfere with the efficacy of the active ingredient. The precise nature of the carrier or other material will depend on the route of administration, which may be oral, or by injection, such as cutaneous, subcutaneous, or intravenous injection, or by dry powder inhaler.

Pharmaceutical compositions for oral administration may be in tablet, capsule, powder or liquid form. A tablet may comprise a solid carrier or an adjuvant. Liquid pharmaceutical compositions generally comprise a liquid carrier such as water, petroleum, animal or vegetable oils, mineral oil or synthetic oil. Physiological saline solution, dextrose or other saccharide solution or glycols such as ethylene glycol, propylene glycol or polyethylene glycol may be included. A capsule may comprise a solid carrier such as gelatin. For intravenous, cutaneous or subcutaneous injection, the active ingredient will be in the form of a parenterally acceptable aqueous solution which is pyrogen-free and has a suitable pH, isotonicity and stability. Those of relevant skill in the art are well able to prepare suitable solutions using, for example, isotonic vehicles such as sodium chloride solution, Ringer's solution, or lactated Ringer's solution. Preservatives, stabilisers, buffers, antioxidants and/or other additives may be included as required.

In another aspect, there is provided the use in the manufacture of a medicament of a therapeutically effective amount of protein kinase inhibitor compound as defined above for administration to a subject.

The term "pharmacologically acceptable salt" used throughout the specification is to be taken as meaning any acid or base derived salt formed from hydrochloric, sulfuric, phosphoric, acetic, citric, oxalic, malonic, salicylic, malic, fumaric, succinic, ascorbic, maleic, methanesulfonic, isoethonic acids and the like, and potassium carbonate, sodium or potassium hydroxide, ammonia, triethylamine, triethanolamine and the like.

The term "prodrug" means a pharmacological substance that is administered in an inactive, or significantly less active, form. Once administered, the prodrug is metabolised in vivo into an active metabolite.

The term "therapeutically effective amount" means a nontoxic but sufficient amount of the drug to provide the desired therapeutic effect. The amount that is "effective" will vary from subject to subject, depending on the age and general condition of the individual, the particular concentration and composition being administered, and the like. Thus, it is not always possible to specify an exact effective amount. However, an appropriate effective amount in any individual case may be determined by one of ordinary skill in the art using routine experimentation. Furthermore, the effective amount is the concentration that is within a range sufficient to permit ready application of the formulation so as to deliver an amount of the drug that is within a therapeutically effective range.

Further aspects of the present invention will become apparent from the following description given by way of example only.

EXAMPLES

Example 1. Synthesis

Figure 4:
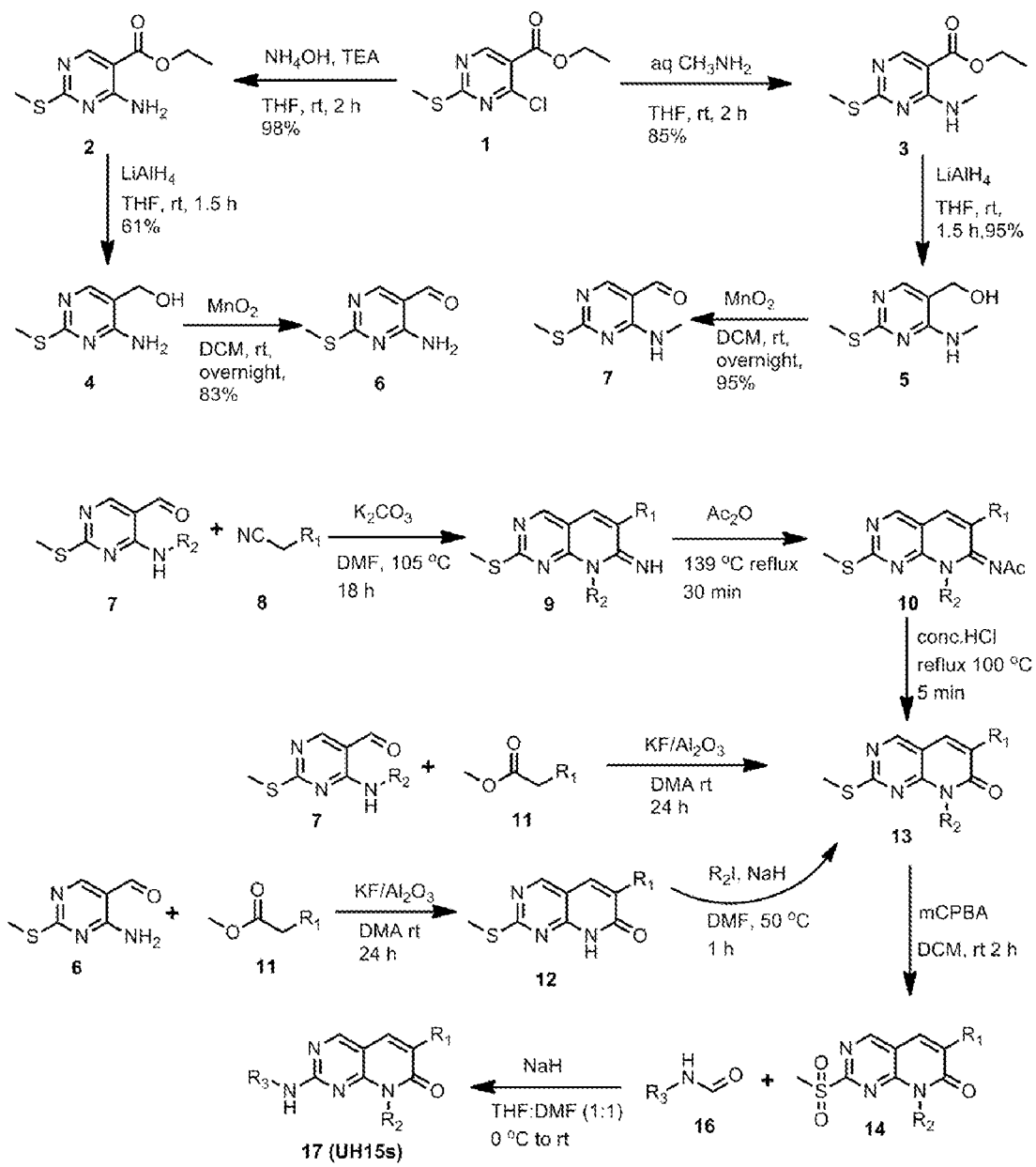
FIG. 4 shows a general overall synthetic scheme for exemplary preferred compounds disclosed herein as inhibitors of protein kinase activity, referred to generally as UH15 analogs, or UH15s.

FIG. 4 shows a general overall synthetic scheme for exemplary preferred compounds disclosed herein as inhibitors of protein kinase activity, referred to generally as UH15 analogs, or UH15s. Notably, in the discussion below, compounds may be referred to in the format of, for example, UH15-1 or UH15_1. These compounds have different structures. For example, UH15-15 is a different compound from UH15_15.

All reactions were carried out under argon atmosphere with dry solvents under anhydrous conditions, unless otherwise stated. All commercially available chemicals and reagent grade solvents were used directly without further purification unless otherwise specified. Reactions were monitored by thin-layer chromatography (TLC) on Baker-Flex® silica gel plates (IB2-F) using UV-light (254 and 365 nm) as visualizing agent and either ethanolic solution of phosphomolybdic acid or ninhydrin solution and heat as developing agents. Flash chromatography was conducted on silica gel (230-400 mesh) using Teledyne ISCO Combi-Flash® Rf. NMR spectra were recorded at room temperature using a JEOL ECA-500 (1H NMR and 13C NMR at 400, 500 and 600 MHz) with tetramethylsilane (TMS) as an internal standard. Chemical shifts ($\delta$) are given in parts per million (ppm) with reference to solvent signals [1H-NMR: CDCl$_3$ (7.26 ppm), CD$_3$OD (3.30 ppm), DMSO-d6 (2.49 ppm); 13C-NMR: CDCl$_3$ (77.0 ppm), CD$_3$OD (49.0 ppm), DMSO-d6 (39.5 ppm)]. Signal patterns are reported as s (singlet), d (doublet), t (triplet), q (quartet), dd (doublet of doublets), td (triplet of doublets), m (multiplet) and brs (broad singlet). Coupling constants (J) are given in Hz. High resolution mass spectra (HRMS) were carried out using Agilent 6530 Q-TOF instrument by Mass spectrometry facility at Department of Chemistry, the University of Texas at Austin. Electrospray ionization (ESI) were used as ionization source and the spectra were reported as m/z (relative intensity) for the molecular [M] or [M+H]$^+$ ion species. Purity of compounds were determined by high-performance liquid chromatography (HPLC) analyses using binary hplc pump (Waters) and Kinetex 5 μm C18 100 A column (250×4.6 mm). UV absorption was monitored at λ=254 nm. The injection volume was 15 μL. The HPLC gradient went from 2% acetonitrile/98% water to 90% acetonitrile/10% water (both solvents contain 0.1% trifluoroacetic acid) with a total run time of 30 min and flow rate of 1 mL/min.

Compounds UH15-4, UH15-6, UH15-10, UH15-18 and UH15-20 were prepared using adaptation of the methods described in Cuny, et al. WO 2018/213219.

2-((4-(2-(diethylamino)ethoxy)phenyl)amino)-8-ethyl-6-phenylpyrido[2,3-d]pyrimidin-7(8H)-one (UH15-4)

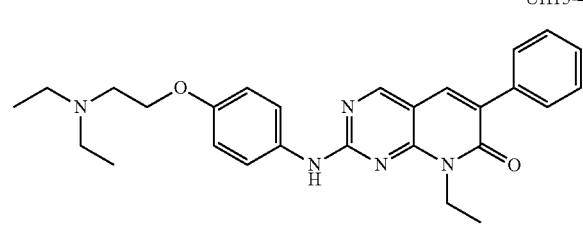

UH15-4

Yellow solid (Yield 54%): $^1$H NMR (400 MHz, CDCl$_3$) δ (ppm) 8.56 (s, 1H), 7.67 (d, J=3.6 Hz, 2H), 7.64 (s, 1H), 7.56 (d, J=9.2 Hz, 2H), 7.46-7.30 (m, 3H), 6.94 (d, J=8.8 Hz, 2H), 4.50 (q, J=7.0 Hz, 2H), 4.07 (t, J=6.2 Hz, 2H), 2.90 (t, J=6.2 Hz, 2H), 2.66 (q, J=7.0 Hz, 4H), 1.38 (t, J=7.1 Hz, 3H), 1.09 (t, J=7.1 Hz, 6H). HRMS m/z calculated for C$_{27}$H$_{31}$N$_5$O$_2$ [M+H]$^+$: 458.2551; found 458.2556. Purity 95.8% ($t_R$ 20.50 min). MP 133-135° C.

6-(2,6-dichlorophenyl)-2-((4-(2-(diethylamino)ethoxy)phenyl)amino)-8-(2-methoxyethyl)pyrido[2,3-d]pyrimidin-7(8H)-one (UH15-6)

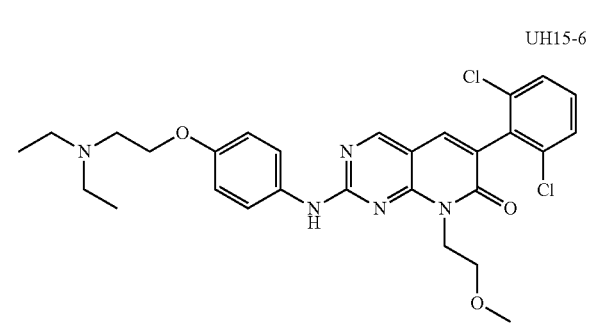 [SMILES: CCN(CC)CCOc1ccc(Nc2ncc3cc(-c4c(Cl)cccc4Cl)c(=O)n(CCOC)c3n2)cc1]

UH15-6

Yellow solid (Yield 61%): $^1$H NMR (400 MHz, CDCl$_3$) δ (ppm) 8.55 (s, 1H), 7.56-7.51 (m, 3H), 7.41 (d, J=8 Hz, 3H), 7.28-7.24 (m, 1H), 6.94 (d, J=9.2 Hz, 2H), 4.66 (t, J=6 Hz, 2H), 4.06 (t, J=6.4 Hz, 2H), 3.76 (t, J=6.2 Hz, 2H), 3.36 (s, 3H), 2.89 (t, J=6.2 Hz, 2H), 2.66 (q, J=7.2 Hz, 4H), 1.08 (t, J=7.2 Hz, 6H). $^{13}$C NMR (100 MHz, CDCl$_3$) δ 161.2, 159.5, 158.8, 155.9, 155.6, 136.6, 135.8, 134.2, 131.5, 129.9, 128.1, 125.7, 122.2, 114.9, 106.4, 69.1, 66.9, 58.9, 51.8, 47.9, 40.4, 11.9. HRMS m/z calculated for C$_{28}$H$_{31}$Cl$_2$N$_5$O$_3$ [M+H]$^+$: 556.1877; found 556.1879. Purity 97.4% ($t_R$ 20.76 min). MP 133-135° C.

6-(2,6-dichlorophenyl)-2-((4-(2-(diethylamino)ethoxy)phenyl)amino)-8-isobutylpyrido[2,3-d]pyrimidin-7(8H)-one (UH15-10)

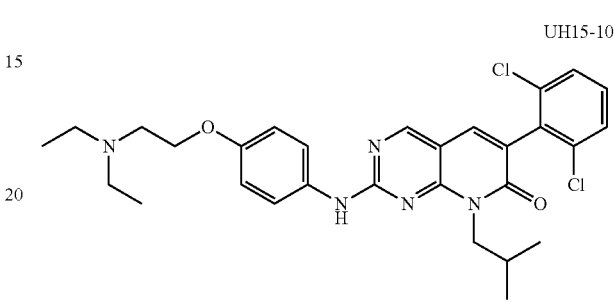

UH15-10

Yellow solid (Yield 36%): $^1$H NMR (400 MHz, CDCl$_3$) δ (ppm) 8.54 (s, 1H), 7.83 (brs, 1H), 7.57 (d, J=9.2 Hz, 2H), 7.49 (s, 1H), 7.38 (d, J=7.8 Hz, 2H), 7.23 (d, J=8.2 Hz, 1H), 6.93 (d, J=9.2 Hz, 2H), 4.28 (d, J=7.3 Hz, 2H), 4.07 (t, J=6.2 Hz, 2H), 2.90 (t, J=6.2 Hz, 2H), 2.66 (q, J=7.0 Hz, 4H), 2.42-2.31 (sep, J=6.8, 7.2 Hz, 1H), 1.09 (t, J=7.1 Hz, 6H), 0.97 (d, J=6.4 Hz, 6H). $^{13}$C NMR (100 MHz, CDCl$_3$) δ 161.6, 159.3, 158.6, 155.9, 155.4, 136.3, 135.8, 134.4, 131.8, 129.8, 128.1, 125.9, 122.0, 114.8, 106.3, 66.8, 51.8, 48.3, 47.9, 27.4, 20.3, 11.8. HRMS m/z calculated for C$_{29}$H$_{33}$Cl$_2$N$_5$O$_2$ [M+H]$^+$: 554.2084; found 554.2085. Purity 97.7% ($t_R$ 22.55 min). MP 196-198° C.

6-(2-chloro-4-fluorophenyl)-8-methyl-2-((3-(methylsulfonyl)phenyl)amino)pyrido[2,3-d]pyrimidin-7(8H)-one (UH15-18)

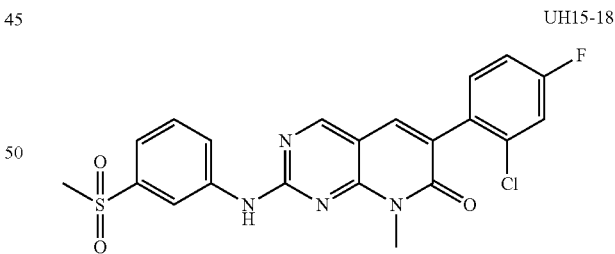

UH15-18

White solid (Yield 60%): $^1$H NMR (600 MHz, DMSO-d6) δ (ppm) 10.63 (s, 1H), 8.90 (s, 1H), 8.77 (brs, 1H), 7.96 (d, J=7.8 Hz, 1H), 7.93 (s, 1H), 7.63 (t, J=8.1 Hz, 1H), 7.59-7.56 (m, 2H), 7.49-7.46 (m, 1H), 7.36 (td, J=8.5, 3 Hz, 1H), 3.69 (s, 3H), 3.22 (s, 3H). $^{13}$C NMR (150 MHz, DMSO-d$_6$) δ 162.9, 161.7, 161.3, 159.8, 159.1, 155.5, 141.9, 141.0, 136.6, 134.6, 134.5, 133.9, 132.5, 130.4, 126.8, 124.4, 120.9, 117.6, 117.2, 117.0, 114.9, 114.7, 106.9, 44.2, 28.7. HRMS m/z calculated for C$_{21}$H$_{16}$ClFN$_4$O$_3$S [M+H]$^+$: 459.0688; found 459.0688. Purity 97.6% ($t_R$ 22.72 min). MP 248-250° C.

Synthesis of UH15-20:

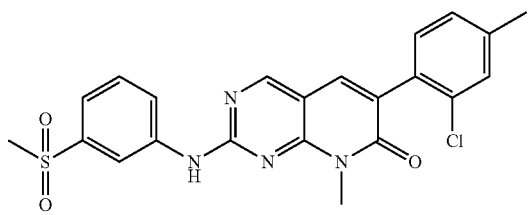

UH15-20

Figure 5:
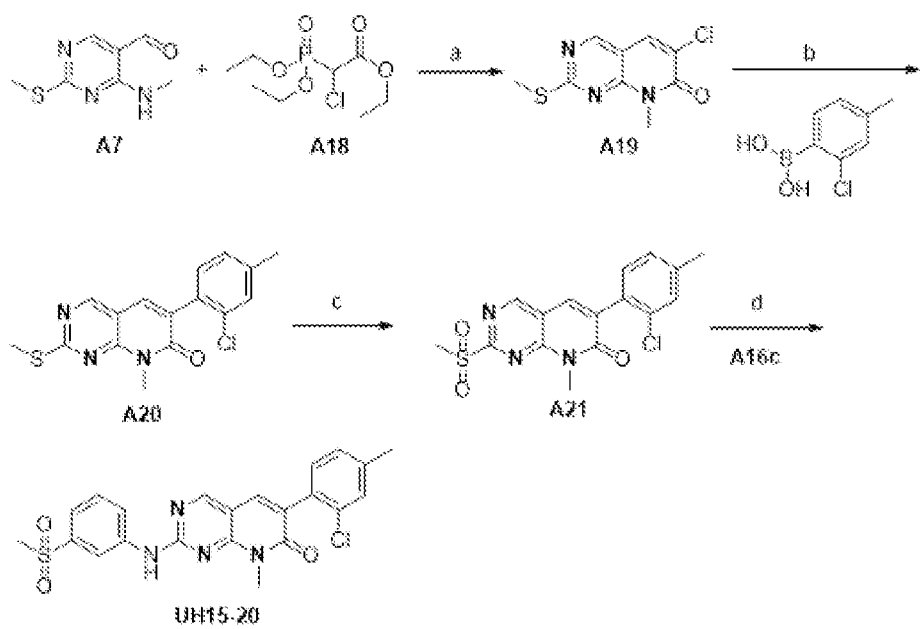
FIG. 5 shows steps in the synthesis of an exemplary RIPK3 inhibitor.

Synthesis of UH15-20 proceeded as shown in FIG. 5. Reagents and conditions: (a) NaH, THF, reflux, 2.5 h, 42%; (b) Pd(PPh$_3$)$_4$, Na$_2$CO$_3$, DMF:AcN, 90° C., 5 h, 57%; (c) mCPBA, DCM, rt, 5 h, 68%; (d) NaH, THF:DMF, 0° C. to rt, 2.5 h, 75%.

6-chloro-8-methyl-2-(methylthio)pyrido[2,3-d]pyrimidin-7(8H)-one (A19)

The mixture of A7 (20 mg, 0.11 mmol) and 60% NaH (8 mg, 0.33 mmol) in THF (1.5 mL) was stirred at rt for 10 min under argon. The solution of ethyl 2-chloro-2-(diethoxyphosphoryl)acetate A18 (42 mg, 0.16 mmol) in THF (0.5 mL) was added dropwise to the above mixture and refluxed for 2.5 h. The reaction mixture was cooled to rt, concentrated and extracted using EtOAc and water. The organic layer was dried over anhydrous Na$_2$SO$_4$, filtered and concentrated to give a residue which was purified by column chromatography using silica gel (30% EtOAc/Hexane) to afford A19 as a white solid (42% yield). $^1$H NMR (600 MHz, CDCl$_3$) δ (ppm) 8.59 (s, 1H), 7.82 (s, 1H), 3.80 (s, 3H), 2.62 (s, 3H). $^{13}$C NMR (150 MHz, CDCl$_3$) δ (ppm) 173.6, 159.3, 155.7, 153.3, 132.6, 126.7, 109.0, 29.2, 14.6.

6-(2-chloro-4-methylphenyl)-8-methyl-2-(methylthio)pyrido[2,3-d]pyrimidin-7(8H)-one (A20)

A19 (24 mg, 0.11 mmol), (2-chloro-4-methylphenyl)boronic acid (28 mg, 0.16 mmol) and Pd(PPh$_3$)$_4$ (13 mg, 0.011 mmol) were placed in a round bottom flask and purged with argon for 10 min DMF (1 mL) and CH$_3$CN (2 mL) were added to the above mixture and purged for 10 min 1M Na$_2$CO$_3$ (23 mg, 0.21 mmol) (220 µL) solution was added drop wise and the reaction mixture was heated at 90° C. for 5 h. The reaction mixture was cooled to rt, solvent was evaporated, and the residue was partitioned between water and EtOAc. The organic layer was dried over anhydrous Na$_2$SO$_4$, filtered and concentrated to give a residue which was purified by column chromatography using silica gel (10% EtOAc/DCM) to afford A20 as a white solid (57%). $^1$H NMR (400 MHz, CDCl$_3$) δ (ppm) 8.64 (s, 1H), 7.64 (s, 1H), 7.31-7.23 (m, 2H), 7.14 (d, J=7.6 Hz, 1H), 3.82 (s, 3H), 2.66 (s, 3H), 2.38 (s, 3H). $^{13}$C NMR (100 MHz, CDCl$_3$) δ (ppm) 173.3, 161.9, 156.3, 154.3, 140.3, 134.8, 133.3, 131.6, 131.2, 130.4, 127.7, 109.4, 28.5, 21.1, 14.6.

6-(2-chloro-4-methylphenyl)-8-methyl-2-(methylsulfonyl)pyrido[2,3-d]pyrimidin-7(8H)-one (A21)

A21 was synthesized by using the using adaptation of the methods described in Cuny, et al. WO 2018/213219. White solid (68% yield): $^1$H NMR (400 MHz, CDCl$_3$) δ (ppm) 8.99 (s, 1H), 7.80 (s, 1H), 7.34 (s, 1H), 7.27-7.24 (m, 1H), 7.17 (d, J=8.4 Hz, 1H), 3.89 (s, 3H), 3.44 (s, 3H), 2.41 (s, 3H). $^{13}$C NMR (100 MHz, CDCl$_3$) δ (ppm) 164.4, 161.3, 157.1, 155.1, 141.2, 136.6, 133.6, 133.1, 130.9, 130.6, 130.5, 127.8, 115.1, 39.3, 29.3, 21.2.

Synthesis of A16c:

Formic acid (1 mL) was added to 3-(methylsulfonyl) aniline in a round bottom flask containing molecular sieves (4 Å, 8-12 mesh). The reaction mixture was heated at 60° C. for 6 h and then partitioned between a saturated solution of NaHCO$_3$ and EtOAc. The organic layer was then washed with brine solution and then concentrated to give A16c, which was used without purification.

N-(3-(methylsulfonyl)phenyl)formamide (A16c)

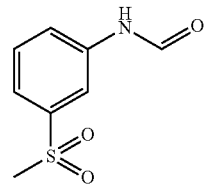

A16c

White solid (Yield 80%): $^1$H NMR (400 MHz, DMSO-d$_6$) δ 10.64 (s, 1H), 8.40 (s, 1H), 8.28 (s, 1H), 7.89-7.86 (m, 1H), 7.67-7.63 (m, 2H), 3.24 (s, 3H). $^{13}$C NMR (100 MHz, DMSO-d$_6$) δ 160.7, 141.9, 139.4, 130.8, 124.1, 122.5, 117.5, 44.1.

6-(2-chloro-4-methylphenyl)-8-methyl-2-((3-(methylsulfonyl)phenyl)amino)pyrido[2,3-d]pyrimidin-7 (8H)-one (UH15-20)

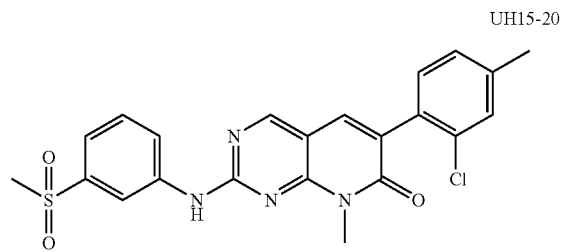

UH15-20

UH15-20 was prepared from A21 and A16c using adaptation of the methods described in Cuny, et al. WO 2018/213219. White solid (Yield 75%): $^1$H NMR (400 MHz, DMSO-d$_6$) δ (ppm) 10.61 (s, 1H), 8.89 (s, 1H), 8.77 (s, 1H), 7.97 (d, J=8.8 Hz, 1H), 7.88 (s, 1H), 7.65-7.57 (m, 2H), 7.39 (s, 1H), 7.29 (d, J=8 Hz, 1H), 7.22 (d, J=7.7 Hz, 1H), 3.69 (s, 3H), 3.23 (s, 3H), 2.36 (s, 3H). HRMS m/z calculated for C$_{22}$H$_{19}$ClN$_4$O$_3$S [M+H]$^+$: 455.0939; found 455.0944. Purity 99.6% (t$_R$ 23.51 min). MP 182-184° C.

Synthesis of UH15-28:

UH15-28

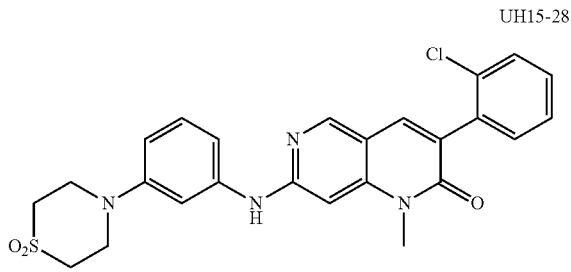 [SMILES: Cn1c(=O)c(-c2ccccc2Cl)cc2cnc(Nc3cccc(N4CCS(=O)(=O)CC4)c3)cc21]

Figure 6:
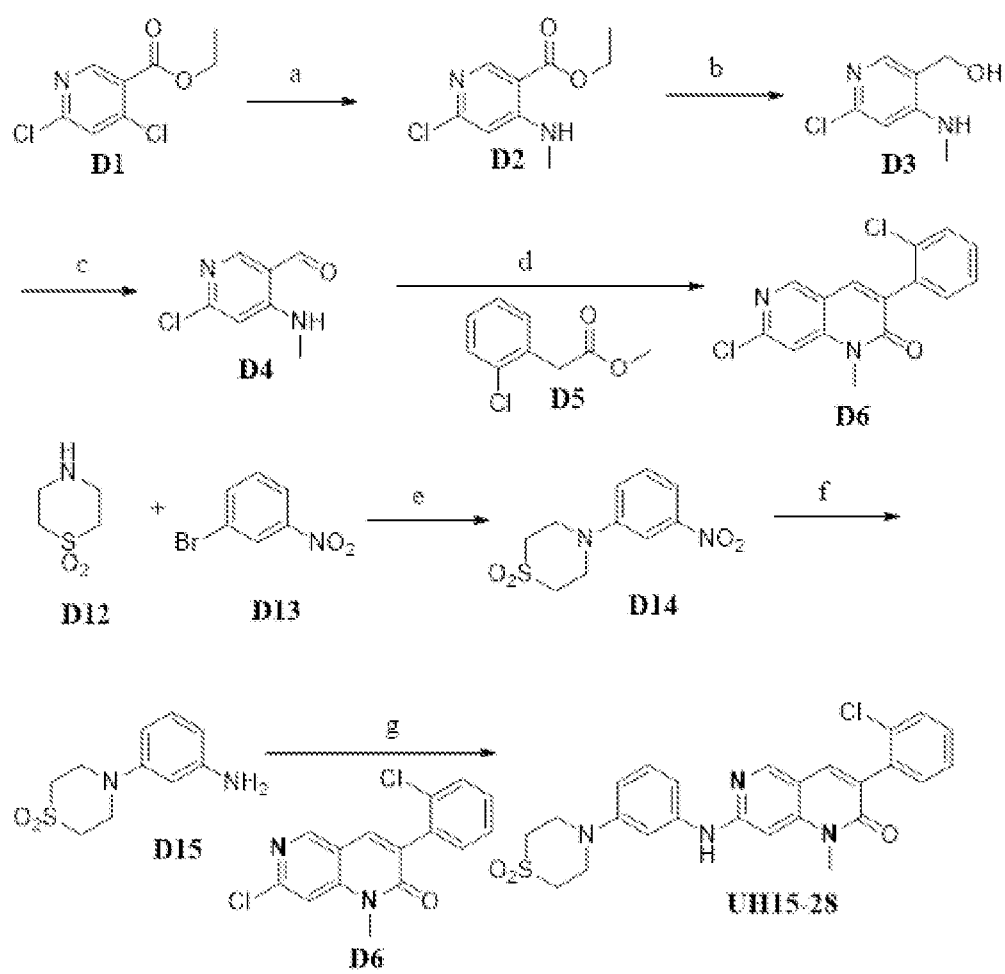
FIG. 6 shows steps in the synthesis of an exemplary RIPK3 inhibitor.

Synthesis of UH15-28 proceeded as shown in FIG. 6. Reagents and conditions: (a) CH$_3$NH$_2$ (aq), THF, 0° C. to rt, 2 h, 67%; (b) LAH, THF, 0° C. to rt, 1.5 h, 96%; (c) MnO$_2$, DCM, rt, overnight, 93%; (d) KF/Al$_2$O$_3$, DMA, rt, 2 h, 75%; (e) Pd$_2$(dba)$_3$, Xantphos, K$_2$CO$_3$, DMF, reflux, 24 h, 37%; (f) Pd/C, H2, MeOH, rt, overnight, 94%; (g) Pd$_2$(dba)$_3$, Xantphos, Cs$_2$CO$_3$, dioxane, 80° C., overnight, 36%.

Ethyl 6-chloro-4-(methylamino)nicotinate (D2)

To a solution of D1 (100 mg, 0.45 mmol) in THF (2 mL), aqueous methylamine (0.4 mL) was added at 0° C. The mixture was stirred for 30 min at the same temperature and then at rt for 2 h. After evaporation in vacuo to remove THF, the crude mixture was then partitioned between H$_2$O and EtOAc. The organic layer was washed with brine, dried over anhydrous Na$_2$SO$_4$, filtered and concentrated. The residue was purified by column chromatography on silica gel (10% EtOAc/hexane) to afford D2 (65 mg, 67%) as a white solid. $^1$H NMR (400 MHz, CDCl$_3$) δ (ppm) 8.63 (s, 1H), 8.08 (brs, 1H), 6.51 (s, 1H), 4.31 (q, J=6.9 Hz, 2H), 2.89 (d, J=4.8 Hz, 3H), 1.36 (t, J=7.0 Hz, 3H). $^{13}$C NMR (100 MHz, CDCl$_3$) δ (ppm) 167.6, 156.8, 155.7, 152.8, 107.0, 104.3, 61.0, 29.2, 14.3.

(6-chloro-4-(methylamino)pyridin-3-yl)methanol (D3)

A suspension of LAH (27 mg, 0.69 mmol) in THF (2 mL) was cooled at 0° C. and to this the solution of D2 (100 mg, 0.46 mmol) in THF (2 mL) was added dropwise under argon. The reaction mixture was stirred at rt for 30 min. The reaction mixture was then cooled to 0° C. and 15% NaOH (0.5 mL) and water (1 mL) were added dropwise. The reaction mixture was stir for 1 h, filtered and washed with EtOAc. Evaporation of EtOAc in vacuo yielded a residue which was purified by column chromatography on silica gel (5% MeOH/DCM) to afford D3 (77 mg, 96%) as white solid. $^1$H NMR (400 MHz, CD$_3$OD) δ (ppm) 7.73 (s, 1H), 6.51 (s, 1H), 4.91 (s, 2H), 4.49 (s, 2H), 2.84 (s, 3H). $^{13}$C NMR (100 MHz, CD$_3$OD) δ (ppm) 155.7, 151.1, 145.8, 119.7, 102.8, 59.0, 28.1.

6-chloro-4-(methylamino)nicotinaldehyde (D4)

To a solution of D3 (495 mg, 2.86 mmol) in DCM (10 mL), was added MnO$_2$ (1496 mg, 17.20 mmol) and the mixture was stir overnight at rt under argon. The reaction mixture was then filtered, concentrated to remove DCM and purified by column chromatography on silica gel (5% MeOH/DCM) to afford D4 (453 mg, 93%) as white solid. $^1$H NMR (400 MHz, CDCl$_3$) δ (ppm) 9.70 (s, 1H), 8.43 (brs, 1H), 8.16 (s, 1H), 6.43 (s, 1H), 2.83 (d, J=5.6 Hz, 3H). $^{13}$C NMR (100 MHz, CDCl$_3$) δ (ppm) 192.5, 157.9, 156.5, 155.8, 114.9, 104.3, 29.0.

7-chloro-3-(2-chlorophenyl)-1-methyl-1,6-naphthyridin-2(1H)-one (D6)

To a stirred solution of D4 (300 mg, 1.75 mmol) and D5 (325 mg, 1.75 mmol) in dry DMA (5 mL), KF/Al$_2$O$_3$ (1800 mg, 40 wt %) was added and the reaction mixture was stirred at rt for 2 h under argon. After completion, the reaction mixture was filtered through celite and the residual solid was washed with DCM. The filtrate was concentrated, and the residue was purified by column chromatography over silica gel using 25% EtOAc/Hexane to give D6 (400 mg, 75%) as white solid. $^1$H NMR (400 MHz, CDCl$_3$) δ (ppm) 8.54 (s, 1H), 7.72 (s, 1H), 7.44-7.41 (m, 1H), 7.33-7.27 (m, 4H), 3.65 (s, 3H).

4-(3-nitrophenyl)thiomorpholine 1,1-dioxide (D14)

To a pre-heated round bottom flask Pd$_2$(dba)$_3$ (68 mg, 0.073 mmol), Xantphos (85 mg, 0.147 mmol) and potassium carbonate (408 mg, 2.95 mmol) was added and flushed with argon for 10 min DMF (4 mL) was added to the mixture and flushed for another 5 min, which was followed by addition of D12 (200 mg, 1.47 mmol) and D13 (356 mg, 1.77 mmol) and then refluxed for 24 h. The reaction mixture was then partitioned between ethyl acetate and water, dried over anhydrous Na$_2$SO$_4$, filtered, concentrated and purified by column chromatography using silica gel (1.5% MeOH/DCM) to give D14 (140 mg, 37%) as light yellow solid. $^1$H NMR (600 MHz, DMSO-d$_6$) δ (ppm) 7.74 (s, 1H), 7.61 (d, J=7.8 Hz, 1H), 7.50-7.46 (m, 2H), 3.89 (t, J=4.8 Hz, 4H), 3.15 (t, J=4.8 Hz, 4H).

4-(3-aminophenyl)thiomorpholine 1,1-dioxide (D15)

To a solution of D14 (140 mg, 0.54 mmol) in CH$_3$OH (10 ml) was added 10% Pd/C (50 mg) and the reaction was stirred at room temperature in H2 (g) (1 atm) for 4 h. The reaction mixture was then filtered through celite and concentrated to afford D15 (115 mg, 94%) as brown solid which was used in next step without purification.

3-(2-chlorophenyl)-7-((3-(1,1-dioxidothiomorpholino)phenyl)amino)-1-methyl-1,6-naphthyridin-2(1H)-one (UH15-28)

To a pre-heated round bottom flask, D6 (40 mg, 0.13 mmol), D15 (30 mg, 0.13 mmol), Pd$_2$(dba)$_3$ (12 mg, 0.013 mmol), Xantphos (15 mg, 0.026 mmol) and caesium carbonate (86 mg, 0.26 mmol) was added and flushed with argon for 10 min. Dioxane (3 ml) was added to the mixture and flushed again for 5 min and then heated overnight at 80° C. The reaction mixture was then partitioned between ethyl acetate and water, dried over anhydrous Na$_2$SO$_4$, filtered, concentrated and purified by column chromatography using silica gel (20% EtOAc/DCM) to give Nap-5 (23 mg, 36%) as light yellow solid. $^1$H NMR (600 MHz, CDCl$_3$) δ (ppm) 8.42 (s, 1H), 7.63 (s, 1H), 7.46-7.45 (m, 1H), 7.35-7.29 (m, 4H), 7.04-6.99 (m, 2H), 6.94 (d, J=7.8 Hz, 1H), 6.68 (d, J=8.4 Hz, 1H), 6.61 (s, 1H), 3.88 (t, J=4.2 Hz, 4H), 3.59 (s, 3H), 3.12 (t, J=4.2 Hz, 4H). $^{13}$C NMR (150 MHz, CDCl$_3$) δ (ppm) 161.4, 156.8, 150.3, 148.7, 147.0, 141.2, 137.0, 135.6, 133.9, 131.6, 130.8, 129.8, 129.5, 128.1, 126.8, 113.1, 111.6, 111.1, 109.0, 90.0, 50.5, 47.5, 29.6. HRMS m/z calculated for C25H23ClN4O3S [M+H]+: 495.1252; found 495.1256. MP 195-197° C.
Synthesis of UH15-37:

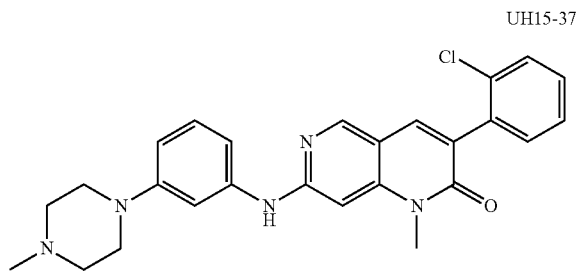 [SMILES: CN1CCN(c2cccc(Nc3cc4c(cn3)cc(-c3ccccc3Cl)c(=O)n4C)c2)CC1]

UH15-37

Figure 7:
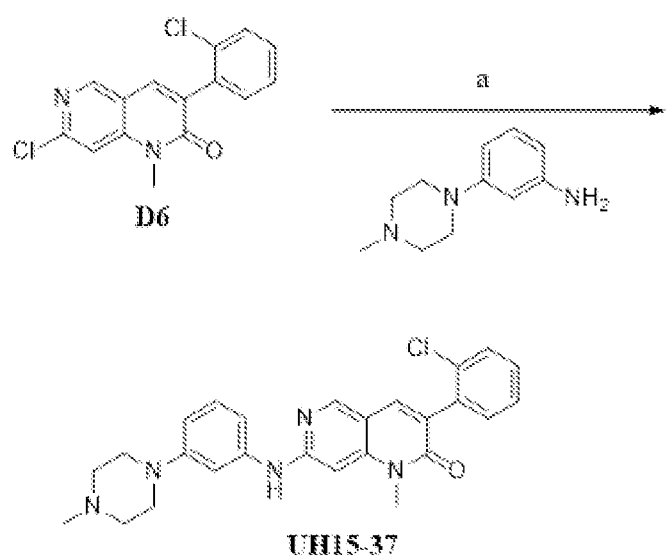
FIG. 7 shows steps in the synthesis of an exemplary RIPK3 inhibitor.
Figure 8:
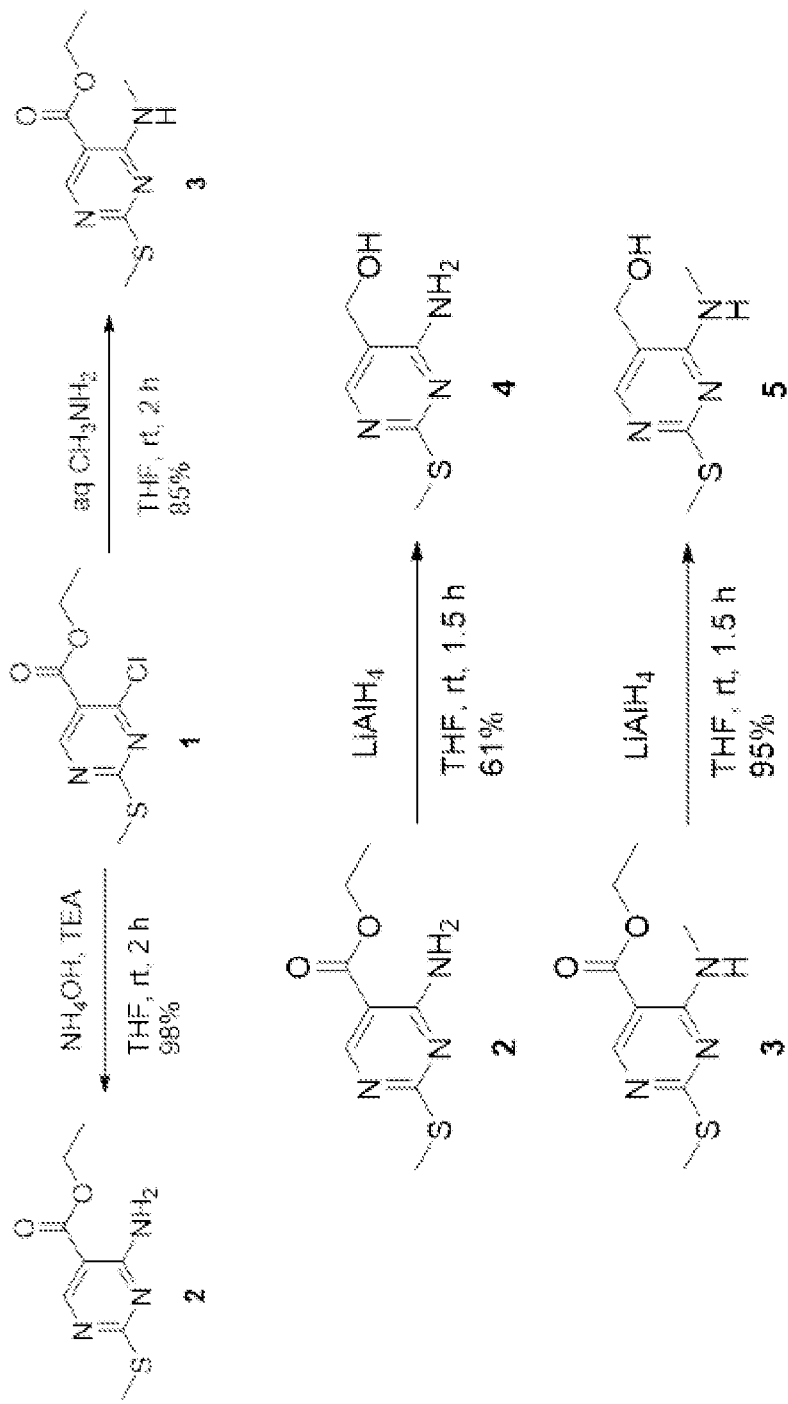
FIGS. 8-9 show synthetic schemes for intermediate compounds used in the synthesis of exemplary inhibitors of RIPK3.
Figure 9:
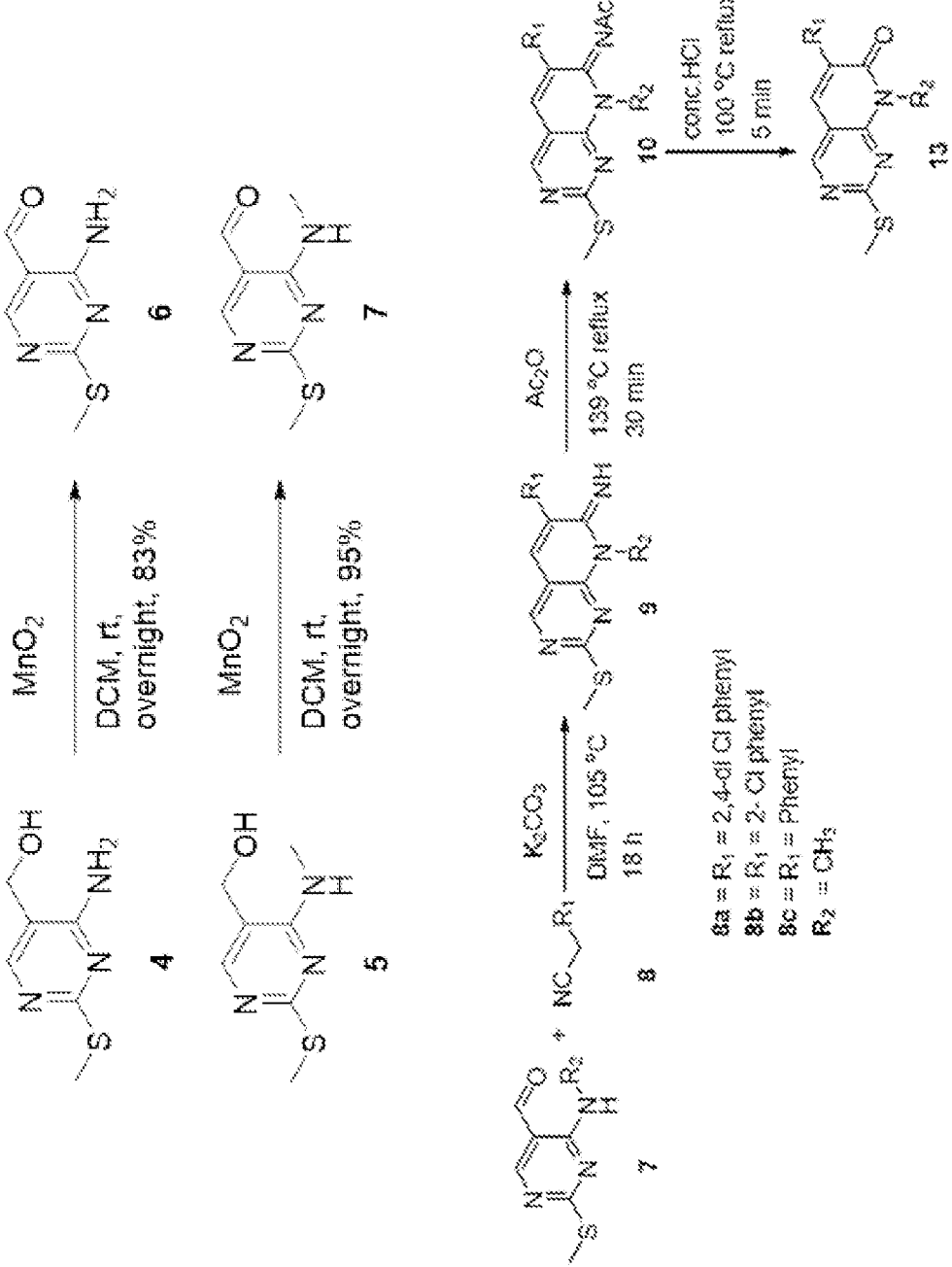
Figure 10:
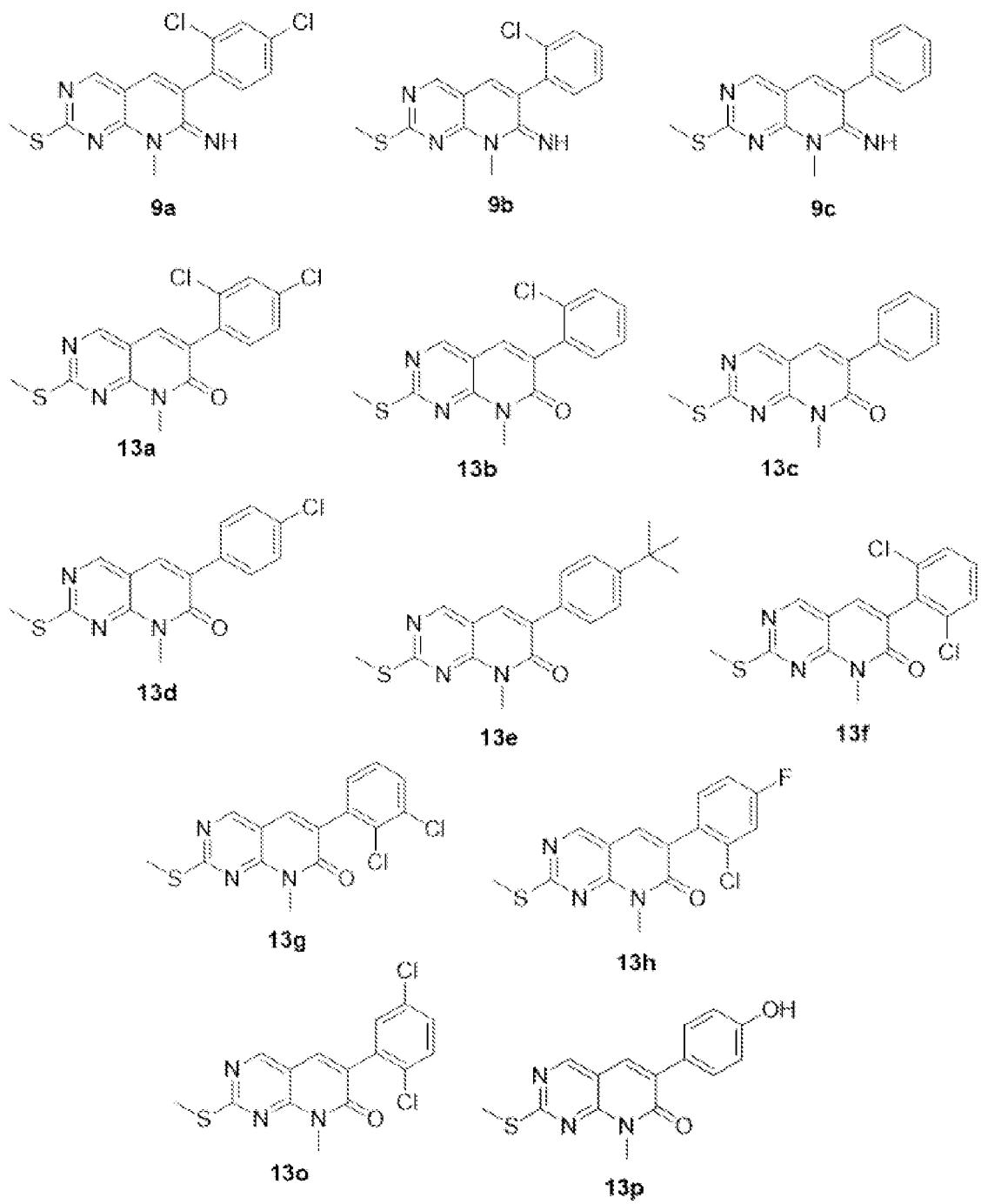
FIG. 10 shows structures for intermediate compounds used in the synthesis of exemplary inhibitors of RIPK3.
Figure 11:
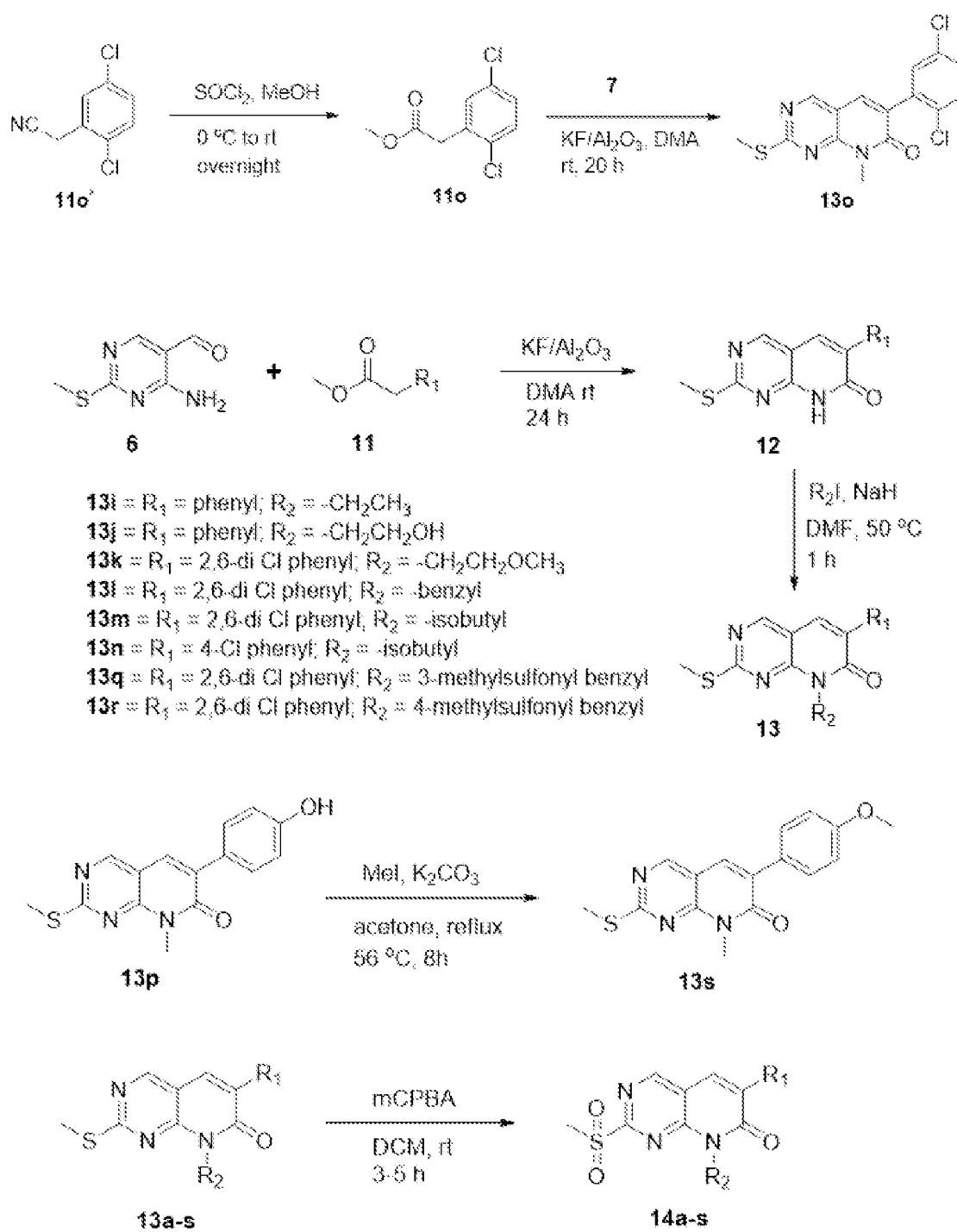
FIG. 11 shows a synthetic scheme for intermediate compounds used in the synthesis of exemplary inhibitors of RIPK3.
Figure 12:
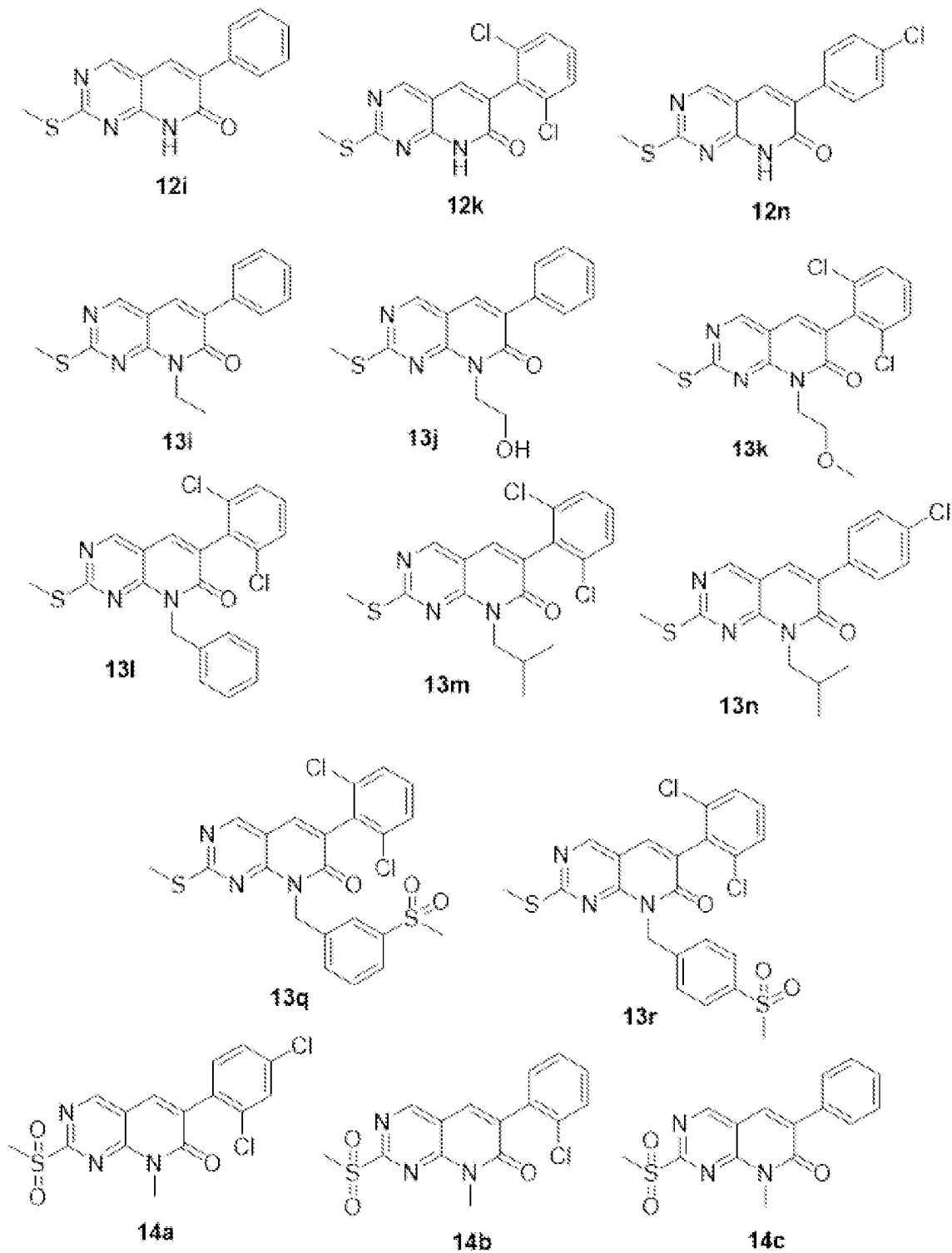
FIGS. 12-13 show structures for intermediate compounds used in the synthesis of exemplary inhibitors of RIPK3.
Figure 13:
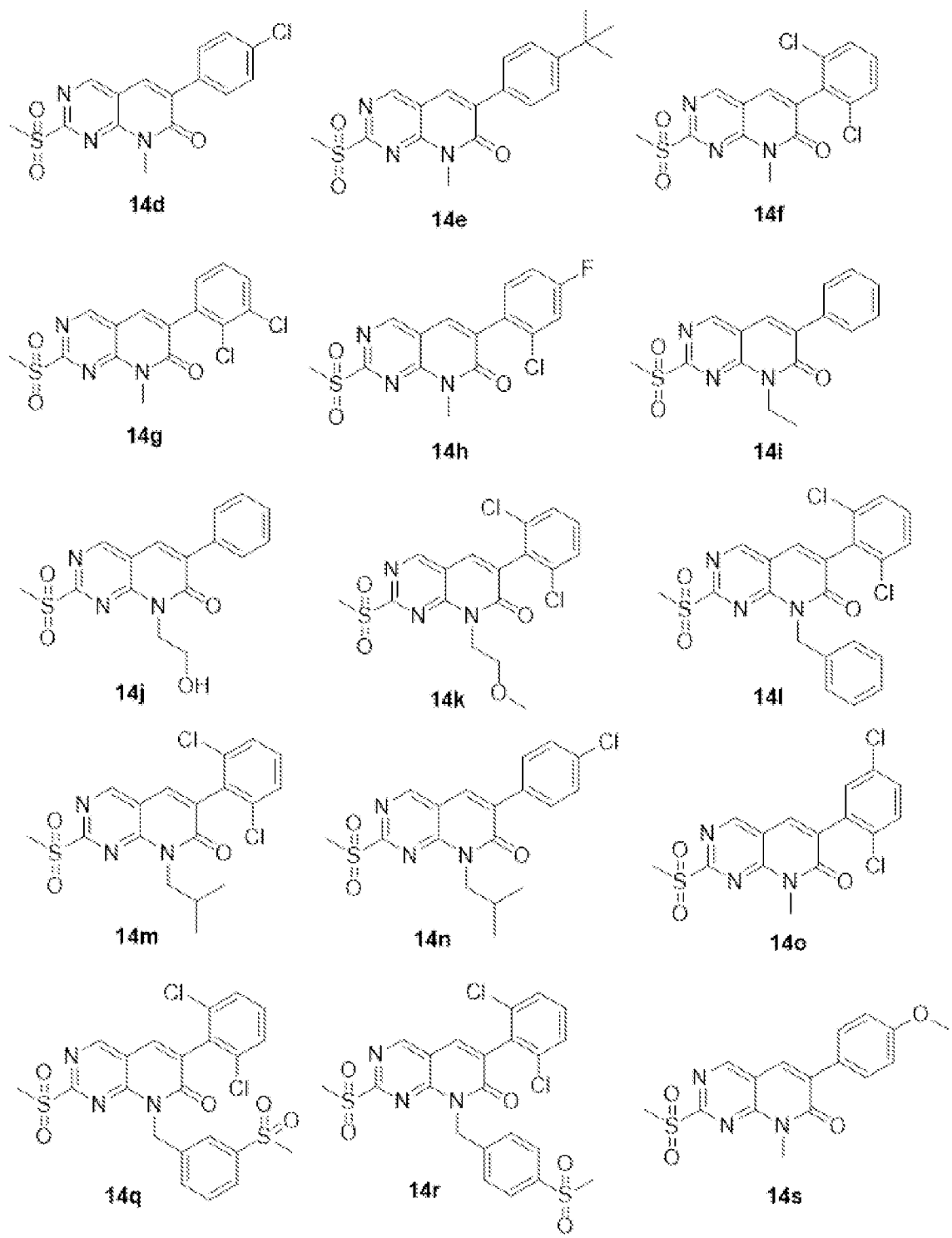
Figure 14:
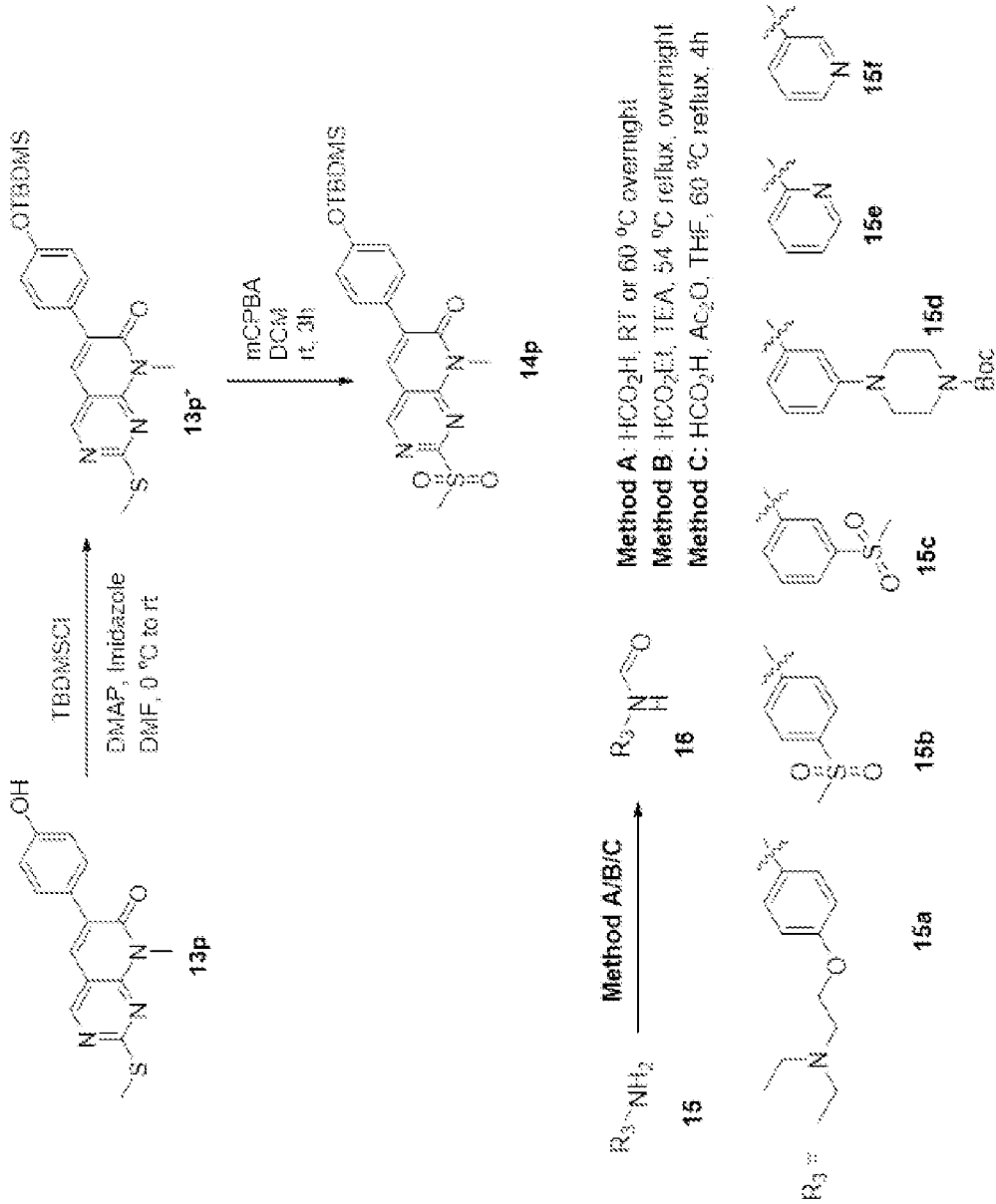
FIGS. 14-15 show synthetic schemes for intermediate compounds used in the synthesis of exemplary inhibitors of RIPK3.
Figure 15:
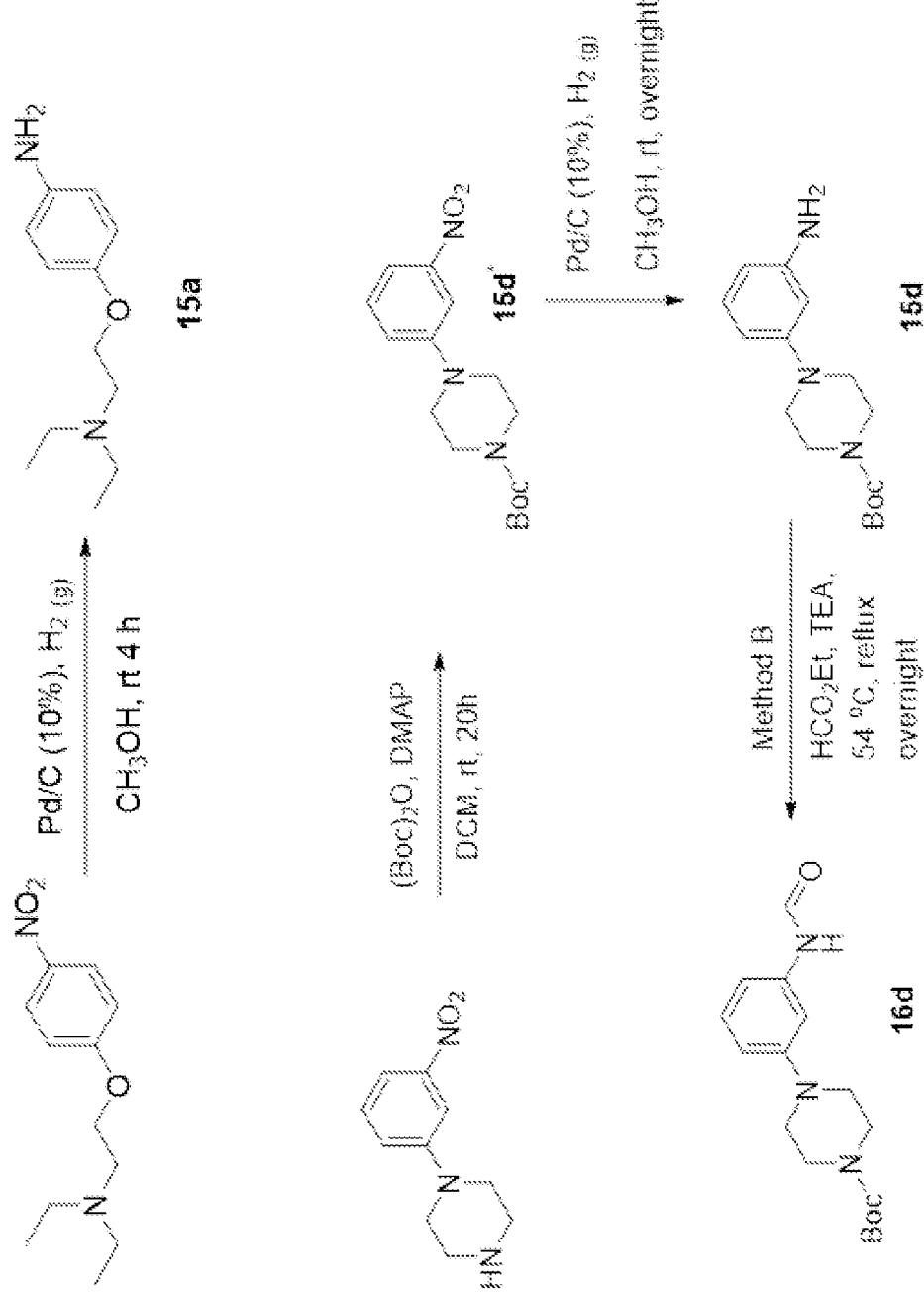
Figure 16:
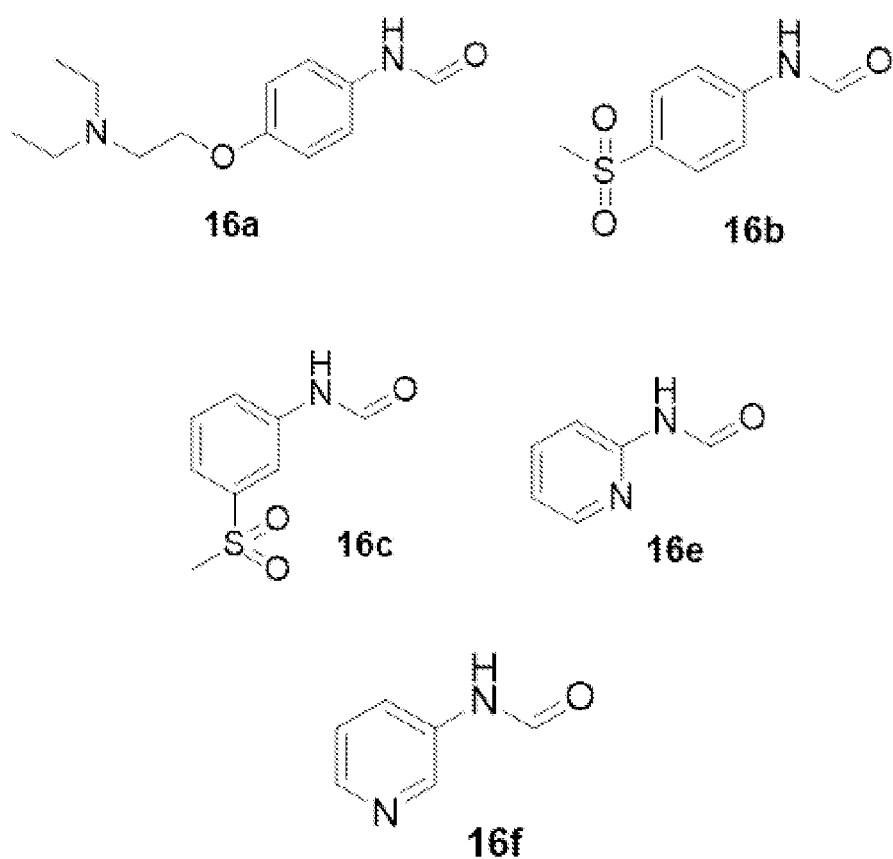
FIG. 16 shows structures for intermediate compounds used in the synthesis of exemplary inhibitors of RIPK3.

Synthesis of UH15-37 proceeded as shown in FIG. 7. Reagents and conditions: (a) Pd$_2$(dba)$_3$, Xantphos, Cs$_2$CO$_3$, dioxane, 80° C., overnight, 47%.

3-(2-chlorophenyl)-1-methyl-7-((3-(4-methylpiper-azin-1-yl)phenyl)amino)-1,6-naphthyridin-2(1H)-one (UH15-37)

In a preheated and dried round bottom flask, D6 (30 mg, 0.098 mmol), 3-(4-methylpiperazin-1-yl)aniline (19 mg, 0.098 mmol), Pd$_2$(dba)$_3$ (9 mg, 0.009 mmol), Xantphos (12 mg, 0.019 mmol) and caesium carbonate (64 mg, 0.19 mmol) were added and flushed with argon for 10 min Dry dioxane (1.5 mL) was added to the mixture and flushed for 10 min after which the reaction mixture was heated at 80° C. overnight. The reaction mixture was cooled to rt, solvent was evaporated, and the residue was partitioned between water and EtOAc. The organic layer was dried over anhydrous Na$_2$SO$_4$, filtered and concentrated to give a residue which was purified by column chromatography using silica gel (5% MeOH/DCM) to get UH15-37 (21 mg, 47%) as yellow solid. $^1$H NMR (600 MHz, CDCl$_3$) δ (ppm) 8.41 (s, 1H), 7.61 (s, 1H), 7.47-7.45 (m, 1H), 7.36-7.7.27 (m, 4H), 7.14 (s, 1H), 6.91 (s, 1H), 6.85 (d, J=7.8 Hz, 1H), 6.74 (d, J=8.4 Hz, 1H), 6.69 (s, 1H), 3.56 (s, 3H), 3.24 (t, J=4.5 Hz, 4H), 2.58 (t, J=4.5 Hz, 4H), 2.36 (s, 3H). $^{13}$C NMR (150 MHz, CDCl$_3$) δ (ppm) 161.5, 157.5, 152.5, 150.6, 147.1, 140.4, 137.1, 135.7, 133.9, 131.7, 130.3, 129.7, 129.4, 127.6, 126.7, 112.7, 112.0, 110.8, 109.1, 89.1, 55.1, 48.8, 46.2, 29.6. HRMS m/z calculated for C$_{26}$H$_{26}$ClN$_5$O [M+H]+: 460.1899; found 460.1904. MP 100-102° C.

FIGS. 8-9, 11, and 14-15 show synthetic schemes for intermediate compounds used in the synthesis of exemplary inhibitors of protein kinase, in accordance with preferred embodiments. FIGS. 10, 12-13, and 16 show structures for intermediate compounds used in the synthesis of exemplary inhibitors of protein kinase, in accordance with preferred embodiments.

Ethyl 4-amino-2-(methylthio)pyrimidine-5-carboxylate (2)

To a solution of ethyl 4-chloro-2-(methylthio)pyrimidine-5-carboxylate (1) (100 mg, 0.43 mmol) in dry THF (2 mL) was added triethylamine (0.2 mL, 1.29 mmol) and ammonium hydroxide (0.5 mL). The resulting mixture was stirred at rt for 2 h till completion. After evaporation in vacuo to remove THF, the crude mixture then partitioned between H$_2$O and EtOAc. The organic layer was washed with brine, dried over anhydrous Na$_2$SO$_4$, filtered and concentrated. The residue was purified by column chromatography on silica gel (15% EtOAc/hexane) to afford 2 (90 mg, 98%) as white solid. $^1$H NMR (400 MHz, CDCl$_3$) δ (ppm) 8.65 (s, 1H), 7.81 (s, 1H), 6.05 (s, 1H), 4.29 (q, J=7.2 Hz, 2H), 2.46 (s, 3H), 1.32 (t, J=7.1 Hz, 3H). $^{13}$C NMR (100 MHz, CDCl$_3$) δ 176.06, 166.42, 161.87, 158.93, 101.15, 61.02, 14.32, 14.14.

Ethyl 4-(methylamino)-2-(methylthio)pyrimidine-5-carboxylate (3)

To a solution of ethyl 4-chloro-2-(methylthio)pyrimidine-5-carboxylate (1) (3000 mg, 12.93 mmol) in dry THF (20 mL) was added aqueous (aq) methyl amine (6 mL). The resulting mixture was stirred at rt for 2 h till completion. After evaporation in vacuo to remove THF, the crude mixture then partitioned between H$_2$O and EtOAc. The organic layer was washed with brine, dried over anhydrous Na$_2$SO$_4$, filtered and concentrated. The residue was purified by column chromatography on silica gel (10% EtOAc/hexane) to afford 3 (2500 mg, 85%) as white solid. $^1$H NMR (400 MHz, CDCl$_3$) δ (ppm) 8.59 (s, 1H), 8.16 (s, 1H), 4.29 (q, J=7.0 Hz, 2H), 3.06 (d, J=5.0 Hz, 3H), 2.53 (s, 3H), 1.35 (t, J=7.1 Hz, 3H). $^{13}$C NMR (100 MHz, CDCl$_3$) δ 176.10, 167.13, 160.77, 158.25, 101.03, 60.88, 27.37, 14.34, 14.29.

(4-amino-2-(methylthio)pyrimidin-5-yl)methanol (4)

The suspension of LiAlH$_4$ (120 mg, 3.16 mmol) in THF (4 mL) was cooled at 0° C. and to this the solution of 2 (450 mg, 2.11 mmol) in THF (2 mL) was added dropwise under argon and allowed to stir at rt for 30 min. The reaction mixture was then cooled at 0° C. and 15% NaOH (0.5 mL) and water (1 mL) was added dropwise. The reaction mixture was allowed to stir for 1 h, filtered and washed with EtOAc. Evaporation to remove EtOAc in vacuo afforded 4 (220 mg, 61%) as light yellow solid which was used in next step without purification. $^1$H NMR (400 MHz, CD$_3$OD) δ (ppm) 7.84 (s, 1H), 4.45 (s, 2H), 2.47 (s, 3H). $^{13}$C NMR (100 MHz, CD$_3$OD) δ 170.41, 162.27, 152.62, 111.92, 58.47, 12.58.

S (4-(methylamino)-2-(methylthio)pyrimidin-5-yl) methanol (5)

The suspension of LiAlH$_4$ (626 mg, 16.50 mmol) in THF (10 mL) was cooled at 0° C. and to this the solution of 3 (2500 mg, 11.00 mmol) in THF (5 mL) was added dropwise under argon and allowed to stir at rt for 30 min. The reaction mixture was then cooled at 0° C. and 15% NaOH (2 mL) and water (4 mL) was added dropwise. The reaction mixture was allowed to stir for 1 h, filtered and washed with EtOAc. Evaporation to remove EtOAc in vacuo afforded 5 (1790 mg, 95%) as light yellow solid which was used in next step without purification. $^1$H NMR (400 MHz, CD$_3$OD) δ (ppm) 7.72 (s, 1H), 4.42 (s, 2H), 3.01 (s, 3H), 2.51 (s, 3H).

4-amino-2-(methylthio)pyrimidine-5-carbaldehyde (6)

To a solution of 4 (220 mg, 1.28 mmol) in DCM (5 mL), was added MnO$_2$ (670 mg, 7.71 mmol) and the mixture was allowed to stir overnight at rt under argon. The reaction mixture was then filtered, concentrated to remove DCM and purified by column chromatography on silica gel (30% EtOAc/hexane) to afford 6 (180 mg, 83%) as light yellow solid. $^1$H NMR (400 MHz, CDCl$_3$) δ (ppm) 9.77 (s, 1H), 8.41 (s, 1H), 8.19 (s, 1H), 5.81 (s, 1H), 2.54 (s, 3H). $^{13}$C NMR (100 MHz, CDCl$_3$) δ 190.75, 177.65, 162.95, 160.38, 109.42, 14.33.

4-(methylamino)-2-(methylthio)pyrimidine-5-carbaldehyde (7)

To a solution of 5 (1795 mg, 10.489 mmol) in DCM (15 mL), was added MnO$_2$ (5471 mg, 62.93 mmol) and the mixture was allowed to stir overnight at rt under argon. The reaction mixture was then filtered, concentrated to remove DCM and purified by column chromatography on silica gel (20% EtOAc/hexane) to afford 7 (1470 mg, 77%) as light yellow solid. $^1$H NMR (400 MHz, CDCl$_3$) δ (ppm) 9.69 (s, 1H), 8.55 (s, 1H), 8.29 (s, 1H), 3.11 (d, J=5.0 Hz, 3H), 2.56 (s, 3H). $^{13}$C NMR (100 MHz, CDCl$_3$) δ 190.23, 177.59, 162.84, 159.55, 109.52, 27.21, 14.38.

General Procedure for the Preparation of 9a-c

To a mixture of 4-(methylamino)-2-(methylthio)pyrimidine-5-carbaldehyde (7) (250 mg, 1.37 mmol), 2-(2,4-dichlorophenyl)acetonitrile (8a) (381 mg, 2.05 mmol) and K$_2$CO$_3$ (944 mg, 6.82 mmol) was added DMF (4 mL) under argon and the solution was refluxed at 105° C. for 18 h. After completion, the reaction mixture was partitioned between water and EtOAc and the organic layer was washed with brine solution. Evaporation to remove EtOAc in vacuo gave residue which was purified by column chromatography on silica gel (5% MeOH/DCM) to afford 9a.

6-(2,4-dichlorophenyl)-8-methyl-2-(methylthio)pyrido[2,3-d]pyrimidin-7(8H)-imine (9a)

Yield 63%, light red solid; $^1$H NMR (400 MHz, CDCl$_3$) δ (ppm) 8.34 (s, 1H), 7.57 (d, J=2 Hz, 1H), 7.41-7.37 (dd, J=2.4, 2 Hz, 1H), 7.25-7.23 (m, 1H), 7.05 (s, 1H), 3.79 (s, 3H), 2.63 (s, 3H).

6-(2-chlorophenyl)-8-methyl-2-(methylthio)pyrido[2,3-d]pyrimidin-7(8H)-imine (9b)

7 (500 mg, 2.73 mmol) and 8b (621 mg, 4.10 mmol) was used to make 9b which was used in next step without purification.

8-methyl-2-(methylthio)-6-phenylpyrido[2,3-d]pyrimidin-7(8H)-imine (9c)

7 (600 mg, 3.28 mmol) and 8c (576 mg, 4.91 mmol) was used to make 9c.
Yield 54%, light red solid; $^1$H NMR (400 MHz, CDCl$_3$) δ (ppm) 8.32 (s, 1H), 7.50-7.45 (m, 3H), 7.41-7.37 (m, 2H), 7.04 (s, 1H), 3.79 (s, 3H), 2.63 (s, 3H).

General Procedure for the Preparation of 13a-c

A suspension of 9a (200 mg, 0.57 mmol) in acetic anhydride (3 mL) was refluxed at 139° C. for 30 min. Evaporation of solvent in vacuo gave residue which was treated with concentrated HCl (2 mL) and refluxed at 100° C. for 5 min. The reaction mixture was then neutralized with saturated solution of NaHCO$_3$ and partitioned between water and EtOAc. The organic layer was then washed with brine solution and following concentration the residue was purified by column chromatography on silica gel (30% EtOAc/Hexane) to afford 13a.

6-(2,4-dichlorophenyl)-8-methyl-2-(methylthio)pyrido[2,3-d]pyrimidin-7(8H)-one (13a)

Yield 65%, light yellow solid; $^1$H NMR (400 MHz, CDCl$_3$) δ (ppm) 8.64 (s, 1H), 7.65-7.62 (m, 1H), 7.51 (s, 1H), 7.34-7.29 (m, 2H), 3.82 (s, 3H), 2.66 (s, 3H).

6-(2-chlorophenyl)-8-methyl-2-(methylthio)pyrido[2,3-d]pyrimidin-7(8H)-one (13b)

9b (350 mg, 1.10 mmol) was used to make 13b.
Yield 61%, light yellow solid; $^1$H NMR (400 MHz, CDCl$_3$) δ (ppm) 8.64 (s, 1H), 7.64 (s, 1H), 7.48-7.46 (m, 1H), 7.36-7.33 (m, 3H), 3.81 (s, 3H), 2.65 (s, 3H). $^{13}$C NMR (100 MHz, CDCl$_3$) δ 173.46, 161.80, 156.48, 154.35, 134.99, 134.71, 133.72, 131.60, 131.49, 129.94, 129.88, 126.86, 109.38, 28.55, 14.62.

8-methyl-2-(methylthio)-6-phenylpyrido[2,3-d]pyrimidin-7(8H)-one (13c)

9c (200 mg, 0.71 mmol) was used to make 13c.
Yield 55%, yellow solid; $^1$H NMR (500 MHz, CDCl$_3$) δ (ppm) 8.63 (s, 1H), 7.69 (s, 1H), 7.67-7.63 (m, 2H), 7.45-7.36 (m, 3H), 3.81 (s, 3H), 2.64 (s, 3H). $^{13}$C NMR (125 MHz, CDCl$_3$) δ 172.83, 162.41, 156.26, 153.94, 135.62, 132.82, 132.61, 128.91, 128.71, 128.42, 109.91, 28.49, 14.58.

General Procedure for the Preparation of 13d-p

To a stirred solution of 7 (15 mg, 0.08 mmol) and 11d (23 mg, 0.12 mmol) in dry DMA (1.5 mL), KF/Al$_2$O$_3$ (76 mg, 40 wt %) was added and the reaction mixture was stirred at rt for 24 h under argon. After completion the reaction mixture was filtered through Celite and the residual solid was washed with DCM and filtrate was concentrated. The residue was purified by column chromatography over silica gel using 15% EtOAc/Hexane to give 13d as light yellow solid.

6-(4-chlorophenyl)-8-methyl-2-(methylthio)pyrido[2,3-d]pyrimidin-7(8H)-one (13d)

Yield 58%, light yellow solid; $^1$H NMR (500 MHz, CDCl$_3$) δ (ppm) 8.65 (s, 1H), 7.67 (s, 1H), 7.61 (d, J=8.5 Hz, 2H), 7.40 (d, J=8.5 Hz, 2H), 3.81 (s, 3H), 2.65 (s, 3H). $^{13}$C NMR (125 MHz, CDCl$_3$) δ 173.19, 162.23, 156.38, 153.94, 134.73, 134.01, 132.69, 131.55, 130.23, 128.63, 109.76, 28.54, 14.60.

6-(4-(tert-butyl)phenyl)-8-methyl-2-(methylthio)pyrido[2,3-d]pyrimidin-7(8H)-one (13e)

Yield 41%, yellow solid; $^1$H NMR (400 MHz, CDCl$_3$) δ (ppm) 8.64 (s, 1H), 7.68 (s, 1H), 7.61 (d, J=6 Hz, 2H), 7.46 (d, J=7.6 Hz, 2H), 3.81 (s, 3H), 2.64 (s, 3H), 1.35 (s, 9H). $^{13}$C NMR (100 MHz, CDCl$_3$) δ 172.61, 162.56, 156.16, 153.88, 151.86, 132.74, 132.68, 132.09, 128.59, 125.45, 110.01, 34.80, 31.39, 28.51, 14.59.

6-(2,6-dichlorophenyl)-8-methyl-2-(methylthio)pyrido[2,3-c]pyrimidin-7(8H)-one (13f)

Yield 30%, white solid; $^1$H NMR (400 MHz, CDCl$_3$) δ (ppm) 8.67 (s, 1H), 7.61 (s, 1H), 7.42 (d, J=7.8 Hz, 2H), 7.33-7.26 (m, 1H), 3.84 (s, 3H), 2.67 (s, 3H). $^{13}$C NMR (100 MHz, CDCl$_3$) δ 173.85, 161.03, 156.62, 154.52, 136.01, 135.51, 133.76, 130.29, 129.55, 128.18, 109.26, 28.55, 14.64.

6-(2,3-dichlorophenyl)-8-methyl-2-(methylthio)pyrido[2,3-c]pyrimidin-7(8H)-one (13g)

Yield 38%, white solid; $^1$H NMR (500 MHz, CDCl$_3$) δ (ppm) 8.65 (s, 1H), 7.64 (s, 1H), 7.52 (dd, J=7.5, 2 Hz, 1H), 7.30-7.24 (m, 2H), 3.82 (s, 3H), 2.67 (s, 3H).

6-(2-chloro-4-fluorophenyl)-8-methyl-2-(methylthio)pyrido[2,3-c]pyrimidin-7(8H)-one (13h)

Yield 35%, white solid; $^1$H NMR (400 MHz, CDCl$_3$) δ (ppm) 8.63 (s, 1H), 7.64 (s, 1H), 7.35-7.30 (m, 1H), 7.24-7.15 (m, 1H), 7.04 (td, J=8.4, 2.8 Hz, 1H), 3.80 (s, 3H), 2.64 (s, 3H). $^{13}$C NMR (150 MHz, CDCl$_3$) δ 173.65, 163.34, 161.78, 161.67, 156.50, 154.33, 135.30, 134.72, 134.65, 132.65, 132.59, 130.81, 130.51, 117.41, 117.25, 114.28, 114.14, 109.27, 28.54, 14.59.

Preparation of (13o)

Methyl 2-(2,5-dichlorophenyl)acetate (11o)

To a stirred solution of 11o* (100 mg, 0.537 mmol) in methanol (3 mL) thionly chloride (0.5 mL) was added dropwise at 0° C. The reaction mixture was maintained at the same temperature for 5 h and then stirred overnight at room temperature. Following completion, the reaction mixture was concentrated and diluted with EtOAc. The organic layer was then washed with sodium bicarbonate and brine solutions and following concentration the residue was purified by column chromatography on silica gel (20% EtOAc/Hexane) to afford 11o. Yield 59%, colourless liquid; $^1$H NMR (400 MHz, CDCl$_3$) δ (ppm) 7.32-7.28 (m, 2H), 7.22-7.19 (m, 1H), 3.74 (s, 2H), 3.72 (s, 3H). $^{13}$C NMR (100 MHz, CDCl$_3$) δ 170.47, 134.04, 132.96, 132.69, 131.47, 130.62, 128.88, 52.44, 38.83.

6-(2,5-dichlorophenyl)-8-methyl-2-(methylthio)pyrido[2,3-d]pyrimidin-7(8H)-one (13o)

Yield 23%, white solid; $^1$H NMR (400 MHz, CDCl$_3$) δ (ppm) 8.65 (s, 1H), 7.66 (s, 1H), 7.43-7.31 (m, 3H), 3.82 (s, 3H), 2.66 (s, 3H).

6-(4-hydroxyphenyl)-8-methyl-2-(methylthio)pyrido[2,3-d]pyrimidin-7(8H)-one (13p)

Yield 55%, light yellow solid; $^1$H NMR (400 MHz, DMSO-d6) δ (ppm) 9.68 (s, 1H), 8.87 (s, 1H), 7.99 (s, 1H), 7.54 (d, J=8.8 Hz, 2H), 6.81 (d, J=8 Hz, 2H), 3.64 (s, 3H), 2.59 (s, 3H).

General Procedure for Preparation of 12i, 12k and 12n

To a stirred solution of 6 (37 mg, 0.22 mmol) and methyl 2-phenylacetate (11i) (30 mg, 0.20 mmol) in dry DMA (2.0 mL), KF/Al$_2$O$_3$ (187 mg, 40 wt %) was added and the reaction mixture was stirred at rt for 24 h under argon. After completion the reaction mixture was filtered through Celite and the residual solid was washed with DCM and filtrate was concentrated. The residue was purified by column chromatography over silica gel using 30% EtOAc/Hexane to give 12i as white solid.

2-(methylthio)-6-phenylpyrido[2,3-d]pyrimidin-7(8H)-one (12i)

Yield 51%, white solid; $^1$H NMR (500 MHz, CDCl$_3$) δ (ppm) 9.66 (s, 1H), 8.70 (s, 1H), 7.77 (s, 1H), 7.70 (d, J=7.5 Hz, 2H), 7.47-7.39 (m, 3H), 2.62 (s, 3H). $^{13}$C NMR (125 MHz, CDCl$_3$) δ 173.59, 162.29, 156.05, 152.33, 134.76, 134.05, 133.58, 128.97, 128.79, 128.53, 109.60, 14.47.

6-(2,6-dichlorophenyl)-2-(methylthio)pyrido[2,3-d]pyrimidin-7(8H)-one (12k)

Yield 28%, light yellow solid; $^1$H NMR (400 MHz, CDCl$_3$) δ (ppm) 9.81 (s, 1H), 8.70 (s, 1H), 7.65 (s, 1H), 7.41 (d, J=8.4 Hz, 2H), 7.30 (dd, J=8.7, 7.8 Hz, 1H), 2.60 (s, 3H). $^{13}$C NMR (100 MHz, CDCl$_3$) δ 174.52, 160.89, 156.42, 153.96, 137.76, 135.57, 132.95, 130.47, 130.33, 128.21, 108.85, 14.51.

6-(4-chlorophenyl)-2-(methylthio)pyrido[2,3-d]pyrimidin-7(8H)-one (12n)

Yield 40%, white solid; $^1$H NMR (400 MHz, CDCl$_3$) δ (ppm) 9.54 (s, 1H), 8.71 (s, 1H), 7.77 (s, 1H), 7.66 (d, J=8.8 Hz, 2H), 7.42 (d, J=8.8 Hz, 2H), 2.62 (s, 3H). $^{13}$C NMR (100 MHz, CDCl$_3$) δ 173.93, 161.96, 156.14, 153.31, 135.03, 134.12, 133.13, 132.31, 130.10, 128.76, 109.44, 14.50.

General Procedure for Preparation of 13i-r

To a mixture of 12i (20 mg, 0.07 mmol) and NaH (3 mg, 0.11 mmol) was added DMF (1.5 mL) under argon followed by drop wise addition of iodoethane (10 µl, 0.11 mmol). The reaction mixture was heated at 50° C. for 1 h and was partitioned between water and EtOAc after completion. The organic layer was then washed with brine solution, dried over anhydrous Na$_2$SO$_4$, filtered and concentrated. The residue was purified by column chromatography on silica gel (10% EtOAc/hexane) to afford 13i as colourless liquid.

8-ethyl-2-(methylthio)-6-phenylpyrido[2,3-d]pyrimidin-7(8H)-one (13i)

Yield 74%, colourless liquid; $^1$H NMR (400 MHz, CDCl$_3$) δ (ppm) 8.66 (s, 1H), 7.71-7.65 (m, 3H), 7.47-7.36 (m, 3H), 4.56 (q, J=7.2 Hz, 2H), 2.65 (s, 3H), 1.37 (t, J=7.1 Hz, 3H). $^{13}$C NMR (100 MHz, CDCl$_3$) δ 172.79, 161.86, 156.37, 153.45, 135.66, 133.05, 132.63, 128.97, 128.72, 128.42, 109.95, 29.81, 14.56, 13.07.

8-(2-hydroxyethyl)-2-(methylthio)-6-phenylpyrido[2,3-d]pyrimidin-7(8H)-one (13j)

Purified by column chromatography on silica gel (40% EtOAc/hexane) to afford 13j (Yield 48%), light yellow viscous liquid; $^1$H NMR (400 MHz, CDCl$_3$) δ (ppm) 8.61 (s, 1H), 7.67 (s, 1H), 7.54 (d, J=8 Hz, 2H), 7.39-7.31 (m, 3H), 4.63 (t, J=6 Hz, 2H), 3.88 (t, J=6 Hz, 2H), 2.56 (s, 3H). $^{13}$C NMR (100 MHz, CDCl$_3$) δ 172.93, 163.05, 156.53, 153.70, 135.30, 133.37, 132.90, 128.84, 128.79, 128.40, 109.97, 59.94, 43.65, 14.45.

6-(2,6-dichlorophenyl)-8-(2-methoxyethyl)-2-(methylthio)pyrido[2,3-d]pyrimidin-7(8H)-one (13k)

Yield 44%, colourless liquid; $^1$H NMR (400 MHz, CDCl$_3$) δ (ppm) 8.67 (s, 1H), 7.62 (s, 1H), 7.41 (d, J=7.8 Hz, 2H), 7.34-7.25 (m, 1H), 4.74 (t, J=6.2 Hz, 2H), 3.78 (t, J=6.2 Hz, 2H), 3.39 (s, 3H), 2.65 (s, 3H). $^{13}$C NMR (100 MHz, CDCl$_3$) δ 173.77, 160.73, 156.77, 154.39, 136.24, 135.50, 133.71, 130.26, 129.59, 128.17, 109.27, 68.99, 58.95, 40.33, 14.64.

8-benzyl-6-(2,6-dichlorophenyl)-2-(methylthio)pyrido[2,3-d]pyrimidin-7(8H)-one (13l)

Yield 29%, white semisolid; $^1$H NMR (400 MHz, CDCl$_3$) δ (ppm) 8.65 (s, 1H), 7.61 (s, 1H), 7.47 (d, J=6.9 Hz, 2H), 7.41 (d, J=8.2 Hz, 2H), 7.32-7.22 (m, 4H), 5.70 (s, 2H), 2.61 (s, 3H). $^{13}$C NMR (100 MHz, CDCl$_3$) δ 173.87, 160.94, 156.76, 154.21, 136.85, 136.33, 135.52, 133.76, 130.31, 129.80, 128.93, 128.59, 128.57, 128.20, 127.65, 109.38, 44.72, 14.73.

6-(2,6-dichlorophenyl)-8-isobutyl-2-(methylthio)pyrido[2,3-d]pyrimidin-7(8H)-one (13m)

Yield 28%, white solid; $^1$H NMR (400 MHz, CDCl$_3$) δ (ppm) 8.66 (s, 1H), 7.60 (s, 1H), 7.41 (d, J=8 Hz, 2H), 7.29 (t, J=8, 7.2 Hz, 1H), 4.36 (d, J=7.6 Hz, 2H), 2.65 (s, 3H), 2.40-2.30 (sep, J=6.8, 7.2 Hz, 1H), 0.98 (d, J=6.9 Hz, 6H). $^{13}$C NMR (100 MHz, CDCl$_3$) δ 173.48, 161.02, 156.76, 154.49, 135.90, 135.48, 133.92, 130.21, 129.77, 128.15, 109.16, 48.39, 27.57, 20.37, 14.59.

6-(4-chlorophenyl)-8-isobutyl-2-(methylthio)pyrido[2,3-d]pyrimidin-7(8H)-one (13n)

Yield 73%, yellow solid; $^1$H NMR (400 MHz, CDCl$_3$) δ (ppm) 8.66 (s, 1H), 7.70 (s, 1H), 7.63 (d, J=8.8 Hz, 2H), 7.41 (d, J=8.8 Hz, 2H), 4.36 (d, J=7.3 Hz, 2H), 2.64 (s, 3H), 2.33 (sep, J=7.2, 6.8 Hz, 1H), 0.98 (d, J=6.8 Hz, 6H).

6-(2,6-dichlorophenyl)-8-(3-(methylsulfonyl)benzyl)-2-(methylthio)pyrido[2,3-d]pyrimidin-7(8H)-one (13q)

Yield 36%, light yellow solid; 4l NMR (400 MHz, CDCl$_3$) δ (ppm) 8.69 (s, 1H), 8.08 (s, 1H), 7.84 (d, J=8 Hz, 1H), 7.75 (d, J=8 Hz, 1H), 7.65 (s, 1H), 7.51 (t, J=7.8 Hz, 1H), 7.43 (d, J=8 Hz, 2H), 7.32-7.28 (m, 1H), 5.76 (s, 2H), 3.03 (s, 3H), 2.63 (s, 3H).

6-(2,6-dichlorophenyl)-8-(4-(methylsulfonyl)benzyl)-2-(methylthio)pyrido[2,3-d]pyrimidin-7(8H)-one (13r)

Yield 53%, pale yellow solid; 4l NMR (400 MHz, CDCl$_3$) δ (ppm) 8.70 (s, 1H), 7.87 (d, J=8.4 Hz, 2H), 7.67-7.61 (m, 3H), 7.42 (d, J=8 Hz, 2H), 7.32-7.28 (m, 1H), 5.76 (s, 2H), 3.02 (s, 3H), 2.58 (s, 3H).

6-(4-methoxyphenyl)-8-methyl-2-(methylthio)pyrido[2,3-d]pyrimidin-7(8H)-one (13s)

To a solution of 13p (20 mg, 0.06 mmol) in acetone (2 mL) was added anhydrous potassium carbonate (14 mg, 0.10 mmol), iodomethane (10 μl, 0.10 mmol) and the mixture was allowed to reflux for 8h. After completion, the crude mixture was extracted with ethyl acetate and water, concentrated and purified by column chromatography using silica gel (20% EtOAc/Hexane) to get 13s (20 mg, 95%) as light yellow solid. 4l NMR (400 MHz, CDCl$_3$) δ (ppm) 8.64 (s, 1H), 7.65-7.62 (m, 3H), 6.96 (d, J=8.8 Hz, 2H), 3.85 (s, 3H), 3.81 (s, 3H), 2.65 (s, 3H). $^{13}$C NMR (100 MHz, CDCl$_3$) δ 172.42, 162.64, 160.05, 156.04, 153.78, 132.40, 131.40, 130.20, 127.99, 113.86, 110.07, 55.47, 28.51, 14.58.

General Procedure for Preparation of 14a-s

To a solution of 6-(2,4-dichlorophenyl)-8-methyl-2-(methylthio)pyrido[2,3-d]pyrimidin-7(8H)-one (13a) (38 mg, 0.108 mmol) in DCM (2 mL), mCPBA (85 mg, 55%) was added and allowed to stir for 3 h. The reaction mixture was then partitioned between water and DCM and the organic layer was washed with brine. Following concentration the residue was purified by column chromatography using silica gel (40% EtOAc/Hexane) to get 14a as white powder.

6-(2,4-dichlorophenyl)-8-methyl-2-(methylsulfonyl)pyrido[2,3-d]pyrimidin-7(8H)-one (14a)

Yield 63%, white solid; $^1$H NMR (400 MHz, CDCl$_3$) δ (ppm) 9.01 (s, 1H), 7.82 (s, 1H), 7.53 (d, J=1.8 Hz, 1H), 7.36 (dd, J=8.2, 2.3 Hz, 1H), 7.31 (d, J=8.2 Hz, 1H), 3.89 (s, 3H), 3.43 (s, 3H). $^{13}$C NMR (100 MHz, CDCl$_3$) δ 164.74, 161.01, 157.38, 155.18, 136.0, 135.42, 134.32, 134.03, 132.11, 132.05, 131.01, 127.44, 114.90, 39.32, 29.39.

6-(2-chlorophenyl)-8-methyl-2-(methylsulfonyl)pyrido[2,3-d]pyrimidin-7(8H)-one (14b)

Yield 45%, white solid; $^1$H NMR (400 MHz, CDCl$_3$) δ (ppm) 9.00 (s, 1H), 7.82 (s, 1H), 7.48 (d, J=7.2 Hz, 1H), 7.42-7.32 (m, 3H), 3.87 (s, 3H), 3.42 (s, 3H). $^{13}$C NMR (100 MHz, CDCl$_3$) δ 164.51, 161.17, 157.31, 155.12, 136.52, 133.79, 133.71, 133.44, 131.20, 130.63, 130.03, 127.04, 115.06, 39.45, 29.31.

8-methyl-2-(methylsulfonyl)-6-phenylpyrido[2,3-d]pyrimidin-7(8H)-one (14c)

Yield 54%, light yellow solid; $^1$H NMR (400 MHz, CDCl$_3$) δ (ppm) 9.00 (s, 1H), 7.85 (s, 1H), 7.70-7.66 (m, 2H), 7.49-7.44 (m, 3H), 3.88 (s, 3H), 3.42 (s, 3H). $^{13}$C NMR (100 MHz, CDCl$_3$) δ 164.02, 161.87, 156.91, 154.62, 137.62, 134.54, 131.150, 129.73, 129.0, 128.64, 115.60, 39.34, 29.30.

6-(4-chlorophenyl)-8-methyl-2-(methylsulfonyl)pyrido[2,3-d]pyrimidin-7(8H)-one (14d)

Yield 72%, white solid; $^1$H NMR (400 MHz, CDCl$_3$) δ (ppm) 9.01 (s, 1H), 7.86 (s, 1H), 7.652 (d, J=8.8 Hz, 2H), 7.445 (d, J=8.8 Hz, 2H), 3.89 (s, 3H), 3.43 (s, 3H). $^{13}$C NMR (100 MHz, CDCl$_3$) δ 164.25, 161.66, 157.04, 154.67, 136.40, 135.91, 132.91, 131.17, 130.35, 128.90, 115.43, 39.32, 29.37.

6-(4-(tert-butyl)phenyl)-8-methyl-2-(methylsulfonyl)pyrido[2,3-d]pyrimidin-7(8H)-one (14e)

Yield 81%, white solid; $^1$H NMR (400 MHz, CDCl$_3$) δ (ppm) 8.98 (s, 1H), 7.84 (s, 1H), 7.63 (d, J=8.8 Hz, 2H), 7.47 (d, J=8 Hz, 2H), 3.86 (s, 3H), 3.40 (s, 3H), 1.34 (s, 9H). $^{13}$C NMR (100 MHz, CDCl$_3$) δ 163.80, 161.99, 156.86, 154.47, 153.03, 137.37, 131.67, 130.63, 128.74, 125.63, 115.72, 39.36, 34.91, 31.33, 29.27.

6-(2,6-dichlorophenyl)-8-methyl-2-(methylsulfonyl) pyrido[2,3-d]pyrimidin-7(8H)-one (14f)

Yield 93%, white solid; $^1$H NMR (600 MHz, CDCl$_3$) δ (ppm) 9.03 (s, 1H), 7.77 (s, 1H), 7.45 (d, J=7.8 Hz, 2H), 7.35 (t, J=7.8, 9 Hz, 1H), 3.91 (s, 3H), 3.44 (s, 3H).

6-(2,3-dichlorophenyl)-8-methyl-2-(methylsulfonyl) pyrido[2,3-d]pyrimidin-7(8H)-one (14g)

Yield 65%, light yellow solid; 41 NMR (400 MHz, CDCl$_3$) δ (ppm) 9.02 (s, 1H), 7.82 (s, 1H), 7.57 (dd, J=8, 2 Hz, 1H), 7.34-7.25 (m, 2H), 3.90 (s, 3H), 3.44 (s, 3H). $^{13}$C NMR (100 MHz, CDCl$_3$) δ 164.75, 160.90, 157.41, 155.23, 136.46, 135.86, 133.94, 133.73, 132.07, 131.40, 129.24, 127.65, 114.92, 39.34, 29.39.

6-(2-chloro-4-fluorophenyl)-8-methyl-2-(methylsulfonyl)pyrido[2,3-d]pyrimidin-7(8H)-one (14h)

Yield 40%, white solid; $^1$H NMR (400 MHz, CDCl$_3$) δ (ppm) 9.02 (s, 1H), 7.83 (s, 1H), 7.37 (dd, J=14, 6.6 Hz, 1H), 7.29-7.26 (m, 1H), 7.11 (td, J=8, 2.4 Hz, 1H), 3.90 (s, 3H), 3.44 (s, 3H). $^{13}$C NMR (150 MHz, CDCl$_3$) δ 164.69, 163.74, 162.06, 161.17, 157.30, 155.16, 135.53, 134.58, 134.51, 134.06, 132.47, 132.41, 129.76, 117.70, 117.54, 114.94, 114.56, 114.42, 39.32, 29.37. DEPT δ 157.31, 134.06, 132.48, 132.41, 117.71, 117.54, 114.56, 114.43, 39.32, 29.37.

8-ethyl-2-(methylsulfonyl)-6-phenylpyrido[2,3-d] pyrimidin-7(8H)-one (14i)

Yield 55%, white solid; 41 NMR (400 MHz, CDCl$_3$) δ (ppm) 9.01 (s, 1H), 7.85 (s, 1H), 7.72-7.67 (m, 2H), 7.52-7.44 (m, 3H), 4.60 (q, J=7.0 Hz, 2H), 3.42 (s, 3H), 1.40 (t, J=7.1 Hz, 3H).

8-(2-hydroxyethyl)-2-(methylsulfonyl)-6-phenylpyrido[2,3-d]pyrimidin-7(8H)-one (14j)

Yield 81%, light yellow solid which was used without purification in next step.

6-(2,6-dichlorophenyl)-8-(2-methoxyethyl)-2-(methylsulfonyl)pyrido[2,3-d]pyrimidin-7(8H)-one (14k)

Yield 58%, white solid; 41 NMR (400 MHz, CDCl$_3$) δ (ppm) 9.02 (s, 1H), 7.78 (s, 1H), 7.43 (d, J=8.2 Hz, 2H), 7.33 (dd, J=8.8, 7.2 Hz, 1H), 4.79 (t, J=5.6 Hz, 2H), 3.80 (t, J=5.6 Hz, 2H), 3.41 (s, 3H), 3.36 (s, 3H). $^{13}$C NMR (100 MHz, CDCl$_3$) δ 164.64, 160.21, 157.62, 155.39, 135.10, 134.58, 132.73, 130.87, 128.32, 114.87, 69.08, 58.97, 41.25, 39.42.

8-benzyl-6-(2,6-dichlorophenyl)-2-(methylsulfonyl) pyrido[2,3-d]pyrimidin-7(8H)-one (14l)

Yield 61%, white solid; 41 NMR (400 MHz, CDCl$_3$) δ (ppm) 9.01 (s, 1H), 7.78 (s, 1H), 7.59 (d, J=7.6 Hz, 2H), 7.45 (d, J=8 Hz, 2H), 7.39-7.24 (m, 4H), 5.73 (s, 2H), 3.33 (s, 3H). $^{13}$C NMR (100 MHz, CDCl$_3$) δ 164.58, 160.37, 157.60, 154.88, 135.84, 135.08, 134.92, 132.76, 130.92, 129.35, 128.76, 128.35, 128.19, 115.04, 45.49, 39.48.

6-(2,6-dichlorophenyl)-8-isobutyl-2-(methylsulfonyl)pyrido[2,3-d]pyrimidin-7(8H)-one (14m)

Yield 87%, white solid; $^1$H NMR (400 MHz, CDCl$_3$) δ (ppm) 9.03 (s, 1H), 7.77 (s, 1H), 7.43 (d, J=7.6 Hz, 2H), 7.33 (dd, J=9.0, 7.4 Hz, 1H), 4.40 (d, J=7.3 Hz, 2H), 3.41 (s, 3H), 2.37-2.27 (sep, J=6.8, 7.2 Hz, 1H), 0.98 (d, J=6.9 Hz, 6H). $^{13}$C NMR (100 MHz, CDCl$_3$) δ 164.67, 160.45, 157.70, 155.21, 135.04, 134.83, 134.71, 132.88, 130.84, 128.30, 114.80, 49.14, 39.27, 27.60, 20.27.

6-(4-chlorophenyl)-8-isobutyl-2-(methylsulfonyl) pyrido[2,3-d]pyrimidin-7(8H)-one (14n)

Yield 66%, light brown solid which was used without purification in next step.

6-(2,5-dichlorophenyl)-8-methyl-2-(methylsulfonyl) pyrido[2,3-d]pyrimidin-7(8H)-one (14O):

Yield 75%, white solid; $^1$H NMR (400 MHz, CDCl$_3$) δ (ppm) 9.02 (s, 1H), 7.83 (s, 1H), 7.46-7.47 (m, 1H), 7.39-7.36 (m, 2H), 3.89 (s, 3H), 3.44 (s, 3H). $^{13}$C NMR (100 MHz, CDCl$_3$) δ 164.84, 160.84, 157.46, 155.23, 135.36, 135.00, 134.11, 132.95, 131.89, 131.17, 131.11, 130.64, 114.83, 39.33, 29.40.

6-(4-((tert-butyldimethylsilyl)oxy)phenyl)-8-methyl-2-(methylthio)pyrido[2,3-d]pyrimidin-7(8H)-one (13p*)

To a solution of 13p (160 mg, 0.53 mmol) in DMF (2 mL), Imidazole (109 mg, 1.60 mmol) and DMAP (catalytic 3 mg) were added and the temperature was reduced to 0° C. TBDMSCl (121 mg, 0.80 mmol) in DMF (1 mL) was added to the above solution and the resulting mixture was stirred at rt overnight. Following completion, the reaction was partitioned between EtOAc and water and the organic layer was filtered, concentrated and purified by column chromatography using silica gel (5% EtOAc/DCM) to get 13p* (194 mg, 88%) as light yellow solid. $^1$H NMR (600 MHz, CDCl$_3$) δ (ppm) 8.64 (s, 1H), 7.66 (s, 1H), 7.57 (d, J=8.4 Hz, 2H), 6.89 (d, J=7.8 Hz, 2H), 3.81 (s, 3H), 2.65 (s, 3H), 0.99 (s, 9H), 0.22 (s, 6H).

6-(4-((tert-butyldimethylsilyl)oxy)phenyl)-8-methyl-2-(methylsulfonyl)pyrido[2,3-d]pyrimidin-7(8H)-one (14p)

Yield 64%, light yellow solid; $^1$H NMR (600 MHz, CDCl$_3$) δ (ppm) 8.96 (s, 1H), 7.80 (s, 1H), 7.60 (d, J=8.4 Hz, 2H), 6.88 (d, J=8.4 Hz, 2H), 3.85 (s, 3H), 3.39 (s, 3H), 0.98 (s, 9H), 0.21 (s, 6H). $^{13}$C NMR (150 MHz, CDCl$_3$) δ 163.62, 161.99, 157.25, 156.61, 154.28, 136.96, 130.41, 129.87, 127.53, 120.19, 115.76, 39.34, 29.22, 25.74, 18.32.

6-(2,6-dichlorophenyl)-2-(methylsulfonyl)-8-(3-(methylsulfonyl)benzyl)pyrido[2,3-d]pyrimidin-7 (8H)-one (14q)

Yield 79%, white powder; 41 NMR (500 MHz, CDCl$_3$) δ (ppm) 9.03 (s, 1H), 8.25 (s, 1H), 7.91 (d, J=8 Hz, 1H), 7.86 (d, J=8 Hz, 1H), 7.81 (s, 1H), 7.52 (t, J=7.5 Hz, 1H), 7.46 (d, J=7.5 Hz, 2H), 7.38-7.33 (m, 1H), 5.79 (s, 2H), 3.39 (s, 3H), 3.09 (s, 3H).

6-(2,6-dichlorophenyl)-2-(methylsulfonyl)-8-(4-(methylsulfonyl)benzyl)pyrido[2,3-d]pyrimidin-7(8H)-one (14r)

Yield 72%, white powder; $^1$H NMR (500 MHz, CDCl$_3$) δ (ppm) 9.03 (s, 1H), 7.89-7.81 (m, 5H), 7.46 (d, J=8 Hz, 2H), 7.38-7.35 (m, 1H), 3.37 (s, 3H), 3.01 (s, 3H).

6-(4-methoxyphenyl)-8-methyl-2-(methylsulfonyl)pyrido[2,3-d]pyrimidin-7(8H)-one (14s)

Yield 97%, yellow solid; $^1$H NMR (400 MHz, CDCl$_3$) δ (ppm) 8.98 (s, 1H), 7.80 (s, 1H), 7.68 (d, J=8.8 Hz, 2H), 6.98 (d, J=8.8 Hz, 2H), 3.88 (s, 3H), 3.86 (s, 3H), 3.42 (s, 3H).

4-(2-(diethylamino)ethoxy)aniline (15a)

To a solution of N,N-diethyl-2-(4-nitrophenoxy)ethanamine (490 mg, 2.06 mmol) in CH$_3$OH (10 mL) was added 10% Pd/C (125 mg) in excess and H2 (g) was passed through latex valve bladder for 4 h. The reaction mixture was then filtered through Celite and concentrated to afford 15a (412 mg, 96%) as brown viscous liquid. $^1$H NMR (400 MHz, CDCl$_3$) δ (ppm) 6.75-6.73 (m, 2H), 6.64-6.62 (m, 2H), 3.98 (t, J=6.4 Hz, 2H), 2.84 (t, J=6.4 Hz, 2H), 2.63 (q, J=7.2 Hz, 4H), 1.06 (t, J=7.2 Hz, 6H). $^{13}$C NMR (100 MHz, CDCl$_3$) δ 152.11, 140.03, 116.49, 115.68, 66.98, 51.88, 47.82, 11.80.

N-(4-(2-(diethylamino)ethoxy)phenyl)formamide (16a)

Method A: Formic acid (1 mL) was added to 15a (100 mg, 0.48 mmol) in round bottom flask containing molecular sieves. The reaction mixture was heated at 60° C. for 6 h and then partitioned between saturated solution of NaHCO$_3$ and EtOAc. The organic layer was then washed with brine solution and then concentrated to give 16a (90 mg, 79%) as brown viscous liquid which was used directly into next step without purification.

N-(4-(methylsulfonyl)phenyl)formamide (16b)

16b was prepared by method A where the reaction mixture was stirred at room temperature with overnight stirring. Yield 80%, white solid which was directly used in next step without purification.

N-(3-(methylsulfonyl)phenyl)formamide (16c)

16c was prepared by method A where the reaction mixture was stirred at room temperature with overnight stirring. Yield 80%, white solid; $^1$H NMR (400 MHz, DMSO-d6) δ (ppm) 10.64 (s, 1H), 8.40 (s, 1H), 8.28 (s, 1H), 7.89-7.86 (m, 1H), 7.67-7.63 (m, 2H), 3.24 (s, 3H). $^{13}$C NMR (100 MHz, DMSO-d6) δ 160.74, 141.95, 139.44, 130.80, 124.15, 122.51, 117.54, 44.08.

Preparation of (16d):

tert-Butyl 4-(3-nitrophenyl)piperazine-1-carboxylate (15d*)

To a solution of Boc anhydride (790 mg, 3.62 mmol) in DCM (10 mL), DMAP (60 mg, 0.49 mmol) was added and the solution was allowed to stir for 5 min 1-(3-nitrophenyl)piperazine (500 mg, 2.41 mmol) was then added to the above solution and allowed to stir for 20 h at room temperature. Following completion, the reaction mixture was concentrated and purified by column chromatography using silica gel (30% EtOAc/Hexane) to get 15d* (700 mg, 94%) as yellow solid. $^1$H NMR (400 MHz, CDCl$_3$) δ (ppm) 7.71-7.66 (m, 2H), 7.38 (t, J=8.2 Hz, 1H), 7.19-7.17 (m, 1H), 3.59 (t, J=5.2 Hz, 4H), 3.23 (t, J=5 Hz, 4H), 1.48 (s, 9H). $^{13}$C NMR (100 MHz, CDCl$_3$) δ 154.68, 151.83, 149.31, 129.90, 121.74, 114.33, 110.23, 80.30, 48.59, 28.49.

tert-Butyl 4-(3-aminophenyl)piperazine-1-carboxylate (15d)

To a solution of 15d* (700 mg, 2.27 mmol) in CH$_3$OH (15 mL) was added 10% Pd/C (200 mg) in excess and H2 (g) was passed through latex valve bladder for overnight. The reaction mixture was then filtered through celite and concentrated to afford 15d (600 mg, 95%) as brown viscous liquid which was used in next step without purification.

tert-Butyl 4-(3-formamidophenyl)piperazine-1-carboxylate (16d)

Method B: To a round bottom flask fitted with reflux condenser was added 15d (200 mg, 0.72 mmol) and ethyl formate (1.16 mL, 14.4 mmol). TEA (0.15 mL, 1.08 mmol) was added to the above mixture and heated under reflux. After overnight stirring, solvent was evaporated, and the mixture was dissolved in DCM and extracted with water and brine solution. The extract was concentrated and purified by column chromatography using silica gel (30% EtOAc/Hexane) to get 16d (100 mg, 45%) as colourless liquid.

N-(pyridin-2-yl)formamide (16e)

Method C: Formic acid (0.28 mL, 7.43 mmol) was added dropwise to acetic anhydride (0.60 mL, 6.37 mmol) maintained at 0° C. The mixture was heated to reflux at 60° C. for 2 h to generate acetic formic anhydride reagent. The mixture was cooled to room temperature and 2 mL THF was added. 15e (200 mg, 2.12 mmol) dissolved in THF (1 mL) was added to acetic formic anhydride mixture and refluxed for another 2 h. Solvent was evaporated after completion, extracted in EtOAc/water system. Extract was concentrated and purified by column chromatography using silica gel (3% MeOH/DCM) to get 16e (173 mg, 67%) as white solid.

N-(pyridin-3-yl)formamide (16f)

16f was prepared by method C: Yield 75%, white solid.

General Procedure for Preparation of 17a-s

Figure 17:
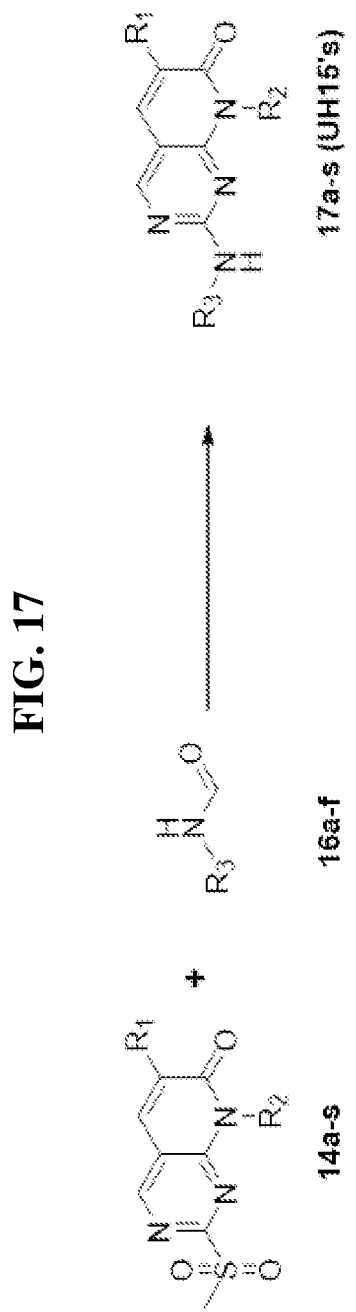
FIG. 17 shows a synthetic scheme for exemplary inhibitors of RIPK3, in accordance with preferred embodiments.
Figure 18:
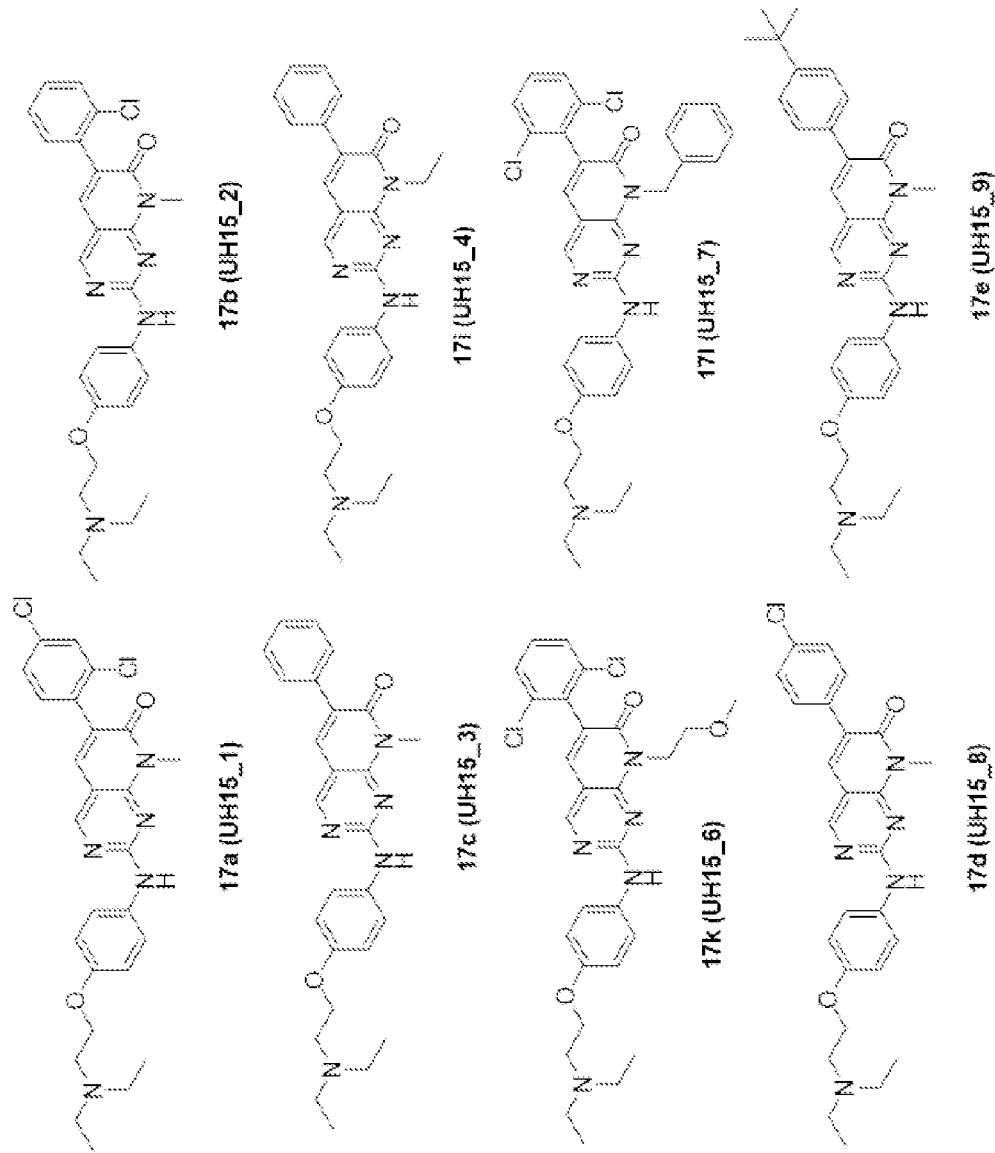
FIGS. 18-21 show structures for exemplary inhibitors of RIPK3, in accordance with preferred embodiments.
Figure 19:
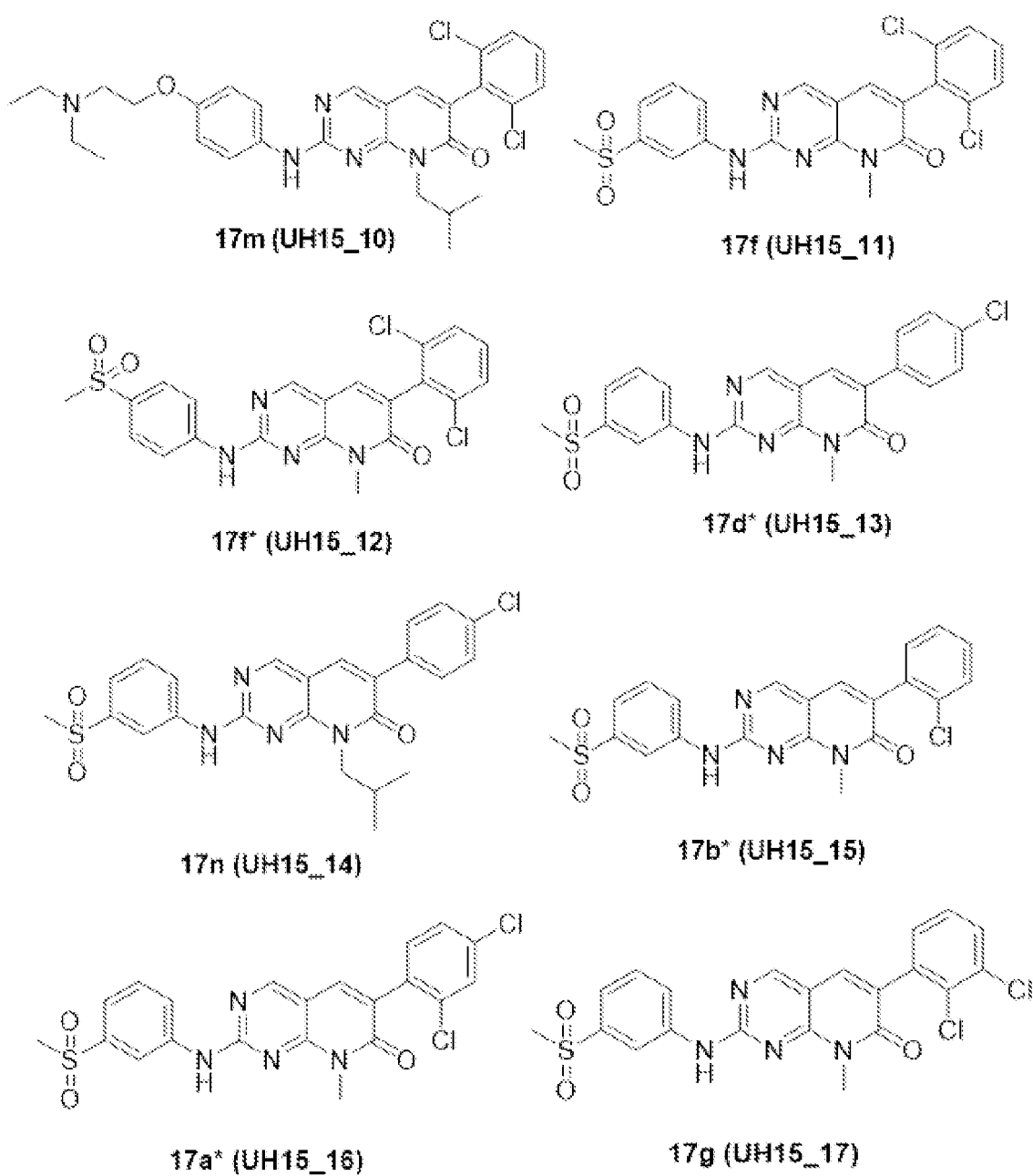
Figure 20:
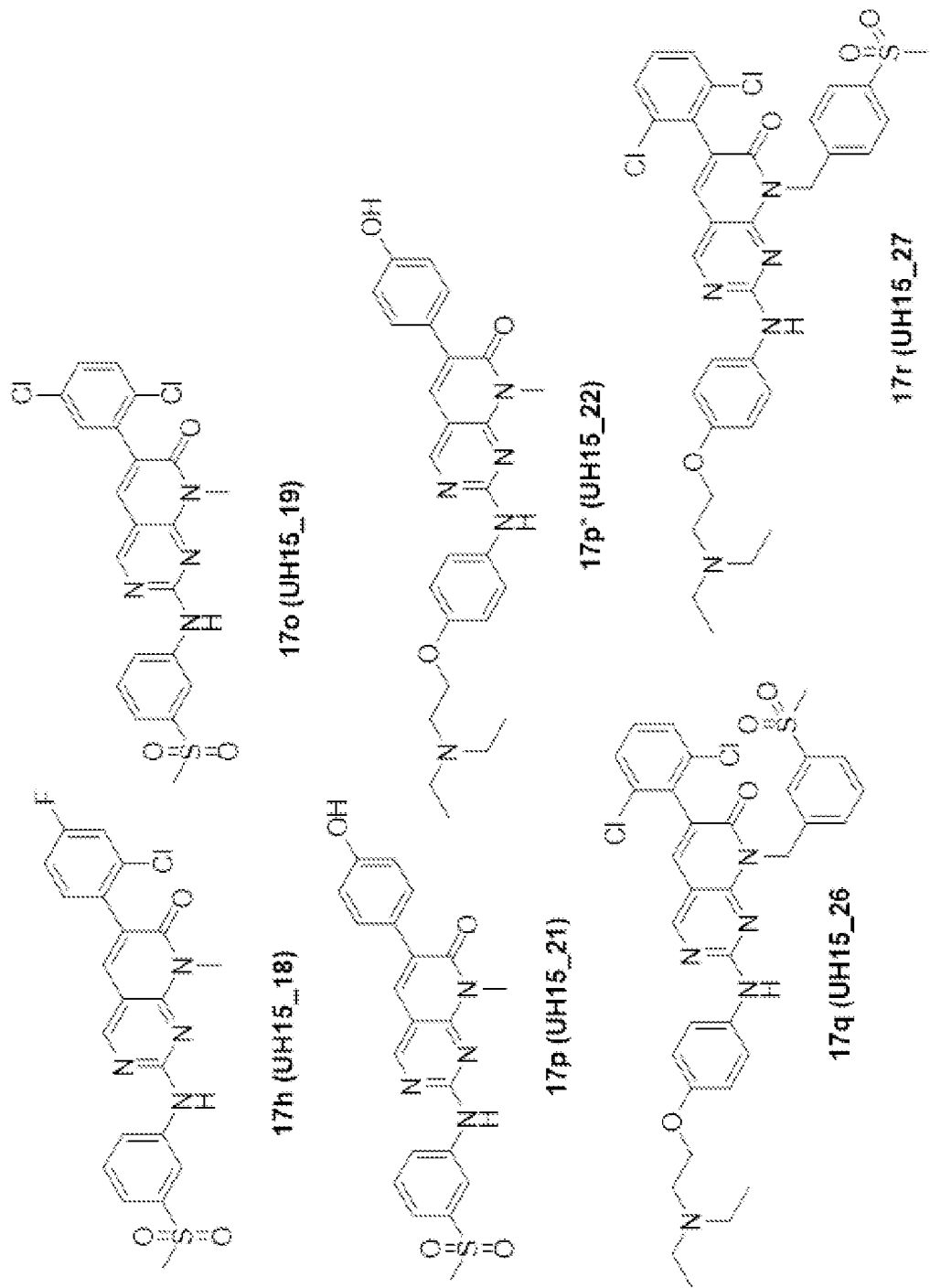
Figure 21:
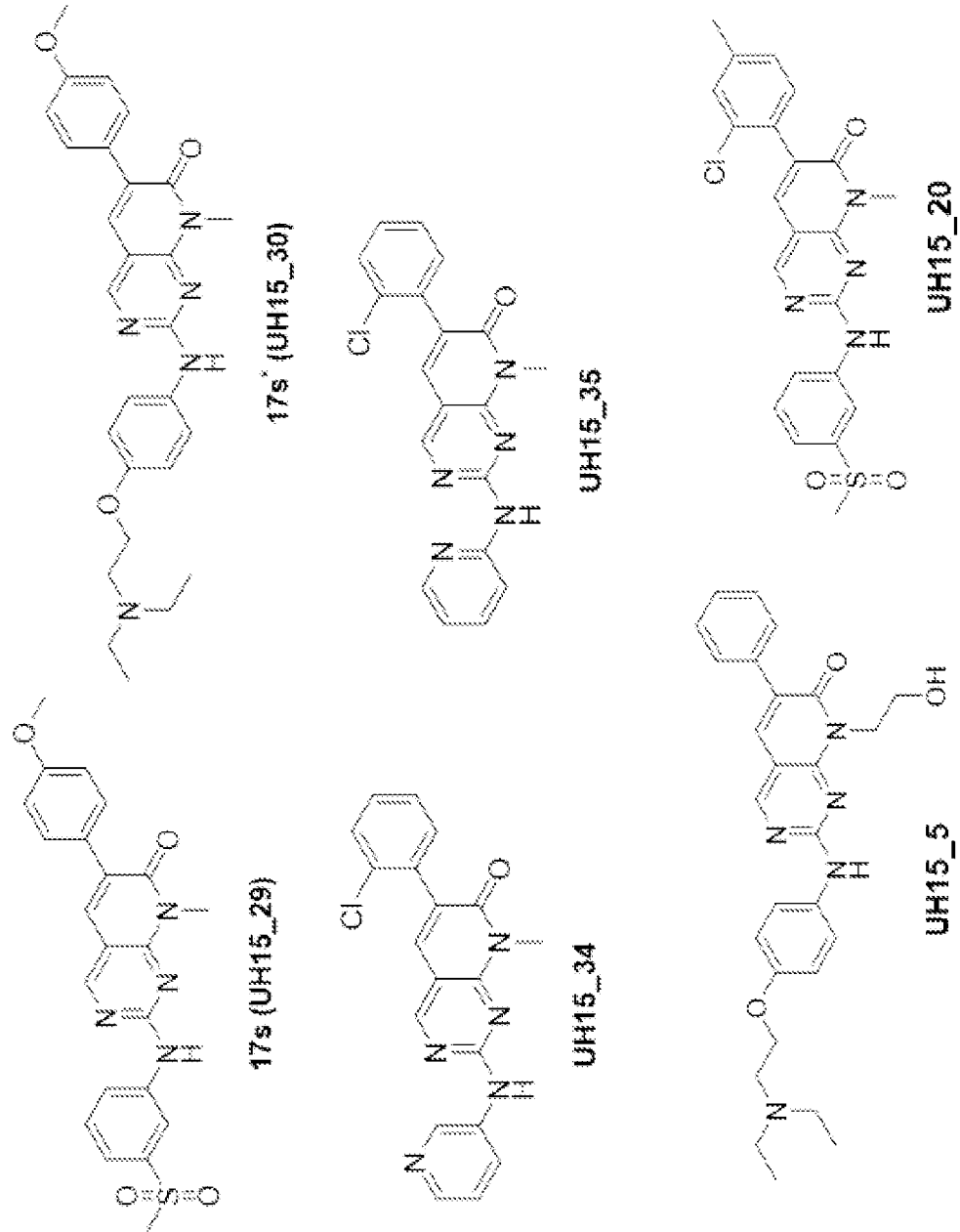

FIG. 17 shows a synthetic scheme for exemplary inhibitors of RIPK3, compounds 17a-s (UH15's). FIGS. 18-21 show structures for exemplary inhibitors of RIPK3, in accordance with preferred embodiments.

To a solution of 16a (30 mg, 0.13 mmol) in THF (0.5 mL) and DMF (0.5 mL) was added 60% NaH (8 mg, 0.33 mmol) at 0° C. and the mixture was stirred for 30 min at rt under argon. The mixture was then cooled to 0° C. and 14a (25 mg, 0.06 mmol) was added and stirred for 2 h at rt. The reaction mixture was quenched by addition of ice and NaOH (0.5 mL, 2N) solution and then partitioned between water and EtOAc. Following filtration through anhydrous Na$_2$SO$_4$ and concentration, the crude mixture was purified by column chromatography using silica gel (5% MeOH/DCM) to get 17a (UH15_1) as yellow solid.

6-(2,4-dichlorophenyl)-2-((4-(2-(diethylamino)ethoxy)phenyl)amino)-8-methylpyrido[2,3-d]pyrimidin-7(8H)-one (17a) UH15_1

Yield 74%, yellow solid; 41 NMR (400 MHz, CDCl$_3$) δ (ppm) 8.54 (s, 1H), 7.55 (d, J=7.8 Hz, 4H), 7.49 (s, 1H), 7.30 (s, 2H), 6.94 (d, J=9.2 Hz, 2H), 4.07 (t, J=6.2 Hz, 2H), 3.75 (s, 3H), 2.89 (t, J=6.2 Hz, 2H), 2.65 (q, J=7.2 Hz, 4H), 1.08 (t, J=7.1 Hz, 6H). $^{13}$C NMR (100 MHz, CDCl$_3$) δ 162.16, 159.40, 158.60, 155.90, 155.59, 135.75, 134.69, 134.66, 133.75, 132.57, 131.55, 129.68, 127.09, 126.51, 122.05, 114.97, 106.38, 66.92, 51.82, 47.90, 28.62, 11.90. HRMS m/z calculated for C$_{26}$H$_{27}$Cl$_2$N$_5$O$_2$ [M+H]$^+$: 512.1615; found 512.1626; purity 95.6% (t$_R$ 21.56 min).

6-(2-chlorophenyl)-2-((4-(2-(diethylamino)ethoxy)phenyl)amino)-8-methylpyrido[2,3-d]pyrimidin-7(8H)-one (17b) UH15_2

16a (40 mg, 0.17 mmol) and 14b (89 mg, 0.25 mmol) were used to make 17b.

Yield 62%, yellow solid; $^1$H NMR (400 MHz, CDCl$_3$) δ (ppm) 8.53 (s, 1H), 7.55 (d, J=6.9 Hz, 3H), 7.49-7.44 (m, 1H), 7.38-7.28 (m, 3H), 6.94 (d, J=8.7 Hz, 2H), 4.07 (t, J=6.4 Hz, 2H), 3.75 (s, 3H), 2.89 (t, J=6.2 Hz, 2H), 2.65 (q, J=7.2 Hz, 4H), 1.08 (t, J=7.3 Hz, 6H). $^{13}$C NMR (100 MHz, CDCl$_3$) δ 162.34, 159.34, 158.47, 155.86, 155.46, 135.49, 135.24, 133.91, 131.74, 129.80, 129.55, 127.79, 126.77, 122.02, 114.95, 106.51, 66.88, 51.83, 47.89, 28.61, 11.90. HRMS m/z calculated for C$_{26}$H$_{28}$ClN$_5$O$_2$ [M+H]$^+$: 478.2004; found 478.2007; purity 99.15% (t$_R$ 19.93 min).

2-((4-(2-(diethylamino)ethoxy)phenyl)amino)-8-methyl-6-phenylpyrido[2,3-d]pyrimidin-7(8H)-one (17c) UH15_3

16a (40 mg, 0.17 mmol) and 14c (20 mg, 0.06 mmol) were used to make 17c.

Yield 64%, yellow solid; $^1$H NMR (400 MHz, CDCl$_3$) δ (ppm) 8.55 (s, 1H), 7.68-7.63 (m, 3H), 7.56 (d, J=8.7 Hz, 2H), 7.45-7.33 (m, 3H), 6.94 (td, J=6.2, 4.1 Hz, 2H), 4.12 (t, J=6.2 Hz, 2H), 3.77 (s, 3H), 2.96 (t, J=6.2 Hz, 2H), 2.73 (q, J=7.2 Hz, 4H), 1.13 (t, J=7.1 Hz, 6H). $^{13}$C NMR (100 MHz, CDCl$_3$) δ 162.96, 159.06, 158.29, 155.43, 155.21, 136.22, 133.30, 131.90, 129.22, 128.88, 128.34, 128.18, 121.90, 114.97, 107.13, 66.44, 51.70, 47.81, 28.60, 11.51. HRMS m/z calculated for C$_{26}$H$_{29}$N$_5$O$_2$ [M+H]$^+$: 444.2394; found 444.2397; purity 99.4% (t$_R$ 19.75 min).

2-((4-(2-(diethylamino)ethoxy)phenyl)amino)-8-ethyl-6-phenylpyrido[2,3-d]pyrimidin-7(8H)-one (17i) UH15_4

16a (30 mg, 0.13 mmol) and 14i (40 mg, 0.12 mmol) were used to make 17i.

Yield 54%, yellow solid; $^1$H NMR (400 MHz, CDCl$_3$) δ (ppm) 8.56 (s, 1H), 7.67 (d, J=3.6 Hz, 2H), 7.64 (s, 1H), 7.56 (d, J=9.2 Hz, 2H), 7.46-7.30 (m, 3H), 6.94 (d, J=8.8 Hz, 2H), 4.50 (q, J=7.0 Hz, 2H), 4.07 (t, J=6.2 Hz, 2H), 2.90 (t, J=6.2 Hz, 2H), 2.66 (q, J=7.0 Hz, 4H), 1.38 (t, J=7.1 Hz, 3H), 1.09 (t, J=7.1 Hz, 6H). HRMS m/z calculated for C$_{27}$H$_{31}$N$_5$O$_2$ [M+H]$^+$: 458.2551; found 458.2556. purity 95.8% (t$_R$ 20.50 min).

2-((4-(2-(diethylamino)ethoxy)phenyl)amino)-8-(2-hydroxyethyl)-6-phenylpyrido[2,3-d]pyrimidin-7(8H)-one (17j) UH15_5

16a (30 mg, 0.13 mmol) and 14j (44 mg, 0.13 mmol) were used to make 17j.

Yield 33%, yellow solid; $^1$H NMR (600 MHz, CD$_3$OD) δ (ppm) 8.70 (s, 1H), 7.88 (s, 1H), 7.68 (d, J=7.8 Hz, 2H), 7.64 (d, J=7.8 Hz, 2H), 7.41 (t, J=7.5 Hz, 2H), 7.35 (d, J=7.5 Hz, 1H), 7.01 (d, J=9 Hz, 2H), 4.63 (t, J=6.3 Hz, 2H), 4.27 (t, J=4.8 Hz, 2H), 3.89 (t, J=6.6 Hz, 2H), 3.37-3.34 (m, 2H), 3.13-3.12 (m, 4H), 1.28 (t, J=7.2 Hz, 6H). HRMS m/z calculated for C$_{27}$H$_{31}$N$_5$O$_3$ [M+H]$^+$: 474.2500; found 474.2504.

6-(2,6-dichlorophenyl)-2-((4-(2-(diethylamino)ethoxy)phenyl)amino)-8-(2-methoxyethyl)pyrido[2,3-d]pyrimidin-7(8H)-one (17k) UH15_6

16a (22 mg, 0.09 mmol) and 14k (20 mg, 0.05 mmol) were used to make 17k.

Yield 61%, yellow solid; $^1$H NMR (400 MHz, CDCl$_3$) δ (ppm) 8.56 (s, 1H), 7.56-7.52 (m, 3H), 7.41 (d, J=8 Hz, 3H), 7.28-7.24 (m, 1H), 6.94 (d, J=9.2 Hz, 2H), 4.67 (t, J=6 Hz, 2H), 4.07 (t, J=6.4 Hz, 2H), 3.76 (t, J=6.2 Hz, 2H), 3.37 (s, 3H), 2.90 (t, J=6.2 Hz, 2H), 2.66 (q, J=7.2 Hz, 4H), 1.63 (t, J=7.2 Hz, 6H). $^{13}$C NMR (100 MHz, CDCl$_3$) δ 161.25, 159.52, 158.79, 155.92, 155.61, 136.66, 135.81, 134.23, 131.56, 129.92, 128.11, 125.75, 122.23, 114.94, 106.44, 69.09, 66.87, 58.95, 51.82, 47.89, 40.44, 11.89. HRMS m/z calculated for C$_{28}$H$_{31}$Cl$_2$N$_5$O$_3$ [M+H]$^+$: 556.1877; found 556.1879; purity 97.4% (t$_R$ 20.76 min).

8-benzyl-6-(2,6-dichlorophenyl)-2-((4-(2-(diethylamino)ethoxy)phenyl)amino)pyrido[2,3-d]pyrimidin-7(8H)-one (17l) UH15_7

16a (16 mg, 0.07 mmol) and 14l (32 mg, 0.07 mmol) were used to make 17l.

Yield 68%, yellow solid; $^1$H NMR (400 MHz, CDCl$_3$) δ (ppm) 8.54 (s, 1H), 7.53 (s, 1H), 7.44-7.19 (m, 10H), 6.91 (d, J=9.2 Hz, 2H), 5.60 (s, 2H), 4.08 (t, J=6.4 Hz, 2H), 2.90 (t, J=6.2 Hz, 2H), 2.67 (q, J=7.2 Hz, 4H), 1.09 (t, J=7.3 Hz, 6H). $^{13}$C NMR (100 MHz, CDCl$_3$) δ 161.44, 159.74, 158.78, 155.87, 155.74, 137.01, 136.72, 135.83, 134.30, 131.30, 129.95, 128.41, 128.22, 128.13, 127.32, 125.88, 123.12, 114.91, 106.45, 66.86, 51.83, 47.90, 44.47, 11.87. HRMS m/z calculated for C$_{32}$H$_{31}$Cl$_2$N$_5$O$_2$ [M+H]$^+$: 588.1928; found 588.1932; purity 98.4% (t$_R$ 22.59 min).

6-(4-chlorophenyl)-2-((4-(2-(diethylamino)ethoxy)phenyl)amino)-8-methylpyrido[2,3-d]pyrimidin-7(8H)-one (17d) UH15_8

16a (19 mg, 0.08 mmol) and 14d (28 mg, 0.08 mmol) were used to make 17d.

Yield 45%, yellow solid; $^1$H NMR (400 MHz, CDCl$_3$) δ (ppm) 8.56 (s, 1H), 7.62-7.60 (m, 3H), 7.54 (d, J=8.8 Hz, 2H), 7.38 (d, J=8.8 Hz, 2H), 6.94 (d, J=8.8 Hz, 2H), 4.07 (t, J=6.2 Hz, 2H), 3.75 (s, 3H), 2.89 (t, J=6.2 Hz, 2H), 2.66 (q, J=7.2 Hz, 4H), 1.08 (t, J=7.3 Hz, 6H). $^{13}$C NMR (100 MHz, CDCl$_3$) δ 162.73, 159.14, 158.38, 155.46, 155.38, 134.62, 134.05, 133.31, 131.73, 130.15, 128.47, 127.83, 121.96, 114.98, 106.95, 66.64, 51.74, 47.81, 28.60, 11.65. HRMS m/z calculated for C$_{26}$H$_{28}$ClN$_5$O$_2$ [M+H]$^+$: 478.2004; found 478.2010; purity 96.5% (t$_R$ 21.33 min).

6-(4-(tert-butyl)phenyl)-2-((4-(2-(diethylamino)ethoxy)phenyl)amino)-8-methylpyrido[2,3-d]pyrimidin-7(8H)-one (17e) UH15_9

16a (32 mg, 0.14 mmol) and 14e (50 mg, 0.14 mmol) were used to make 17e.

Yield 58%, yellow solid; $^1$H NMR (400 MHz, CDCl$_3$) δ (ppm) 8.54 (s, 1H), 7.63-7.59 (m, 3H), 7.56 (d, J=8.8 Hz, 2H), 7.45 (d, J=8.4 Hz, 2H), 6.94 (d, J=8.8 Hz, 2H), 4.07 (t, J=6.4 Hz, 2H), 3.76 (s, 3H), 2.89 (t, J=6.4 Hz, 2H), 2.65 (q, J=7.2 Hz, 4H), 1.35 (s, 9H), 1.08 (t, J=7.1 Hz, 6H). $^{13}$C NMR (100 MHz, CDCl$_3$) δ 163.08, 159.02, 158.15, 155.41, 155.36, 151.19, 133.27, 132.81, 131.82, 129.11, 128.52, 125.34, 121.87, 114.96, 107.18, 66.91, 51.84, 47.91, 34.74, 31.41, 28.59, 11.92. HRMS m/z calculated for C$_{30}$H$_{37}$N$_5$O$_2$ [M+H]$^+$: 500.3020; found 500.3028; purity 99.8% (t$_R$ 23.44 min).

6-(2,6-dichlorophenyl)-2-((4-(2-(diethylamino)ethoxy)phenyl)amino)-8-isobutylpyrido[2,3-d]pyrimidin-7(8H)-one (17m) UH15_10

16a (23 mg, 0.09 mmol) and 14m (42 mg, 0.09 mmol) were used to make 17m

Yield 36%, yellow solid; $^1$H NMR (400 MHz, CDCl$_3$) δ (ppm) 8.55 (s, 1H), 7.84 (s, 1H), 7.58 (d, J=9.2 Hz, 2H), 7.50 (s, 1H), 7.40 (d, J=7.8 Hz, 2H), 7.25 (dd, J=8.5, 7.6 Hz, 1H), 6.94 (d, J=9.2 Hz, 2H), 4.29 (d, J=7.3 Hz, 2H), 4.08 (t, J=6.2 Hz, 2H), 2.91 (t, J=6.2 Hz, 2H), 2.67 (q, J=7.0 Hz, 4H), 2.42-2.32 (sep, J=6.8, 7.2 Hz, 1H), 1.09 (t, J=7.1 Hz, 6H), 0.98 (d, J=6.4 Hz, 6H). $^{13}$C NMR (100 MHz, CDCl$_3$) δ 161.60, 159.35, 158.63, 155.95, 155.43, 136.28, 135.79, 134.45, 131.81, 129.86, 128.08, 125.95, 121.97, 114.85, 106.32, 66.83, 51.82, 48.30, 47.90, 27.43, 20.36, 11.83. HRMS m/z calculated for C$_{29}$H$_{33}$Cl$_2$N$_5$O$_2$ [M+H]$^+$: 554.2084; found 554.2085.

6-(2,6-dichlorophenyl)-8-methyl-2-((3-(methylsulfonyl)phenyl)amino)pyrido[2,3-d]pyrimidin-7(8H)-one (17f) UH15_11

16c (21 mg, 0.11 mmol) and 14f (20 mg, 0.05 mmol) were used to make 17f.

Yield 92%, white solid; 41 NMR (400 MHz, CDCl$_3$) δ (ppm) 8.69 (d, J=14.2 Hz, 2H), 8.23 (s, 1H), 7.83 (d, J=8 Hz, 1H), 7.66 (d, J=7.2 Hz, 1H), 7.61-7.55 (m, 2H), 7.41 (8 Hz, 2H), 7.31-7.25 (m, 1H), 3.86 (s, 3H), 3.11 (s, 3H). $^{13}$C NMR (100 MHz, CDCl$_3$) δ 161.38, 158.67, 158.58, 155.91, 141.45, 140.02, 136.19, 135.69, 134.00, 130.18, 130.15, 128.15, 127.16, 124.08, 121.57, 118.06, 107.33, 44.63, 28.98. HRMS m/z calculated for C$_{21}$H$_{16}$Cl$_2$N$_4$O$_3$S [M+H]$^+$: 475.0393; found 475.0393. purity 98.2% (t$_R$ 22.98 min).

6-(2,6-dichlorophenyl)-8-methyl-2-((4-(methylsulfonyl)phenyl)amino)pyrido[2,3-d]pyrimidin-7(8H)-one (17f*) UH15_12

16b (11 mg, 0.05 mmol) and 14f (10 mg, 0.03 mmol) were used to make 17f*.

Yield 75%, white powder; 41 NMR (400 MHz, CDCl$_3$) δ (ppm) 8.67 (s, 1H), 7.99-7.91 (m, 4H), 7.78 (s, 1H), 7.79 (s, 1H), 7.42 (d, J=7.8 Hz, 2H), 7.32-7.28 (m, 1H), 3.83 (s, 3H), 3.09 (s, 3H). $^{13}$C NMR (100 MHz, CDCl$_3$) δ 161.29, 158.52, 158.48, 155.90, 143.77, 136.11, 135.66, 134.06, 133.90, 130.21, 128.99, 128.18, 127.55, 119.04, 107.69, 44.90, 28.89. HRMS m/z calculated for C$_{21}$H$_{16}$Cl$_2$N$_4$O$_3$S [M+H]$^+$: 475.0393; found 475.0397; purity 97.6% (t$_R$ 22.92 min).

6-(4-chlorophenyl)-8-methyl-2-((3-(methylsulfonyl)phenyl)amino)pyrido[2,3-d]pyrimidin-7(8H)-one (17d*) UH15_13

16c (29 mg, 0.15 mmol) and 14d (26 mg, 0.07 mmol) were used to make 17d*.

Yield 61%, light yellow powder; $^1$H NMR (400 MHz, DMSO-d6) δ (ppm) 10.61 (s, 1H), 8.91 (s, 1H), 8.79 (s, 1H), 8.12 (s, 1H), 7.96 (d, J=8 Hz, 1H), 7.74 (d, J=8.8 Hz, 2H), 7.67-7.56 (m, 2H), 7.51 (d, J=8.8 Hz, 2H), 3.71 (s, 3H), 3.23 (s, 3H). HRMS m/z calculated for C$_{21}$H$_{17}$ClN$_4$O$_3$S [M+H]$^+$: 441.0783; found 441.0781.

6-(4-chlorophenyl)-8-isobutyl-2-((3-(methylsulfonyl)phenyl)amino)pyrido[2,3-d]pyrimidin-7(8H)-one (17n) UH15_14

16c (15 mg, 0.07 mmol) and 14n (20 mg, 0.05 mmol) were used to make 17n.

Yield 33%, light yellow solid; $^1$H NMR (400 MHz, CDCl$_3$) δ (ppm) 8.66 (s, 1H), 8.32 (t, J=1.8 Hz, 1H), 8.05 (d, J=8.2 Hz, 1H), 7.74 (s, 1H), 7.71-7.56 (m, 5H), 7.41 (d, J=8.8 Hz, 2H), 4.38 (d, J=7.2 Hz, 2H), 3.11 (s, 3H), 2.40-2.30 (sep, J=6.8, 8.4 Hz, 1H), 0.99 (d, J=6.4 Hz, 6H). HRMS m/z calculated for C$_{24}$H$_{23}$ClN$_4$O$_3$S [M+H]$^+$: 483.1252; found 483.1261.

6-(2-chlorophenyl)-8-methyl-2-((3-(methylsulfonyl)phenyl)amino)pyrido[2,3-d]pyrimidin-7(8H)-one (17b*) UH15_15

16c (34 mg, 0.17 mmol) and 14b (50 mg, 0.14 mmol) were used to make 17b*.

Yield 72%, white solid; $^1$H NMR (500 MHz, CDCl$_3$) δ (ppm) 8.71 (s, 1H), 8.65 (s, 1H), 7.79 (d, J=8 Hz, 2H), 7.65 (t, J=9 Hz, 2H), 7.58 (t, J=7.8 Hz, 1H), 7.50-7.47 (m, 1H), 7.38-7.32 (m, 3H), 3.85 (s, 3H), 3.10 (s, 3H). HRMS m/z calculated for C$_{21}$H$_{17}$ClN$_4$O$_3$S [M+H]$^+$: 441.0783; found 441.0784; purity 98.1% (t$_R$ 22.36 min).

6-(2,4-dichlorophenyl)-8-methyl-2-((3-(methylsulfonyl)phenyl)amino)pyrido[2,3-d]pyrimidin-7(8H)-one (17a*) UH15_16

16c (8 mg, 0.04 mmol) and 14a (12 mg, 0.03 mmol) were used to make 17a*.

Yield 63%, light yellow solid; $^1$H NMR (500 MHz, CDCl$_3$) δ (ppm) 8.70 (s, 1H), 8.65 (s, 1H), 7.78 (d, J=6.5 Hz, 2H), 7.67-7.56 (m, 3H), 7.50 (s, 1H), 7.32 (s, 2H), 3.84 (s, 3H), 3.10 (s, 3H). $^{13}$C NMR (125 MHz, CDCl$_3$) δ 161.97, 158.59, 158.56, 155.76, 141.56, 139.89, 135.45, 134.94, 134.64, 133.43, 132.49, 130.20, 129.75, 128.05, 127.18, 123.96, 121.65, 117.99, 107.38, 44.60, 28.97. HRMS m/z calculated for C$_{21}$H$_{16}$Cl$_2$N$_4$O$_3$S [M+H]$^+$: 475.0393; found 475.0400; purity 99.5% (t$_R$ 24.04 min).

6-(2,3-dichlorophenyl)-8-methyl-2-((3-(methylsulfonyl)phenyl)amino)pyrido[2,3-d]pyrimidin-7(8H)-one (17g) UH15_17

16c (16 mg, 0.08 mmol) and 14g (25 mg, 0.06 mmol) were used to make 17g.

Yield 68%, light yellow solid; 41 NMR (600 MHz, DMSO-d6) δ (ppm) 10.68 (s, 1H), 8.93 (s, 1H), 8.81 (s, 1H), 8.00 (m, 2H), 7.74 (d, J=7.8 Hz, 1H), 7.67 (t, J=8.1 Hz, 1H), 7.624 (d, J=8.4 Hz, 1H), 7.49 (t, J=7.8 Hz, 1H), 7.44 (d, J=7.8 Hz, 1H), 3.73 (s, 3H), 3.27 (s, 3H). $^{13}$C NMR (150 MHz, DMSO-d6) δ 161.41, 159.87, 159.18, 155.60, 141.87, 141.02, 138.53, 136.36, 132.29, 131.90, 131.03, 130.75, 130.39, 128.68, 127.61, 124.39, 120.95, 117.61, 106.87, 44.19, 28.75. HRMS m/z calculated for $C_{21}H_{16}Cl_2N_4O_3S$ [M+H]$^+$: 475.0393; found 475.0397; purity 98.5% ($t_R$ 23.50 min).

6-(2-chloro-4-fluorophenyl)-8-methyl-2-((3-(methylsulfonyl)phenyl)amino)pyrido[2,3-d]pyrimidin-7(8H)-one (17h) UH15_18

16c (11 mg, 0.05 mmol) and 14h (20 mg, 0.04 mmol) were used to make 17h.

Yield 60%, white solid; 41 NMR (600 MHz, DMSO-d6) δ (ppm) 10.67 (s, 1H), 8.94 (s, 1H), 8.81 (s, 1H), 7.67 (t, J=8.1 Hz, 1H), 7.63-7.60 (m, 2H), 7.53-7.50 (m, 1H), 7.36 (td, J=8.5, 3 Hz, 1H), 3.73 (s, 3H), 3.27 (s, 3H). $^{13}$C NMR (150 MHz, DMSO-d6) δ 162.95, 161.68, 161.31, 159.77, 159.15, 155.56, 141.87, 141.04, 136.63, 134.58, 134.51, 133.87, 132.53, 130.39, 126.80, 124.37, 120.92, 117.59, 117.19, 117.02, 114.88, 114.73, 106.93, 44.18, 28.75. HRMS m/z calculated for $C_{21}H_{16}ClFN_4O_3S$ [M+H]$^+$: 459.0688; found 459.0688; purity 97.6% ($t_R$ 22.72 min).

6-(2,5-dichlorophenyl)-8-methyl-2-((3-(methylsulfonyl)phenyl)amino)pyrido[2,3-d]pyrimidin-7(8H)-one (17o) UH15_19

16c (6 mg, 0.03 mmol) and 14o (10 mg, 0.026 mmol) was used to make 17o.

Yield 92%, white solid; $^1$H NMR (400 MHz, DMSO-d6) δ (ppm) 10.65 (s, 1H), 8.89 (s, 1H), 8.77 (s, 1H), 7.98-7.95 (m, 2H), 7.65-7.56 (m, 3H), 7.53-7.50 (m, 2H), 3.68 (s, 3H), 3.22 (s, 3H). HRMS m/z calculated for $C21H_{16}Cl_2N_4O_3S$ [M+H]$^+$: 475.0393; found 475.0390; purity 97.4% ($t_R$ 23.76 min).

6-(4-hydroxyphenyl)-8-methyl-2-((3-(methylsulfonyl)phenyl)amino)pyrido[2,3-d]pyrimidin-7(8H)-one (17p) UH15_21

16c (22 mg, 0.11 mmol) and 14p (40 mg, 0.09 mmol) were used to make 17p.

Yield 79%, light yellow solid; $^1$H NMR (400 MHz, DMSO-d6) δ (ppm) 10.52 (s, 1H), 9.62 (s, 1H), 8.86 (s, 1H), 8.78 (s, 1H), 7.94-7.93 (m, 2H), 7.63-7.52 (m, 4H), 6.81 (d, J=8.8 Hz, 2H), 3.69 (s, 3H), 3.21 (s, 3H). HRMS m/z calculated for $C_{21}H_{18}N_4O_4S$ [M+H]$^+$: 423.1122; found 423.1120.

2-((4-(2-(diethylamino)ethoxy)phenyl)amino)-6-(4-hydroxyphenyl)-8-methylpyrido[2,3-d]pyrimidin-7(8H)-one (17p*) UH15_22

16a (20 mg, 0.081 mmol) and 14p (30 mg, 0.067 mmol) were used to make 17p*.

Yield 64%, light yellow solid; $^1$H NMR (400 MHz, CD$_3$OD) δ (ppm) 8.66 (s, 1H), 7.79 (s, 1H), 7.68 (d, J=9.2 Hz, 2H), 7.50 (d, J=8.8 Hz, 2H), 6.99 (d, J=9.2 Hz, 2H), 6.83 (d, J=8.8 Hz, 2H), 4.25 (t, J=5.2 Hz, 2H), 3.74 (s, 3H), 3.36-3.34 (m, 2H), 3.11 (q, J=7.2 Hz, 4H), 1.28 (t, J=7.4 Hz, 6H). HRMS m/z calculated for $C_{26}H_{29}N_5O_3$ [M+H]$^+$: 460.2343; found 460.2348.

6-(2,6-dichlorophenyl)-2-((4-(2-(diethylamino)ethoxy)phenyl)amino)-8-(3-(methylsulfonyl)ebenzyl)pyrido[2,3-d]pyrimidin-7(8H)-one (17q) UH15_26

Yield 84%, light yellow solid; $^1$H NMR (600 MHz, CDCl$_3$) δ (ppm) 8.58 (s, 1H), 7.99 (s, 1H), 7.81 (d, J=7.8 Hz, 1H), 7.60-7.39 (m, 7H), 7.32-7.26 (m, 2H), 6.94 (d, J=9 Hz, 2H), 5.68 (s, 2H), 4.10 (t, J=5.7 Hz, 2H), 2.93-2.91 (m, 5H), 2.68 (q, J=7.2 Hz, 4H), 1.09 (t, J=7.2 Hz, 6H). HRMS m/z calculated for $C_{33}H_{33}Cl_2N_5O_4S$ [M+H]$^+$: 666.1703; found 666.1703; purity 95.6% ($t_R$ 21.35 min).

6-(2,6-dichlorophenyl)-2-((4-(2-(diethylamino)ethoxy)phenyl)amino)-8-(4-(methylsulfonyl)benzyl)pyrido[2,3-d]pyrimidin-7(8H)-one (17r) UH15_27

Yield 70%, light yellow solid; $^1$H NMR (600 MHz, CDCl$_3$) δ (ppm) 8.58 (s, 1H), 7.81 (d, J=8.4 Hz, 2H), 7.57 (s, 1H), 7.49-7.36 (m, 6H), 7.29-7.26 (m, 2H), 6.92 (d, J=8.4 Hz, 2H), 5.64 (s, 2H), 4.08 (t, J=6.3 Hz, 2H), 3.00 (s, 3H), 2.91 (t, J=6 Hz, 2H), 2.67 (t, J=7.2 Hz, 4H), 1.09 (t, J=6.9 Hz, 6H). HRMS m/z calculated for $C_{33}H_{33}Cl_2N_5O_4S$ [M+1-1]±: 666.1703; found 666.1716; purity 95.6% ($t_R$ 21.24 min).

6-(4-methoxyphenyl)-8-methyl-2-((3-(methylsulfonyl)phenyl)amino)pyrido[2,3-d]pyrimidin-7(8H)-one (17s) UH15_29

16c (12 mg, 0.06 mmol) and 14s (20 mg, 0.05 mmol) were used to make 17s.

Yield 95%, yellow solid; $^1$H NMR (400 MHz, DMSO-d6) δ (ppm) 10.52 (s, 1H), 8.87-8.77 (m, 2H), 7.99-7.94 (m, 2H), 7.66-7.54 (m, 4H), 6.99 (d, J=8.4 Hz, 2H), 3.79 (s, 3H), 3.70 (s, 3H), 3.21 (s, 3H). HRMS m/z calculated for $C_{22}H_{20}N_4O_4S$ [M+1-1]±: 437.1278; found 437.1282.

2-((4-(2-(diethylamino)ethoxy)phenyl)amino)-6-(4-methoxyphenyl)-8-methylpyrido[2,3-d]pyrimidin-7(8H)-one (17s*) UH15_30

16a (8 mg, 0.03 mmol) and 14s (14 mg, 0.03 mmol) were used to make 17s*.

Yield 66%, yellow solid; $^1$H NMR (400 MHz, CD$_3$OD) δ (ppm) 8.59 (s, 1H), 7.73 (s, 1H), 7.61 (d, J=8.4 Hz, 2H), 7.55 (d, J=8.8 Hz, 2H), 6.94-6.90 (m, 4H), 4.11 (t, J=5.4 Hz, 2H), 3.80 (s, 3H), 3.68 (s, 3H), 3.04 (t, J=5.2 Hz, 2H), 2.82 (q, J=7.2 Hz, 4H), 1.16 (t, J=7 Hz, 6H). HRMS m/z calculated for $C_{27}H_{31}N_5O_3$ [M+H]$^+$: 474.2500; found 474.2505.

Figure 22:
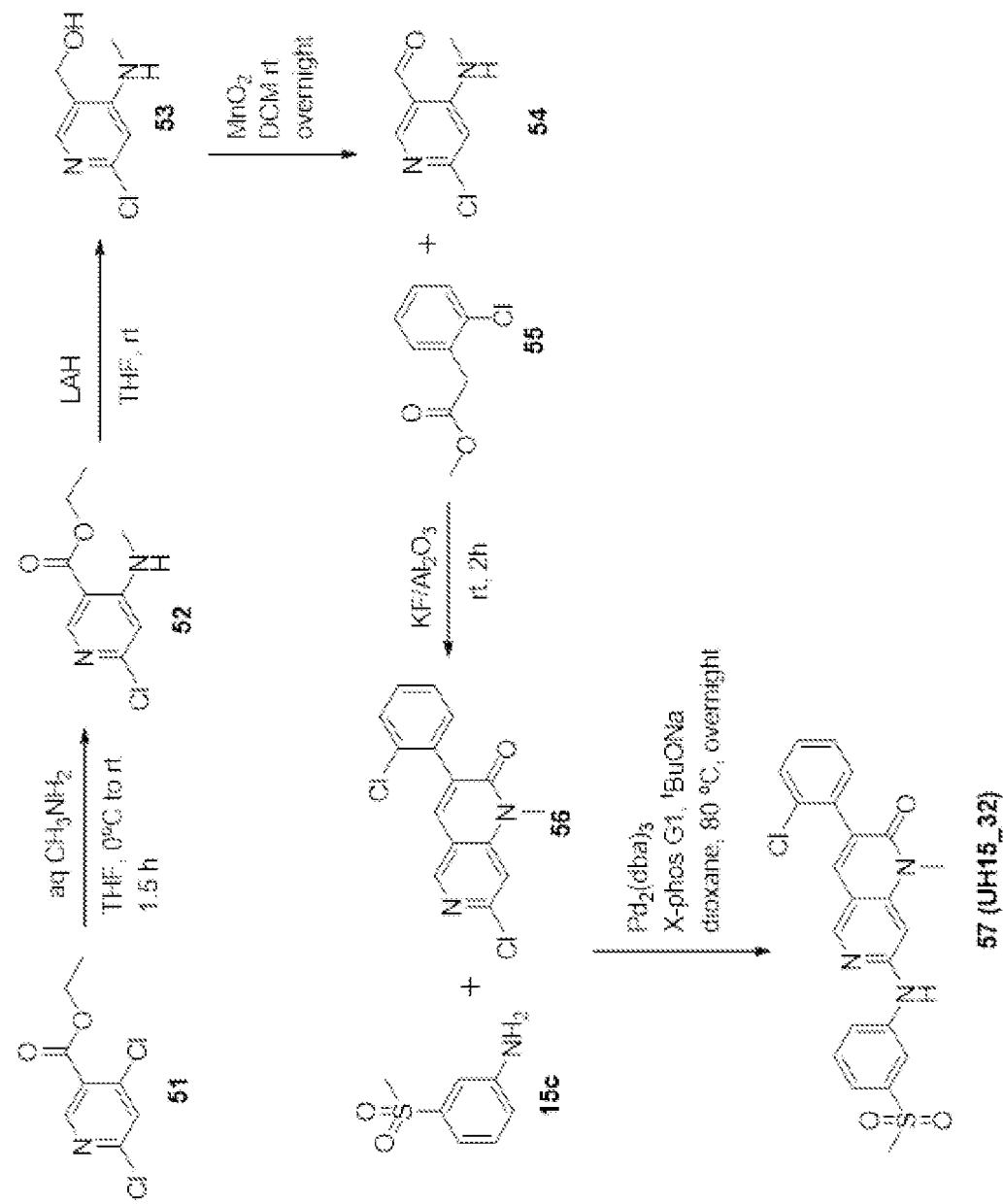
FIGS. 22-23 show synthetic schemes for exemplary inhibitors of RIPK3, in accordance with preferred embodiments.

Preparation of UH15_32:

FIG. 22 shows a synthetic scheme for an exemplary inhibitor of protein kinase, compound UH15_32, in accordance with preferred embodiments.

Ethyl 6-chloro-4-(methylamino)nicotinate (52)

To a solution of Ethyl 4,6-dichloronicotinate 51 (100 mg, 0.45 mmol) in THF (3 mL) was added aqueous methyl amine (0.4 mL) at 0° C. and the mixture was stirred for 30 min at the same temperature. After 30 min the reaction mixture was stirred at room temperature for 2 h. Following completion the mixture was concentrated and purified by column chromatography using silica gel (10% EtOAc/Hexane) to afford 52 (65 mg, 67%) as white solid. 41 NMR (400 MHz, CDCl$_3$) δ (ppm) 8.63 (s, 1H), 8.09 (brs, 1H), 6.51 (s, 1H), 4.31 (q, J=6.9 Hz, 2H), 2.89 (d, J=4.8 Hz, 3H), 1.36

(t, J=7 Hz, 3H). $^{13}$C NMR (100 MHz, CDCl$_3$) δ (ppm) 167.61, 156.82, 155.74, 152.86, 107.04, 104.36, 61.00, 29.21, 14.32.

(6-chloro-4-(methylamino)pyridin-3-yl)methanol (53)

The solution of 52 (100 mg, 0.46 mmol) in THF (2 mL) was added dropwise to the suspension of LAH (27 mg, 0.69 mmol) in THF (5 mL) at 0° C. and allowed to stir at room temperature for 30 min. The reaction mixture was then cooled at 0° C. and 15% NaOH (2 mL) and water (4 mL) was added dropwise. The reaction mixture was allowed to stir for 1 h, filtered and washed with EtOAc. Solvent was evaporated and the extract was purified by column chromatography using silica gel (2.5% MeOH/DCM) to afford 53 (77 mg, 96%) as white solid. $^1$H NMR (400 MHz, CD$_3$OD) δ (ppm) 7.73 (s, 1H), 6.51 (s, 1H), 4.91 (s, 2H), 4.49 (s, 2H), 2.84 (s, 3H). $^{13}$C NMR (100 MHz, CDCl$_3$) δ (ppm) 155.72, 151.09, 145.84, 119.71, 102.79, 59.01, 28.13.

6-chloro-4-(methylamino)nicotinaldehyde (54)

To a solution of 53 (495 mg, 2.86 mmol) in DCM (10 mL), was added MnO$_2$ (1496 mg, 17.20 mmol) and the mixture was allowed to stir overnight at room temperature. The reaction mixture was then filtered, concentrated to remove DCM and purified by column chromatography using silica gel (2% MeOH/DCM) to afford 54 (453 mg, 93%) as white solid. $^1$H NMR (400 MHz, CDCl$_3$) δ (ppm) 9.70 (s, 1H), 8.43 (brs, 1H), 8.16 (s, 1H), 6.43 (s, 1H), 2.83 (d, J=5.6 Hz, 3H).

7-chloro-3-(2-chlorophenyl)-1-methyl-1,6-naphthyridin-2(1H)-one (56)

To a stirred solution of 54 (300 mg, 1.75 mmol) and methyl 2-(2-chlorophenyl)acetate 55 (325 mg, 1.75 mmol) in dry DMA (4 mL), KF/Al$_2$O$_3$ (1800 mg, 40 wt %) was added and the reaction mixture was stirred at room temperature for 2 h. After completion the reaction mixture was filtered through celite and the residual solid was washed with DCM and filtrate was concentrated. The residue was purified by column chromatography using silica gel (20% EtOAc/Hexane) to give 56 (400 mg, 75%) as white solid. $^1$H NMR (400 MHz, CDCl$_3$) δ (ppm) 8.54 (s, 1H), 7.72 (s, 1H), 7.44-7.39 (m, 1H), 7.34-7.26 (m, 4H), 3.65 (s, 3H).

3-(2-chlorophenyl)-1-methyl-7-((3-(methylsulfonyl) phenyl)amino)-1,6-naphthyridin-2(1H)-one (57) UH15_32

To a pre-heated round bottom flask, 56 (30 mg, 0.09 mmol), 15c (20 mg, 0.11 mmol), Pd$_2$(dba)$_3$ (9 mg, 0.009 mmol), XPhos Pd G1 (9 mg, 0.02 mmol) and sodium tert-butoxide (28 mg, 0.29 mmol) was added and flushed with argon for 10 min Dioxane (1.5 mL) was added to the mixture and flushed again for 5 min and then heated overnight at 80° C. Following completion, the reaction mixture was partitioned between ethyl acetate and water, filtered, concentrated and purified by column chromatography using silica gel (2% MeOH/DCM) to give 57 (UH15_32) (20 mg, 47%) as white solid. $^1$H NMR (400 MHz, CDCl$_3$) δ (ppm) 8.48 (s, 1H), 8.11 (t, J=1.8 Hz, 1H), 7.87 (d, J=8 Hz, 1H), 7.66 (s, 1H), 7.61-7.53 (m, 2H), 7.47-7.29 (m, 5H), 3.65 (s, 3H), 3.11 (s, 3H). $^{13}$C NMR (100 MHz, CDCl$_3$) δ (ppm) 161.45, 155.87, 149.98, 146.87, 141.54, 141.35, 136.97, 135.49, 133.89, 131.62, 130.52, 129.76, 129.58, 128.54, 126.80, 124.41, 120.82, 117.83, 111.72, 91.85, 44.61, 29.71. HRMS m/z calculated for C$_{22}$H$_{18}$ClN$_3$O$_3$S [M+H]$^+$: 440.0830; found 440.0837.

Figure 23:
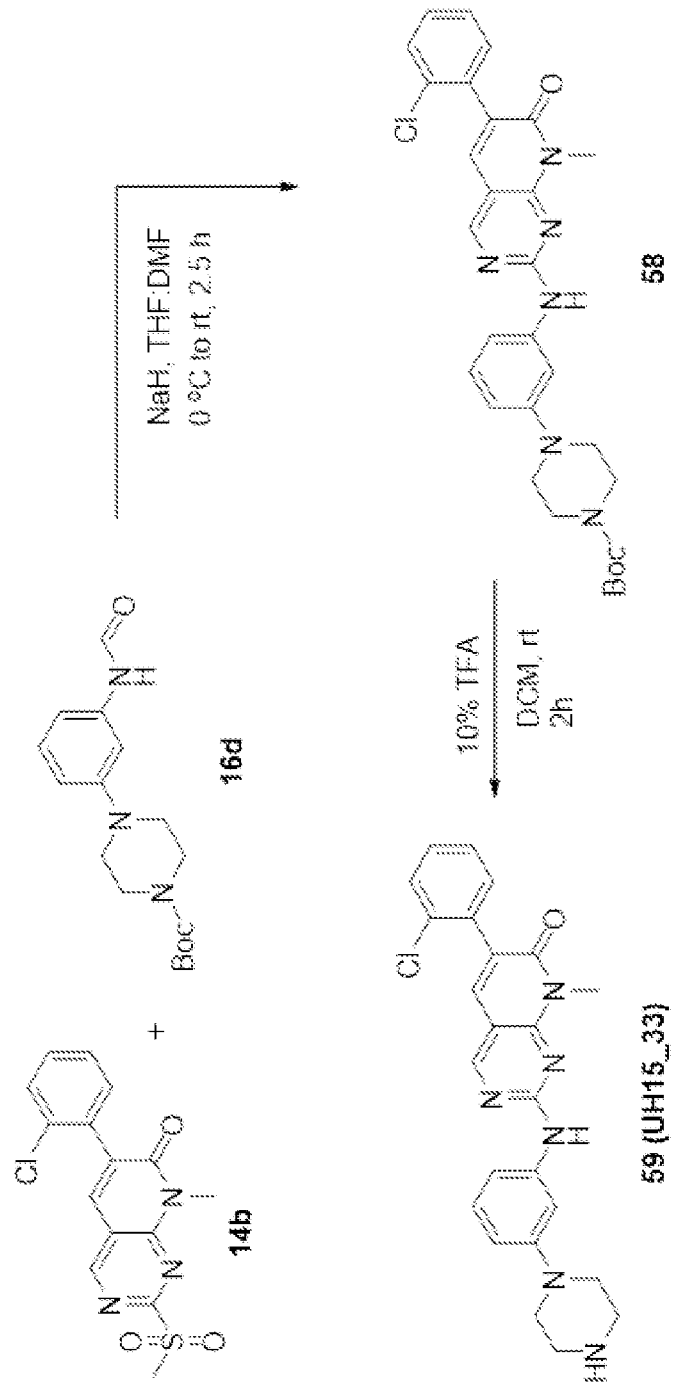

Preparation of UH15_33:

FIG. 23 shows a synthetic scheme for an exemplary inhibitor of protein kinase, compound UH15_33, in accordance with preferred embodiments.

Tert-butyl 4-(34(6-(2-chlorophenyl)-8-methyl-7-oxo-7,8-dihydropyrido[2,3-d]pyrimidin-2-yl)amino) phenyl)piperazine-1-carboxylate (58)

14b (62 mg, 0.17 mmol) and 16d (54 mg, 0.17 mmol) were used to make 58.

Yield 70%, light yellow solid; $^1$H NMR (400 MHz, CDCl$_3$) δ (ppm) 8.57 (s, 1H), 7.58 (s, 2H), 7.49-7.46 (m, 1H), 7.42-7.41 (m, 1H), 7.37-7.27 (m, 4H), 7.14 (d, J=8.4 Hz, 1H), 6.69 (d, J=8 Hz, 1H), 3.79 (s, 3H), 3.59 (t, J=5 Hz, 4H), 3.19 (t, J=4.8 Hz, 4H), 1.48 (s, 9H). $^{13}$C NMR (100 MHz, CDCl$_3$) δ (ppm) 162.26, 159.03, 158.42, 155.77, 154.84, 152.11, 139.65, 135.42, 135.14, 133.89, 131.70, 129.83, 129.76, 129.63, 128.25, 126.80, 111.89, 111.71, 107.97, 106.77, 80.12, 49.41, 28.70, 28.53.

6-(2-chlorophenyl)-8-methyl-2-((3-(piperazin-1-yl) phenyl)amino)pyrido[2,3-d]pyrimidin-7(8H)-one (59) UH15_33

58 (67 mg, 0.12 mmol) was taken in DCM (4.5 mL) and TFA (0.5 mL) was added dropwise. The reaction mixture was stirred at room temperature for 2h. Solvent was evaporated and the crude mixture was purified by column chromatography using silica gel (4% MeOH/DCM) to give 59 (UH15_33) (55 mg, 96%) as light yellow solid. $^1$H NMR (600 MHz, DMSO-d6) δ (ppm) 8.76 (s, 1H), 7.80 (s, 1H), 7.50-7.48 (m, 2H), 7.40-7.34 (m, 3H), 7.24-7.21 (m, 2H), 6.70 (d, J=7.2 Hz, 1H), 3.61 (s, 3H), 3.32 (t, J=4.8 Hz, 4H), 3.21 (t, J=5.2 Hz, 4H). HRMS m/z calculated for C$_{24}$H$_{23}$ClN$_6$O [M+H]$^+$: 447.1695; found 447.1697.

6-(2-chlorophenyl)-8-methyl-2-(pyridin-3-ylamino) pyrido[2,3-cl]pyrimidin-7(8H)-one (UH15_34)

14b (15 mg, 0.05 mmol) and 16f (6 mg, 0.05 mmol) were used to make UH15_34.

Yield 67%, white solid; $^1$H NMR (600 MHz, CDCl$_3$) δ (ppm) 8.87 (s, 1H), 8.61 (s, 1H), 8.37 (d, J=4.8 Hz, 1H), 8.23 (d, J=7.8 Hz, 1H), 7.73 (brs, 1H), 7.61 (s, 1H), 7.48-7.47 (m, 1H), 7.36-7.32 (m, 4H), 3.79 (s, 3H). $^{13}$C NMR (150 MHz, CDCl$_3$) δ (ppm) 162.15, 158.88, 158.42, 155.79, 144.45, 141.55, 135.64, 135.23, 134.97, 133.84, 131.64, 129.84, 129.72, 129.00, 126.80, 126.56, 123.66, 107.33, 28.79. HRMS m/z calculated for C$_{19}$H$_{14}$ClN$_5$O [M+H]$^+$: 364.0960; found 364.0960.

6-(2-chlorophenyl)-8-methyl-2-(pyridin-2-ylamino) pyrido[2,3-d]pyrimidin-7(8H)-one (UH15_35)

14b (20 mg, 0.06 mmol) and 16e (8 mg, 0.06 mmol) were used to make UH15_35.

Yield 62%, light yellow solid. $^1$H NMR (600 MHz, DMSO-d6) δ (ppm) 10.40 (s, 1H), 8.88 (s, 1H), 8.35-8.32 (m, 2H), 7.91 (s, 1H), 7.84 (t, J=7.6 Hz, 1H), 7.54 (d, J=7.8 Hz, 1H), 7.44-7.40 (m, 3H), 7.07 (t, J=6.3 Hz, 1H), 3.67 (s, 3H). HRMS m/z calculated for C$_{19}$H$_{14}$ClN$_5$O [M+H]$^+$: 364.0960; found 364.0960.

Preparation of UH15PN Compounds

Figure 24A:
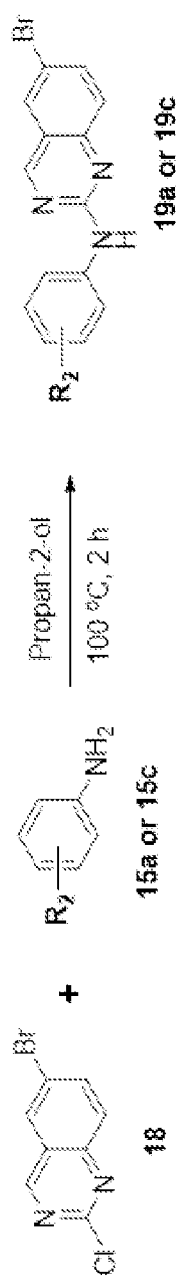
FIG. 24A shows a synthetic scheme for exemplary inhibitors of RIPK3, in accordance with preferred embodiments.
Figure 24B:
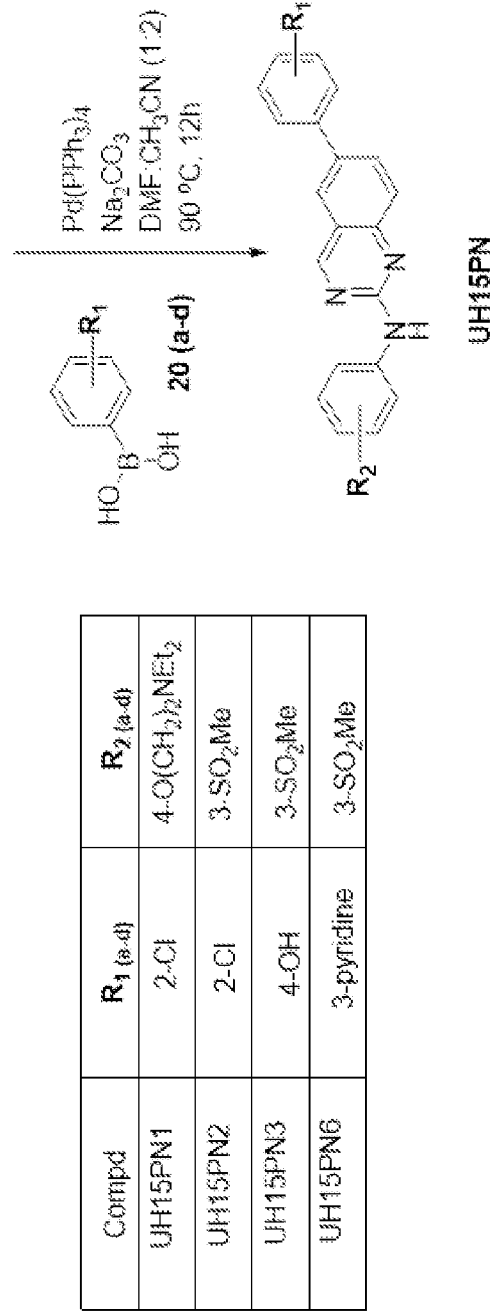
FIG. 24B shows structures of intermediate compounds used in the synthesis of exemplary inhibitors of RIPK3, in accordance with preferred embodiments.
Figure 24B:
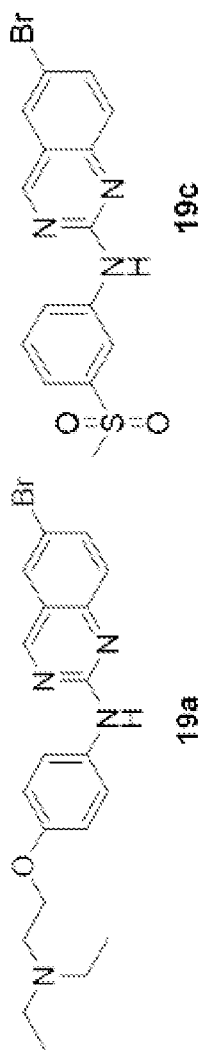
Figure 25:
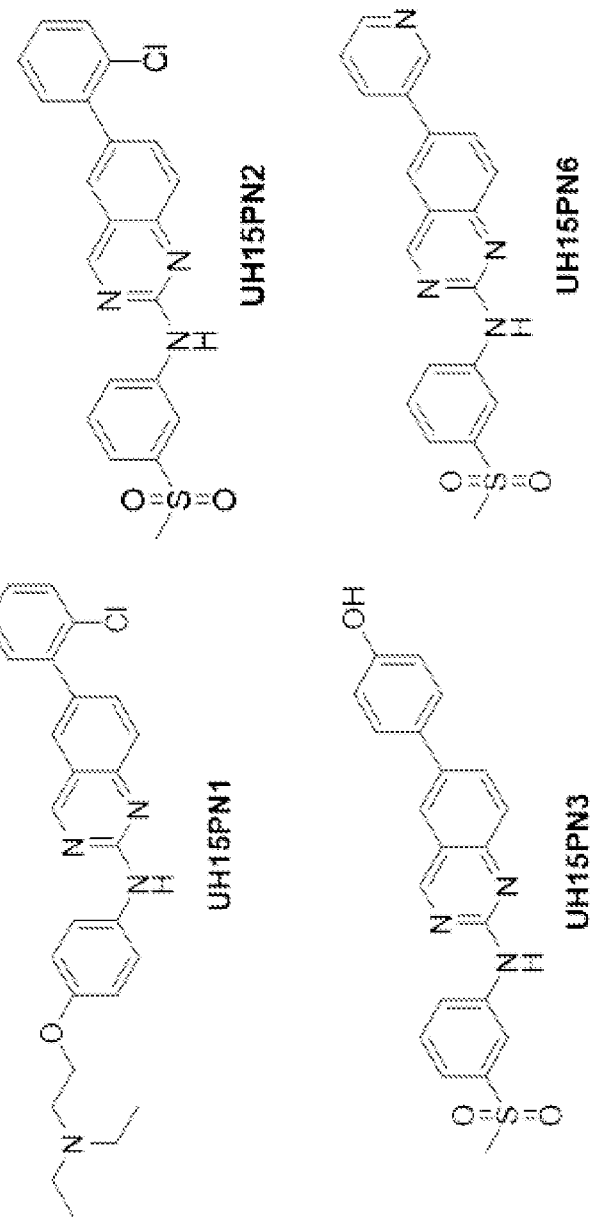
FIG. 25 shows structures of exemplary inhibitors of RIPK3, in accordance with preferred embodiments.

FIG. 24A shows a synthetic scheme for exemplary inhibitors of protein kinases and FIG. 24B shows the structures of intermediate compounds used in the synthesis of these exemplary inhibitors of protein kinases, in accordance with preferred embodiments. FIG. 25 shows structures of exemplary inhibitors of protein kinases, in accordance with preferred embodiments.

6-bromo-N-(4-(2-(diethylamino)ethoxy)phenyl)quinazolin-2-amine (19a)

To a mixture of 6-bromo-2-chloroquinazoline (18) (200 mg, 0.82 mmol) and 15a (207 mg, 0.98 mmol), propan-2-ol (4 mL) was added and the reaction mixture was heated at 100° C. for 2 h. After completion, the reaction mixture was allowed to cool to room temperature and concentrated and purified by column chromatography using silica gel (5% MeOH/DCM) to afford 19 (203 mg, 61%) as yellow solid. $^1$H NMR (600 MHz, CDCl$_3$) δ (ppm) 8.94 (s, 1H), 7.81 (d, J=1.7 Hz, 1H), 7.74 (dd, J=9.3, 2.4 Hz, 1H), 7.65 (d, J=8.9 Hz, 2H), 7.61 (s, 1H), 7.54 (d, J=8.9 Hz, 1H), 6.94-6.90 (m, 2H), 4.08 (t, J=6.2 Hz, 2H), 2.91 (t, J=6.2 Hz, 2H), 2.68 (q, J=7.3 Hz, 4H), 1.09 (t, J=7.2 Hz, 6H). $^{13}$C NMR (150 MHz, CDCl$_3$) δ (ppm) 160.88, 157.30, 154.94, 150.50, 137.65, 132.51, 129.53, 128.04, 121.69, 121.40, 116.08, 114.98, 66.63, 51.74, 47.77, 11.68.

6-(2-chlorophenyl)-N-(4-(2-(diethylamino)ethoxy)phenyl)quinazolin-2-amine UH15PN1

6-bromo-N-(4-(2-(diethylamino)ethoxy)phenyl)quinazolin-2-amine (19a) (30 mg, 0.07 mmol), (2-chlorophenyl)boronic acid (20a) (17 mg, 0.11 mmol) and Pd(PPh$_3$)$_4$ (8.5 mg, 0.007 mmol) was taken in round bottom flask (rb) and purged with argon for 10 min. DMF (1 mL) and CH$_3$CN (2 mL) solvent mixture were then added to the above reactants and was purged again for 10 min. Following purging 1M Na$_2$CO$_3$ (150 μl) solution was added drop wise and started heating at 90° C. for 5 h. After completion the reaction mixture was allowed to cool to rt and solvent was evaporated. The residue was partitioned between water and EtOAc, filtered and concentrated to get a crude mixture which was purified by column chromatography using silica gel (5% MeOH/DCM) to get UH15PN1 (23 mg, 70%) as yellow solid. $^1$H NMR (600 MHz, CDCl$_3$) δ (ppm) 9.08 (s, 1H), 7.84 (dd, J=8.6, 1.7 Hz, 1H), 7.77-7.70 (m, 4H), 7.49 (d, J=8.4 Hz, 1H), 7.46 (s, 1H), 7.41 (dd, J=7.2, 1.7 Hz, 1H), 7.37-7.31 (m, 2H), 6.94 (d, J=9 Hz, 2H), 4.11 (t, J=6.2 Hz, 2H), 2.94 (t, J=6.2 Hz, 2H), 2.71 (q, J=7.1 Hz, 4H), 1.11 (t, J=7.2 Hz, 6H). $^{13}$C NMR (150 MHz, CDCl$_3$) δ (ppm) 162.11, 157.40, 154.76, 151.18, 139.41, 136.17, 134.63, 132.86, 132.69, 131.49, 130.21, 129.01, 127.97, 127.16, 125.77, 121.27, 120.45, 115.01, 66.56, 51.73, 47.78, 11.63.

6-bromo-N-(3-(methylsulfonyl)phenyl)quinazolin-2-amine (19c)

To a mixture of 6-bromo-2-chloroquinazoline (18) (100 mg, 0.41 mmol) and (15c) (85 mg, 0.49 mmol), propan-2-ol (2 mL) was added and the reaction mixture was heated at 100° C. for 2 h. After completion, the reaction mixture was cooled to rt, concentrated and purified by column chromatography using silica gel (2% MeOH/DCM) to afford 19c (150 mg, 97%) as light yellow solid. $^1$H NMR (600 MHz, DMSO-d6) δ (ppm) 10.46 (s, 1H), 9.37 (s, 1H), 8.71 (s, 1H), 8.25-8.22 (m, 2H), 7.97 (d, J=8.1 Hz, 1H), 7.65-7.60 (m, 2H), 7.55-7.54 (m, 1H), 3.23 (s, 3H).

6-(2-chlorophenyl)-N-(3-(methylsulfonyl)phenyl)quinazolin-2-amine (UH15PN2)

6-bromo-N-(3-(methylsulfonyl)phenyl)quinazolin-2-amine (19c) (50 mg, 0.08 mmol) and (2-chlorophenyl)boronic acid (20a) (31 mg, 0.12 mmol) were used to make UH15PN2 (31 mg, 95%) as yellow solid. $^1$H NMR (400 MHz, CDCl$_3$) δ (ppm) 9.19 (s, 1H), 8.63 (s, 1H), 8.11 (d, J=7.2 Hz, 1H), 7.92-7.89 (m, 1H), 7.85-7.83 (m, 3H), 7.64-7.51 (m, 3H), 7.44-7.34 (m, 3H), 3.13 (s, 3H) $^{13}$C NMR (100 MHz, CDCl$_3$) δ (ppm) 162.34, 156.51, 150.59, 141.27, 140.87, 139.17, 136.59, 135.81, 132.67, 131.49, 130.26, 130.10, 129.23, 127.99, 127.25, 126.21, 123.62, 120.93, 120.74, 117.34, 44.58

4-(2-((3-(methylsulfonyl)phenyl)amino)quinazolin-6-yl)phenol (UH15PN3)

19c (30 mg, 0.08 mmol) and (4-hydroxyphenyl)boronic acid (20c) (17 mg, 0.12 mmol) were used to make UH15PN3 (22 mg, 71%) as yellow solid. $^1$H NMR (400 MHz, DMSO-d6) δ (ppm) 10.33 (s, 1H), 9.66 (s, 1H), 9.38 (s, 1H), 8.72 (t, J=2 Hz, 1H), 8.23 (d, J=8.2 Hz, 1H), 8.15-8.12 (m, 2H), 7.71 (d, J=8.4 Hz, 1H), 7.63-7.58 (m, 3H), 7.52-7.49 (m, 1H), 6.89 (d, J=8.8 Hz, 2H), 3.22 (s, 3H).

N-(3-(methylsulfonyl)phenyl)-6-(pyridin-2-yl)quinazolin-2-amine (UH15PN5)

Figure 26:
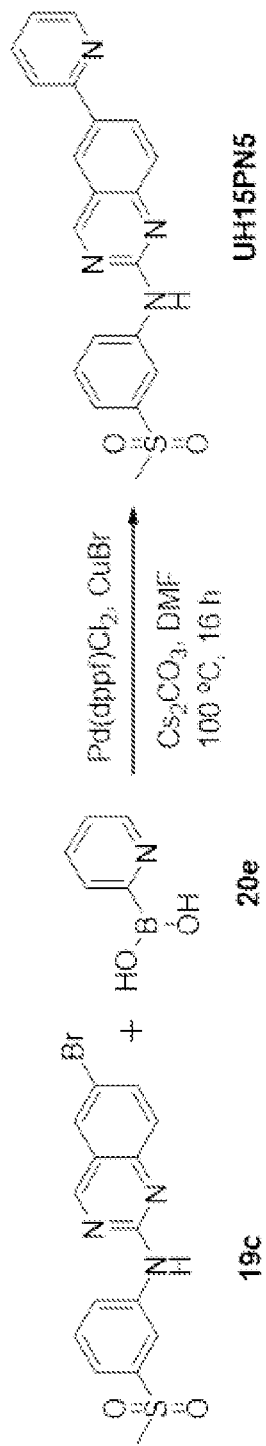
FIGS. 26-30 shows synthetic schemes for exemplary inhibitors of RIPK3, in accordance with preferred embodiments.

FIG. 26 shows a synthetic scheme for exemplary inhibitors of protein kinase UH15PN5, in accordance with preferred embodiments.

6-bromo-N-(3-(methylsulfonyl)phenyl)quinazolin-2-amine (19c) (20 mg, 0.05 mmol), pyridin-2-ylboronic acid (20e) (22 mg, 0.10 mmol), Pd(dppf)Cl$_2$ (4 mg, 0.005 mmol), CuBr (12 mg, 0.05 mmol) and Cs$_2$CO$_3$ (69 mg, 0.21 mmol) were taken in round bottom flask and purged with argon for 10 min. DMF (2 mL) was then added to the above reactants and was purged again for 10 min Following purging, the contents were heated at 100° C. for 16 h. After completion the reaction mixture was allowed to cool to room temperature and solvent was evaporated. The residue was partitioned between water and EtOAc, filtered and concentrated to get a crude mixture which was purified by column chromatography using silica gel (2.5% MeOH/DCM) to get UH15PN5 (15 mg, 60%) as light brown solid. $^1$H NMR (600 MHz, DMSO-d6) δ (ppm) 10.42 (s, 1H), 9.47 (s, 1H), 8.73-8.71 (m, 3H), 8.61 (d, J=8.1 Hz, 1H), 8.25 (d, J=8.4 Hz, 1H), 8.10 (d, J=8.4 Hz, 1H), 7.96-7.93 (m, 1H), 7.77 (d, J=9 Hz, 1H), 7.61 (t, J=7.8 Hz, 1H), 7.53 (d, J=7.2 Hz, 1H), 7.40-7.38 (m, 1H), 3.23 (s, 3H).

N-(3-(methylsulfonyl)phenyl)-6-(pyridin-3-yl)quinazolin-2-amine (UH15PN6)

19c (30 mg, 0.08 mmol) and pyridin-3-ylboronic acid (20d) (15 mg, 0.12 mmol) were used to make UH15PN6 (15 mg, 50%) as yellow solid. 1H NMR (600 MHz, DMSO-d6) δ (ppm) 10.42 (s, 1H), 9.43 (s, 1H), 9.03 (s, 1H), 8.72 (s, 1H), 8.60 (d, J=4.8 Hz, 1H), 8.37 (s, 1H), 8.27-8.25 (m, 2H), 8.22-8.20 (m, 1H), 7.79 (d, J=9 Hz, 1H), 7.61 (t, J=7.8 Hz, 1H), 7.55-7.52 (m, 2H), 3.23 (s, 3H).

Figure 27:
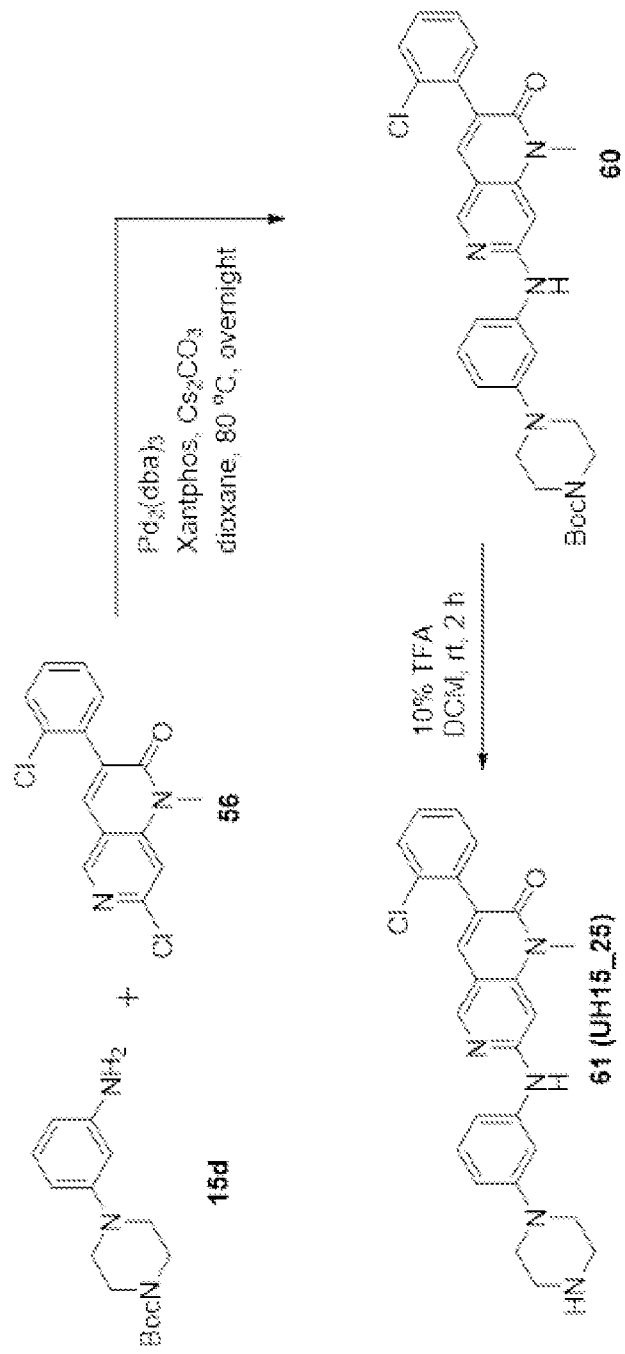

Preparation of UH15_25:

FIG. 27 shows a synthetic scheme for an exemplary inhibitor of protein kinase UH15_25, in accordance with preferred embodiments.

Tert-butyl 4-(3-((3-(2-chlorophenyl)-1-methyl-2-oxo-1,2-dihydro-1,6-naphthyridin-7-yl)amino)phenyl)piperazine-1-carboxylate (60)

To a pre-heated round bottom flask, 56 (20 mg, 0.065 mmol), 15d (22 mg, 0.078 mmol), Pd$_2$(dba)$_3$ (6 mg, 0.006 mmol), Xantphos (8 mg, 0.013 mmol) and caesium carbonate (43 mg, 0.13 mmol) was added and flushed with argon for 10 min Dioxane (1.5 mL) was added to the mixture and flushed again for 5 min and then heated overnight at 80° C. The reaction mixture was then partitioned between ethyl acetate and water, dried over anhydrous Na$_2$SO$_4$, filtered, concentrated and purified by column chromatography using silica gel (1.5% MeOH/DCM) to give 60 (20 mg, 57%) as light yellow solid.

3-(2-chlorophenyl)-1-methyl-7-((3-(piperazin-1-yl)phenyl)amino)-1,6-naphthyridin-2(1H)-one (61) UH15_25

60 (20 mg, 0.036 mmol) was taken in DCM (2 mL) and TFA (0.2 mL) was added dropwise. The reaction mixture was stirred at room temperature for 2 h. Solvent was evaporated, and the crude mixture was purified by column chromatography using silica gel (7% MeOH/DCM) to give 61 (UH15_25) (12 mg, 75%) as light yellow solid. $^1$H NMR (600 MHz, CD$_3$OD) δ (ppm) 8.47 (s, 1H), 7.76 (s, 1H), 7.48-7.47 (m, 1H), 7.37-7.36 (m, 3H), 7.31 (t, J=2 Hz, 1H), 7.23 (t, J=7.8 Hz, 1H), 7.06 (d, J=8.4 Hz, 1H), 6.72-6.70 (m, 2H), 3.61 (s, 3H), 3.33 (t, J=4.8 Hz, 4H), 3.23 (t, J=4.8 Hz, 4H).

Figure 28:
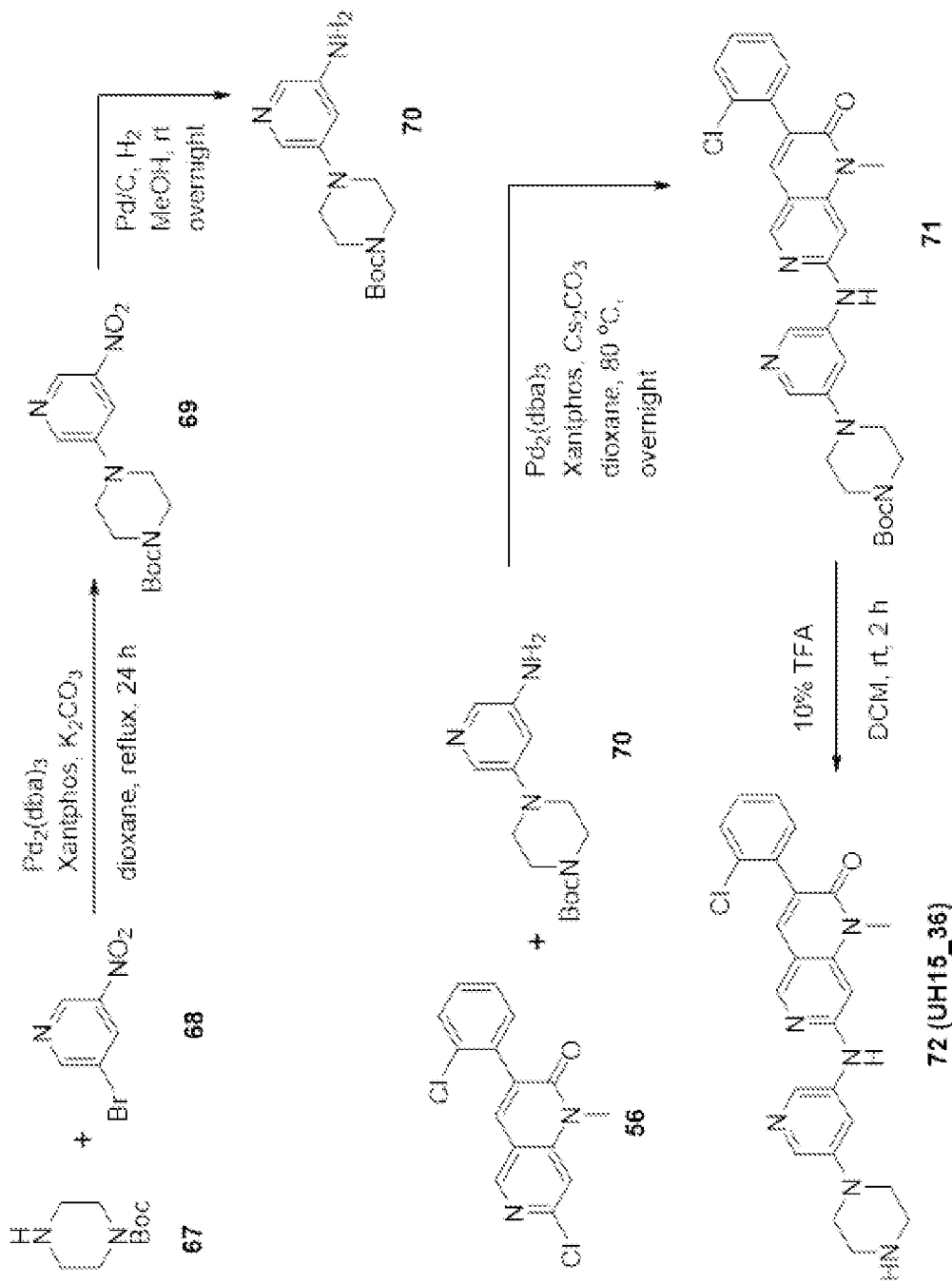

Preparation of UH15_36:

FIG. 28 shows a synthetic scheme for exemplary inhibitor of protein kinase UH15_36, in accordance with preferred embodiments.

Tert-butyl 4-(5-nitropyridin-3-yl)piperazine-1-carboxylate (69)

To a pre-heated round bottom flask Pd$_2$(dba)$_3$ (125 mg, 0.13 mmol), Xantphos (155 mg, 0.26 mmol) and potassium carbonate (740 mg, 5.36 mmol) was added and flushed with argon for 10 min DMF (4 mL) was added to the mixture and flushed for another 5 min, which was followed by addition of 67 (500 mg, 2.68 mmol) and 68 (545 mg, 2.68 mmol) and then refluxed for 24 h. The reaction mixture was then partitioned between ethyl acetate and water, dried over anhydrous Na$_2$SO$_4$, filtered, concentrated and purified by column chromatography using silica gel (15% EtOAc/DCM) to give 69 (250 mg, 30%) as light yellow solid. $^1$H NMR (600 MHz, DMSO-d$_6$) δ (ppm) 8.72 (s, 1H), 8.69 (s, 1H), 7.94 (s, 1H), 3.46 (t, J=5 Hz, 4H), 3.35 (t, J=5H, 4H), 1.41 (s, 9H).

Tert-butyl 4-(5-aminopyridin-3-yl)piperazine-1-carboxylate (70)

To a solution of 69 (250 mg, 0.81 mmol) in CH$_3$OH (15 mL) was added 10% Pd/C (50 mg) and the reaction was stirred at room temperature in H2 (g) (1 atm) for 4 h. The reaction mixture was then filtered through celite and concentrated to afford 70 (220 mg, 97%) as brown solid which was used in next step without purification.

Tert-butyl 4-(5-((3-(2-chlorophenyl)-1-methyl-2-oxo-1,2-dihydro-1,6-naphthyridin-7-yl)amino)pyridin-3-yl)piperazine-1-carboxylate (71)

To a pre-heated round bottom flask, 56 (42 mg, 0.13 mmol), 70 (39 mg, 0.13 mmol), Pd$_2$(dba)$_3$ (13 mg, 0.013 mmol), Xantphos (16 mg, 0.027 mmol) and caesium carbonate (90 mg, 0.27 mmol) was added and flushed with argon for 10 min Dioxane (3 mL) was added to the mixture and flushed again for 5 min and then heated overnight at 80° C. The reaction mixture was then partitioned between ethyl acetate and water, dried over anhydrous Na$_2$SO$_4$, filtered, concentrated and purified by column chromatography using silica gel (2.5% MeOH/DCM) to give 71 (26 mg, 35%) as light brown solid.

3-(2-chlorophenyl)-1-methyl-7-((5-(piperazin-1-yl)pyridin-3-yl)amino)-1,6-naphthyridin-2(1H)-one (72) UH15_36

71 (20 mg, 0.036 mmol) was taken in DCM (2 mL) and TFA (0.2 ml) was added dropwise. The reaction mixture was stirred at room temperature for 2 h. Solvent was evaporated, and the crude mixture was purified by reverse phase preparative HPLC (95% H$_2$O/CH$_3$CN with 0.1% TFA to 95% CH$_3$CN/H$_2$O with 0.1% TFA) to give 72 (UH15_36) (12 mg, 75%) as light yellow solid. $^1$H NMR (600 MHz, CD$_3$OD) δ (ppm) 9.00 (s, 1H), 8.65 (s, 1H), 8.17-8.10 (m, 2H), 7.87 (s, 1H), 7.51-7.38 (m, 4H), 6.87 (s, 1H), 3.69 (s, 3H), 3.67 (t, J=5 Hz, 4H), 3.43 (t, J=5 Hz, 4H). $^{13}$C NMR (150 MHz, CD$_3$OD) δ (ppm) 161.59, 155.45, 149.42, 148.33, 146.44, 141.68, 137.33, 135.63, 133.69, 131.41, 129.49, 129.33, 129.23, 126.68, 122.48, 121.75, 116.21, 112.27, 93.67, 44.35, 42.71, 28.69.

Preparation of 34 (UH15_20)

Figure 29:
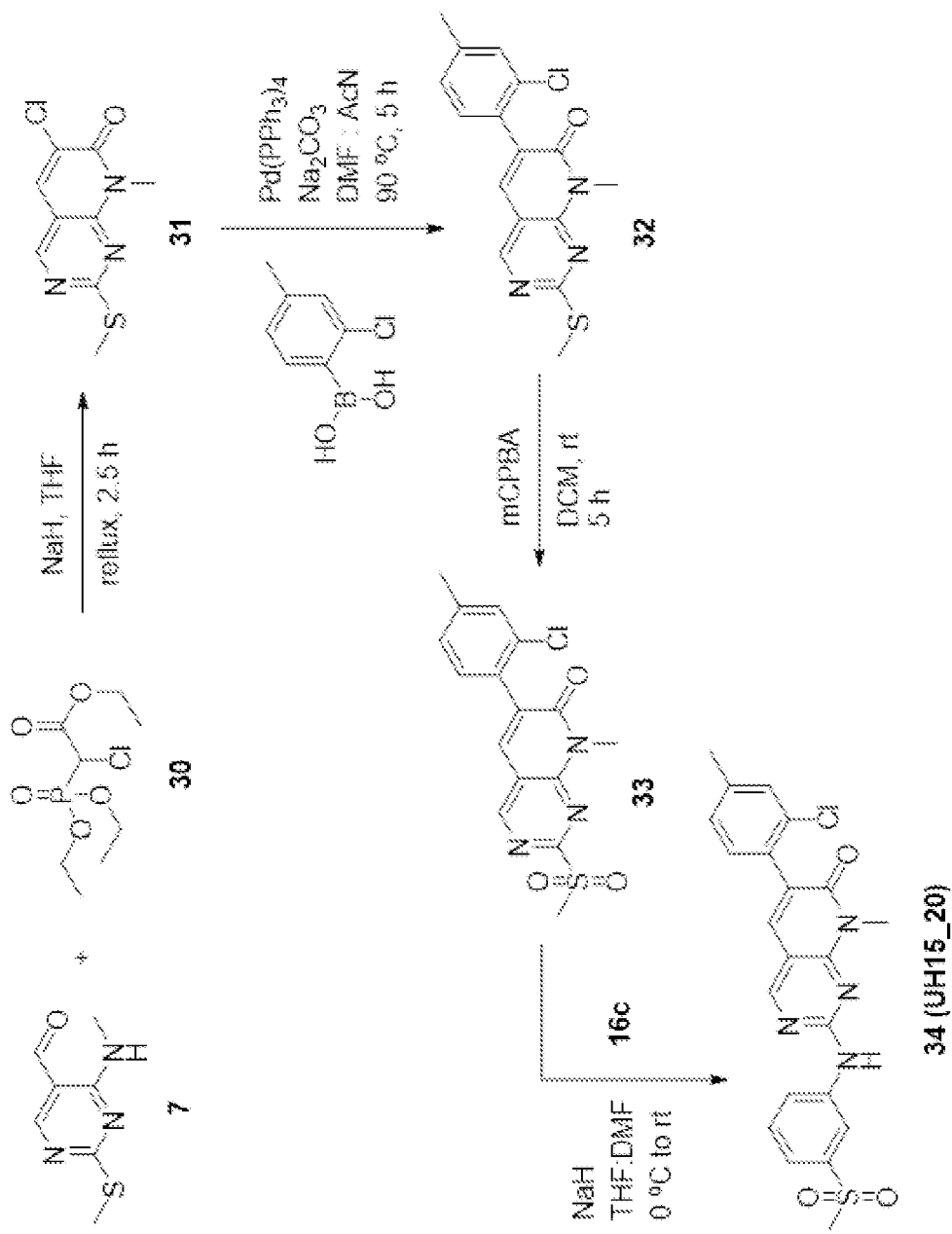

FIG. 29 shows a synthetic scheme for exemplary inhibitor of protein kinase UH15_20, in accordance with preferred embodiments.

6-chloro-8-methyl-2-(methylthio)pyrido[2,3-d]pyrimidin-7(8H)-one (31)

To a mixture of 7 (20 mg, 0.11 mmol) and NaH (8 mg, 0.33 mmol), THF (1.5 mL) was added and stirred at rt for 10 min under argon. The solution of ethyl 2-chloro-2-(diethoxyphosphoryl)acetate 30 (42 mg, 0.16 mmol) in THF (0.5 mL) was added dropwise and the mixture was refluxed for 2.5 h. After completion, the reaction mixture was cooled to rt, concentrated and extracted using EtOAc and water system. The organic solvent was evaporated and the residue was purified by column chromatography using silica gel (30% EtOAc/Hexane) to afford 31 (10 mg, 42%) as white solid. 41 NMR (600 MHz, CDCl$_3$) δ (ppm) 8.59 (s, 1H), 7.82 (s, 1H), 3.80 (s, 3H), 2.62 (s, 3H). $^{13}$C NMR (600 MHz, CDCl$_3$) δ (ppm) 173.60, 159.29, 155.69, 153.30, 132.58, 126.69, 108.98, 29.23, 14.57.

6-(2-chloro-4-methylphenyl)-8-methyl-2-(methylthio)pyrido[2,3-d]pyrimidin-7(8H)-one (32)

31 (24 mg, 0.11 mmol), (2-chloro-4-methylphenyl)boronic acid (28 mg, 0.16 mmol) and Pd(PPh$_3$)$_4$ (13 mg, 0.011 mmol) was taken in round bottom flask (rb) and purged with argon for 10 min DMF (1 mL) and CH$_3$CN (2 mL) were added to the above reactants and the reaction mixture was purged again for 10 min. Following purging 1M Na$_2$CO$_3$ (23 mg, 0.21 mmol) (220 µL) solution was added drop wise and started heating at 90° C. for 5 h. After completion, the reaction mixture was cooled to rt and solvent was evaporated. The residue was partitioned between water and EtOAc, filtered and concentrated to get a crude mixture which was purified by column chromatography using silica gel (10% EtOAc/DCM) to get 32 (20 mg, 57%) as white solid. 41 NMR (400 MHz, CDCl$_3$) δ (ppm) 8.64 (s, 1H), 7.64 (s, 1H), 7.31-7.23 (m, 2H), 7.14 (d, J=7.6 Hz, 1H), 3.82 (s, 3H), 2.66 (s, 3H), 2.38 (s, 3H). $^{13}$C NMR (400 MHz, CDCl$_3$) δ (ppm) 173.28, 161.96, 156.34, 154.34, 140.33, 134.85, 133.32, 131.64, 131.19, 130.38, 127.67, 109.44, 28.55, 21.15, 14.61.

6-(2-chloro-4-methylphenyl)-8-methyl-2-(methylsulfonyl)pyrido [2,3-d]pyrimidin-7(8H)-one (33)

Yield 68%, white solid; $^1$H NMR (400 MHz, CDCl$_3$) δ (ppm) 8.99 (s, 1H), 7.80 (s, 1H), 7.34 (s, 1H), 7.27-7.24 (m, 1H), 7.17 (d, J=8.4 Hz, 1H), 3.89 (s, 3H), 3.44 (s, 3H), 2.41 (s, 3H). $^{13}$C NMR (400 MHz, CDCl$_3$) δ (ppm) 164.45, 161.33, 157.07, 155.10, 141.20, 136.58, 133.58, 133.10, 130.92, 130.60, 130.56, 127.83, 115.12, 39.35, 29.34, 21.22.

6-(2-chloro-4-methylphenyl)-8-methyl-2-((3-(methylsulfonyl)phenyl)amino)pyrido[2,3-d]pyrimidin-7 (8H)-one (34) UH15_20

Yield 75%, white solid; 41 NMR (400 MHz, DMSO-d6) δ (ppm) 10.60 (s, 1H), 8.88 (s, 1H), 8.76 (s, 1H), 7.96 (d, J=8.8 Hz, 1H), 7.87 (s, 1H), 7.64-7.56 (m, 2H), 7.38 (s, 1H), 7.28 (d, J=8 Hz, 1H), 7.21 (d, J=7.7 Hz, 1H), 3.68 (s, 3H), 3.22 (s, 3H), 2.35 (s, 3H). HRMS m/z calculated for C$_{22}$H$_{19}$ClN$_4$O$_3$S [M+H]$^+$: 455.0939; found 455.0944; purity 99.6% (t$_R$ 23.51 min).

Preparation of UH15-38

Figure 30:
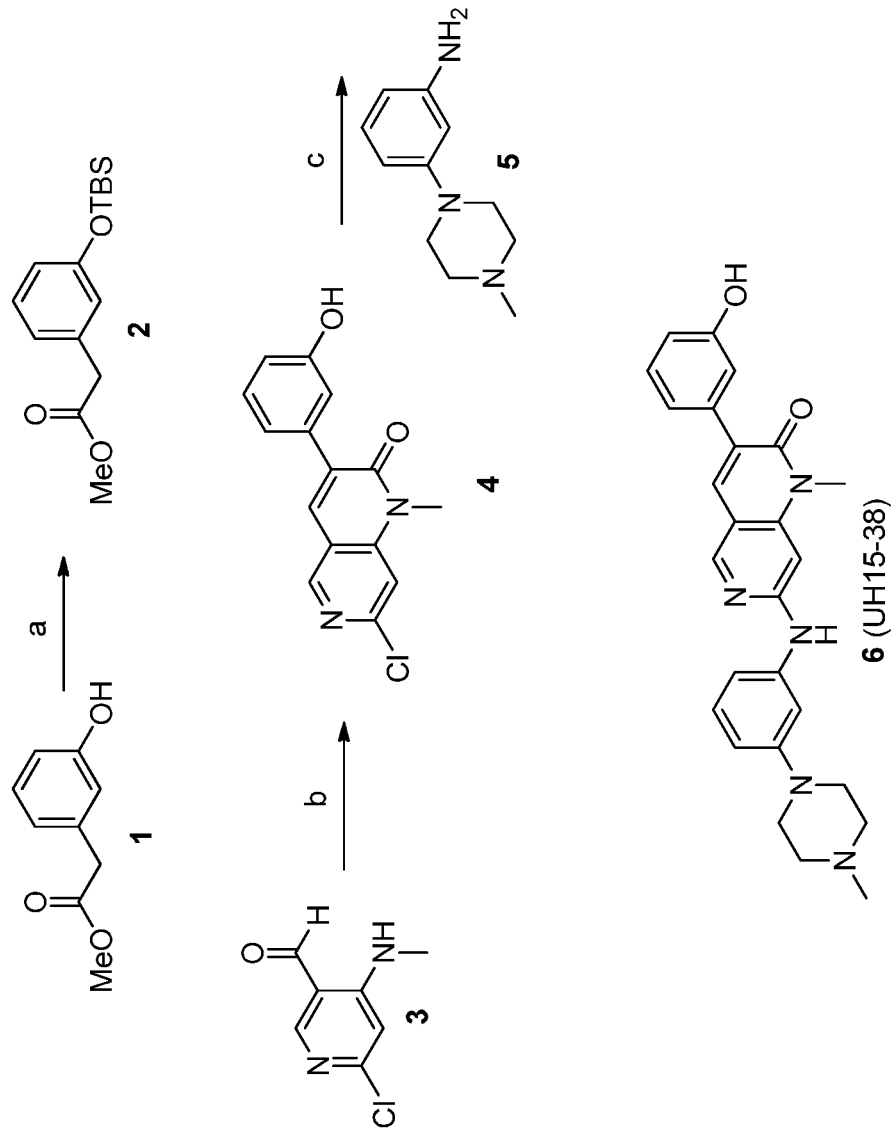

FIG. 30 shows a synthetic scheme for an exemplary inhibitor of protein kinase UH15_20, in accordance with preferred embodiments. In FIG. 30, Reagents and conditions: (a) TBSCl, imidazole, DMAP, DMF, 0° C. to rt, 4 h, 83%; (b) KF/Al$_2$O$_3$, DMA, rt, 2 h, 67%; (c) Pd$_2$(dba)$_3$, Xantphos, CS$_2$CO$_3$, 1,4-dioxane, 80° C., 16 h, 47%.

Methyl 2-(3-((tert-butyldimethylsilyl)oxy)phenyl) acetate (2)

To a solution of 1 (250 mg, 1.504 mmol) in dry DMF (3 mL) were added a catalytic amount of DMAP (15 mg) and imidazole (295 mg, 1.953 mmol) in one portion followed by TBSCl (255 mg, 3.75 mmol) in one portion at 0° C. The resulting mixture was then stirred for 4 h at room temperature. After completion of the reaction, the mixture was quenched by the addition of water (10 mL) and diluted with ethyl acetate (20 mL). The resulting mixture was washed multiple times with water, brine and dried over anhydrous Na$_2$SO$_4$ and concentrated in vacuo. The crude compound was purified by combiflash chromatography (0-5% ethyl acetate in hexane) to yield 2 (353 mg, 83%) as a colorless liquid. 41 NMR (600 MHz, CDCl$_3$): δ 7.17 (t, J=7.8 Hz, 1H), 6.86 (d, J=7.8 Hz, 1H), 6.78 (s, 1H), 6.74 (d, J=7.8 Hz, 1H), 3.69 (s, 3H), 3.57 (s, 2H), 0.98 (s, 9H), 0.19 (s, 6H); $^{13}$C NMR (150 MHz, CDCl$_3$): δ 171.88, 155.70, 135.25, 129.39, 122.14, 121.05, 118.73, 51.98, 41.06, 25.63, 18.14, −4.48.

7-Chloro-3-(3-hydroxyphenyl)-1-methyl-1,6-naphthyridin-2(1H)-one (4)

To a solution of 2 (190 mg, 0.677 mmol) and 3 (115 mg, 0.674 mmol) in dry DMA (3 mL) was added KF/Al$_2$O$_3$ (1.14 g) in one portion. The resulting mixture was stirred for 2 h at room temperature. After completion of the reaction, the mixture was filtered through a small celite pad and washed with ethyl acetate (50 mL). The resulting mixture was washed multiple times with water, brine and dried over anhydrous Na$_2$SO$_4$ and concentrated in vacuo. The crude material was purified by combiflash chromatography (0-5% methanol in CH$_2$Cl$_2$) to provide 4 (130 mg, 67%) as a white solid. 41 NMR (600 MHz, DMSO-d$_6$): δ 9.53 (s, 1H), 8.78 (s, 1H), 8.16 (s, 1H), 7.64 (s, 1H), 7.24 (t, J=7.8 Hz, 1H), 7.13 (s, 1H), 7.09 (d, J=7.8 Hz, 1H), 6.81 (d, J=7.8 Hz, 1H), 3.64 (s, 3H).

3-(3-Hydroxyphenyl)-1-methyl-74(3-(4-methylpiperazin-1-yl)phenyl)amino)-1,6-naphthyridin-2(1H)-one (6; UH15-38)

To a solution of 4 (30 mg, 0.104 mmol), 3-(4-methylpiperazin-1-yl)aniline (5, 20 mg, 0.104 mmol), Xantphos (12 mg, 0.021 mmol) and CS$_2$CO$_3$ (68 mg, 0.208 mmol) in dioxane (2 mL) was added 10 mol % of Pd$_2$(dba)$_3$. The reaction mixture was purged with Ar gas for 15 minutes and refluxed at 80° C. for 16 h. After completion of reaction, the mixture was filtered through a small celite pad and water (5 mL) was added and extracted the organic compound with ethyl acetate (3×10 mL). The combined organic layers were washed with brine and dried over anhydrous Na$_2$SO$_4$ and concentrated in vacuo. The crude compound was purified by combiflash chromatography (0-5% methanol in CH$_2$Cl$_2$) to yield the product 6 (22 mg, 47%) as a yellow solid. $^1$H NMR (600 MHz, CDCl$_3$): δ 8.48 (s, 1H), 7.73 (s, 1H), 7.28-7.23 (m, 2H), 7.12 (t, J=8.1 Hz, 2H), 6.90 (t, J=2.4 Hz, 1H), 6.80 (d, J=8.4 Hz, 2H), 6.75-6.73 (dd, J=8.4 Hz, 1.8 Hz, 1H), 6.67 (s, 1H), 3.50 (s, 3H), 3.25 (t, J=4.8 Hz, 4H), 2.64 (t, J=4.8 Hz, 4H), 2.39 (s, 3H); $^{13}$C NMR (150 MHz, CDCl$_3$): δ 162.04, 156.85, 156.38, 152.31, 150.29, 146.41, 140.23, 137.69, 135.08, 130.16, 129.41, 128.37, 120.14, 116.05, 115.38, 112.72, 112.16, 111.23, 108.86, 88.95, 54.82, 48.54, 45.88, 29.51.

Example 2. Evaluation and Classification

Activities:

Table 1 below shows the activities of select UH15 analogs. IC$_{50}$/LD$_{50}$ values were determined for inhibition of recombinant RIPK3, inhibition of necroptosis in LPS/IDN-treated murine RAW264.7 macrophages and TNF/IDN-treated human Hela cells expressing RIPK3, RIPK3 binding by the inhibitors in live cells (NanoBRET assay), and induction of RIPK3-dependent apoptosis (i.e., on-target toxicity). Assays were performed using ADPGlo (kinase assay), CellTiter-Glo (viability), and NanoBRET (target engagement) assays. The GSK'872 value shown is from Mandal et al. 2014.

TABLE 1

| UH15-X | Inhibition of RIPK3 RIPK3 protein IC50, µM | Protection from necroptosis | | Binding RIPK3 in the HEK cells NanoBRET assay IC50, µM | Toxicity | |
|---|---|---|---|---|---|---|
| | | Hela-RIPK3 cells IC50, µM | RAW264.7 cells IC50, µM | | Hela-RIPK3 cells LD50, µM | RAW264.7 cells LD50, µM |
| 4 | 0.30 | NT | 0.18 | NT | NT | 5.2 |
| 6 | 0.02 | 0.09 | 0.06 | 0.02 | 7.6 | 2.5 |
| 10 | 0.08 | NT | 0.54 | NT | NT | 2.5 |
| 18 | 0.11 | 1.75 | 0.78 | 0.22 | >10 | >10 |
| 20 | 0.28 | 9.4 | 3.44 | 0.95 | >10 | >10 |
| 37 | 0.05 | 0.06 | 0.25 | 0.08 | >10 | >10 |
| 38 | 0.01 | NT | 0.02 | 0.02 | NT | >10 |
| GSK'872 | 0.05 | 3.21 | 1.29 | 0.02 | ~10* | |

NT—not tested
*Published value

For ADP-Glo assays, recombinant RIPK3 protein (20 ng per reaction) is diluted in the reaction buffer consisting of 50 mM HEPES, pH 7.5, 50 mM NaCl, 30 mM MgCl2, 1 mM DTT, 0.05% bovine serum albumin (BSA), 0.02% CHAPS. Diluted protein is added to low volume white 384 well plates (2 µL/well). Inhibitors are diluted in reaction buffer (final 25% DMSO), 1 µL is added to each well and incubated 5 mM at room temperature. Reactions are initiated by the addition of 2 µL of 100 µM ATP in the reaction buffer. Plates are sealed with plastic coverslips and incubated at room temperature for 4 h. Reactions are stopped by the addition of 5 µL of ADP-Glo reagent (Promega) and ADP generation reaction is performed for 40 mM at room temperature Luminescence signal is generated by the addition of 10 µL of Kinase detection reagent (Promega) for 30 mM at room temperature Luminescence signals are determined using appropriate luminescence plate-reader (typical integration time 0.3-1 sec). To calculate percent inhibition, average background signal is subtracted from test well and maximal signal wells. Inhibition, %=(1−(test signal/maximal signal))*100. The percent inhibition at a specified concentration is determined or $IC_{50}$ values are calculated based on a dose range of inhibitor concentrations using non-linear regression in GraphPad Prism software. For CellTiter-Glo assays, cells are treated in 96 well plates for 6-24 hr in the absence or presence of 10 ng/ml hTNFα (Peprotech, Hela-R3 cells) or E. coli LPS (Sigma, RAW264.7 cells) in combination with 10 µM IDN6556 (MedKoo) to induce necroptosis. After incubation with drugs, 15 µL of CellTiter-Glo reagent is added to the wells and incubated for 10 min Luminescence signals are determined using appropriate luminescence plate-reader (typical integration time 0.3 sec). To calculate percent viability, Viability, %=(1−(test signal/maximal viability in the untreated wells))*100.

Figure 31:
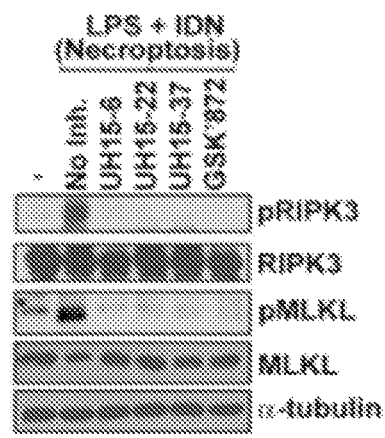
FIG. 31 shows activity of select UH15 compounds and GSK '872 in blocking RIPK3 and MLKL phosphorylation in RAW264.7 macrophages.

RIPK3 and MLKL Phosphorylation:

FIG. 31 shows that select UH15 compounds and GS K' 872 block RIPK3 and MLKL phosphorylation in RAW264.7 macrophages. Necroptosis was induced by the combination of LPS (10 ng/ml) and pan-caspase inhibitor IDN6556 (20 µM). Note that LPS is a TLR4 ligand that, like TNF, can activate RIPK3 (and necroptosis) in the presence of a caspase inhibitor. The asterisk indicates a non-specific band sometimes see in pMLKL immunoblots. Samples are subjected to SDS-PAGE gele electrophoresis and Western blotting using RIPK3, phospho-Thr231/Ser232-RIPK3, MLKL and phospho-Ser345-MLKL antibodies (Abcam).

RIPK3-dependent Toxicity:

Table 2 shows stimulus-dependent (with TNF, 10 ng/ml) and independent (without TNF) RIPK3-dependent toxicity of select UH15 analogs. Cell death was assessed by CellTiter-Glo assay. Toxicity was compared in Hela cells lacking RIPK3 and cells where RIPK3 was lentivirally re-expressed (Hela-RIPK3 cells).

TABLE 2

| Compound UH15-X | Concentration (µM) | HeLa cells | | HeLa cells with RIPK3 | |
|---|---|---|---|---|---|
| | | Without hTNF | +10 ng/mL hTNF | Without hTNF | +10 ng/mL hTNF |
| | | Cell Viability (%) | | | |
| 6 | 10 | 102 ± 2 | 99 ± 5 | 69 ± 2 | 34 ± 10 |
| 6 | 5 | 103 ± 0.7 | 97 ± 5 | 92 ± 3 | 68 ± 5 |
| 18 | 20 | 92 ± 4 | 91 ± 0.8 | 96 ± 1 | 89 ± 3 |
| 18 | 5 | 99 ± 5 | 98 ± 0.8 | 103 ± 3 | 99 ± 0.7 |
| 28 | 20 | 89 ± 0.7 | 94 ± 4 | 86 ± 8 | 86 ± 4 |
| 28 | 5 | 107 ± 5 | 113 ± 0.8 | 100 ± 7 | 99 ± 2 |
| 37 | 20 | 85 ± 3 | 84 ± 2 | 94 ± 0.3 | 95 ± 1 |
| 37 | 5 | 99 ± 0.5 | 99 ± 5 | 109 ± 2 | 103 ± 2 |

Receptor Interacting Protein Kinase 2 (RIPK2) Enzyme Assay:

Recombinant RIPK2 protein (20 ng per reaction) is diluted in the reaction buffer consisting of 40 mM Tris (pH 7.5); 20 mM $MgCl_2$; 0.1 mg/mL BSA; 50 µM DTT. Diluted protein is added to low volume white 384 well plates (2 µL/well). Inhibitors are diluted in reaction buffer (final 25% DMSO), 1 µL is added to each well and incubated 5 mM at room temperature. Reactions are initiated by the addition of 2 µL of 100 µM ATP and 1 mg/mL RS repeat peptide (SignalChem) in the reaction buffer. Plates are sealed with plastic coverslips and incubated at room temperature for 2 h. Reactions are stopped by the addition of 5 µL of ADP-Glo reagent (Promega) and ADP generation reaction is performed for 40 min at room temperature. Luminescence signal is generated by the addition of 10 µL of Kinase detection reagent (Promega) for 30 mM at room temperature Luminescence signals are determined using appropriate luminescence plate-reader (typical integration time 0.3-1 sec). To calculate percent inhibition, average background signal is subtracted from test well and maximal signal wells. Inhibition, %=(1−(test signal/maximal signal))*100. The percent inhibition at a specified concentration is determined or $IC_{50}$ values are calculated based on a dose range of inhibitor concentrations using non-linear regression in GraphPad Prism software.

Activin-Like Kinase 2 (ALK2) Enzyme Assay:

Enzyme inhibitory activity was evaluated in a standard kinase enzyme assay by incubating human ALK2 with the protein substrate casein (1 mg/mL) and $\gamma$-$^{33}$ATP (10 µM) in the presence of various concentrations of test compounds (10 nM 100 µM). After 30 min the amount of $^{33}$P-casein was determined. A plot of inhibitor concentration verses % activity was constructed and from this plot an IC$_{50}$ value was determined.

NOD2 Signaling Assay:

HEK-Blue cells expressing human NOD2 and NFkB-SAEP reporter (Invivogen) are seeded into 96 well clear plates at 7.5×10$^3$ cells per well in 100 µL of DMEM media supplemented with 10% FBS and 1% antibiotic-antimycotic mix. Cells are allowed to attach for 48 h in 5% CO$_2$ tissue culture incubator at 37° C. On the morning of the experiment, media in the wells is replaced with 100 µL of HEK-Blue detection media (Invivogen). Cells are treated with the inhibitors, diluted in DMSO (0.5 µL per well) for 15 mM in 5% CO$_2$ tissue culture incubator at 37° C. After that, cells are stimulated by the addition of 1 ng/well L18-MDP (Invivogen). Cells are incubated in 5% CO$_2$ tissue culture incubator at 37° C. for 8 h and absorbance, corresponding to the SEAP in the media, is determined in Wallac3V plate reader (Perkin Elmer). Inhibition, %=(1−((sample signal-unstimulated and DMSO treated cells)/(L18−MDP stimulated and DMSO treated cells−unstimulated and DMSO treated cells)))*100. IC$_{50}$ values are calculated based on a dose range of inhibitor concentrations using non-linear regression in GraphPad Prism software.

Inhibition of RIPK2 and ALK2 Enzyme Activities and NOD2 Cellular Signaling by Compounds:

Prepared compounds were evaluated for their ability to inhibit RIPK2 and ALK2 enzyme activities and NOD2 cellular signaling using the methods described above. The percent inhibition at a specified concentration or IC$_{50}$ values for inhibition of RIPK2 enzyme and NOD2 cellular signaling by the compounds are shown in Table 3 below. IC$_{50}$ values for inhibition of ALK2 enzyme activity by the compounds are also shown in Table 3.

TABLE 3

| | EC$_{50}$ | | |
| --- | --- | --- | --- |
| | Enzyme (nM) | | HEK Blue (µM) |
| Compound | RIPK2 | ALK2 | RIPK2 |
| UH15_4 | 53% at 33 nM | 3.7 | 0.015 |
| UH15_6 | 32% at 33 nM | 17.8 | 0.008 |
| UH15_10 | 5.5 | 9 | 0.0028 |
| UH15_18 | 16.4 | NI | 0.183 |
| UH15_20 | 15.7 | ND | 0.484 |
| UH15_28 | ND | NI | 0.07 |
| UH15_37 | ND | 32300 | 0.05 |

REFERENCES

The following documents are incorporated herein by reference.

Pasparakis, M. & Vandenabeele, P. Necroptosis and its role in inflammation. Nature 517, 311-320 (2015).

Moriwaki, K. & Chan, F. K. RIP3: a molecular switch for necrosis and inflammation. Genes Dev 27, 1640-1649 (2013).

Moriwaki, K. & Chan, F. K. Necrosis-dependent and independent signaling of the RIP kinases in inflammation. Cytokine Growth Factor Rev 25, 167-174 (2014).

Vanden Berghe, T., Hassannia, B. & Vandenabeele, P. An outline of necrosome triggers. Cell Mol Life Sci 73, 2137-2152 (2016).

Li, J. et al. The RIP1/RIP3 necrosome forms a functional amyloid signaling complex required for programmed necrosis. Cell 150, 339-350 (2012).

Moquin, D. M., McQuade, T. & Chan, F. K. CYLD deubiquitinates RIP1 in the TNFalpha-induced necrosome to facilitate kinase activation and programmed necrosis. PLoS One 8, e76841 (2013).

Zhang, J., Yang, Y., He, W. & Sun, L. Necrosome core machinery: MLKL. Cell Mol Life Sci 73, 2153-2163 (2016).

Silke, J., Rickard, J. A. & Gerlic, M. The diverse role of RIP kinases in necroptosis and inflammation. Nat Immunol 16, 689-697 (2015).

Aaes, T. L. et al. Vaccination with Necroptotic Cancer Cells Induces Efficient Anti-tumor Immunity. Cell Rep 15, 274-287 (2016).

Kearney, C. J. & Martin, S. J. An Inflammatory Perspective on Necroptosis. Mol Cell 65, 965-973 (2017).

Nogusa, S. et al. RIPK3 Activates Parallel Pathways of MLKL-Driven Necroptosis and FADD-Mediated Apoptosis to Protect against Influenza A Virus. Cell Host Microbe 20, 13-24 (2016).

Mandal, P. et al. RIP3 induces apoptosis independent of pronecrotic kinase activity. Mol Cell 56, 481-495 (2014).

Lin, J. et al. A role of RIPS-mediated macrophage necrosis in atherosclerosis development. Cell Rep 3, 200-210 (2013).

Meng, L. et al. RIPS-dependent necrosis induced inflammation exacerbates atherosclerosis. Biochem Biophys Res Commun 473, 497-502 (2016).

Duprez, L. et al. RIP kinase-dependent necrosis drives lethal systemic inflammatory response syndrome. Immunity 35, 908-918 (2011).

Rodrigue-Gervais, I. G. et al. Cellular inhibitor of apoptosis protein cIAP2 protects against pulmonary tissue necrosis during influenza virus infection to promote host survival. Cell Host Microbe 15, 23-35 (2014).

Najjar, M. et al. RIPK1 and RIPK3 Kinases Promote Cell-Death-Independent Inflammation by Toll-like Receptor 4. Immunity 45, 46-59 (2016).

Saleh, D. et al. Kinase Activities of RIPK1 and RIPK3 Can Direct IFN-beta Synthesis Induced by Lipopolysaccharide. J Immunol (2017).

Vlantis, K. et al. NEMO Prevents RIP Kinase 1-Mediated Epithelial Cell Death and Chronic Intestinal Inflammation by NF-kappaB-Dependent and -Independent Functions. Immunity 44, 553-567 (2016).

Newton, K. et al. RIPK3 deficiency or catalytically inactive RIPK1 provides greater benefit than MLKL deficiency in mouse models of inflammation and tissue injury. Cell Death Differ 23, 1565-1576 (2016).

Meng, L., Jin, W. & Wang, X. RIPS-mediated necrotic cell death accelerates systematic inflammation and mortality. Proc Natl Acad Sci USA 112, 11007-11012 (2015).

Cougnoux, A. et al. Necroptosis in Niemann-Pick disease, type C1: a potential therapeutic target. Cell Death Dis 7, e2147 (2016).

Vitner, E. B. et al. RIPK3 as a potential therapeutic target for Gaucher's disease. Nat Med 20, 204-208 (2014).

Sarhan, J. et al. Constitutive interferon signaling maintains critical threshold of MLKL expression to license necroptosis. Cell Death Differ 26, 332-347 (2019).

Ofengeim, D. et al. Activation of necroptosis in multiple sclerosis. Cell Rep 10, 1836-1849 (2015).

Arrazola, M. S. & Court, F. A. Compartmentalized necroptosis activation in excitotoxicity-induced axonal degeneration: a novel mechanism implicated in neurodegenerative disease pathology. Neural Regen Res 14, 1385-1386 (2019).

Arrazola, M. S. et al. Axonal degeneration is mediated by necroptosis activation. J Neurosci (2019).

Yuan, J., Amin, P. & Ofengeim, D. Necroptosis and RIPK1-mediated neuroinflammation in CNS diseases. Nat Rev Neurosci 20, 19-33 (2019).

Linkermann, A. et al. Necroptosis in immunity and ischemia-reperfusion injury. Am J Transplant 13, 2797-2804 (2013).

Zhao, H. et al. Role of necroptosis in the pathogenesis of solid organ injury. Cell Death Dis 6, e1975 (2015).

What is claimed is:

1. A compound having a structure of:

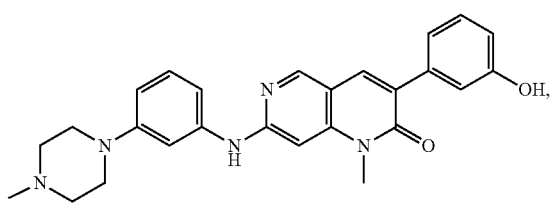 [SMILES: CN1CCN(c2cccc(Nc3cc4c(cn3)cc(-c3cccc(O)c3)c(=O)n4C)c2)CC1]

or pharmacologically acceptable salt thereof.

2. The compound according to claim 1.

3. A pharmaceutical composition comprising a therapeutically effective amount of the compound according to claim 1, or a pharmacologically acceptable salt thereof, and a pharmaceutically acceptable excipient, adjuvant, carrier, buffer, stabilizer, or mixture thereof.

4. The pharmaceutical composition of claim 3 comprising the therapeutically effective amount of

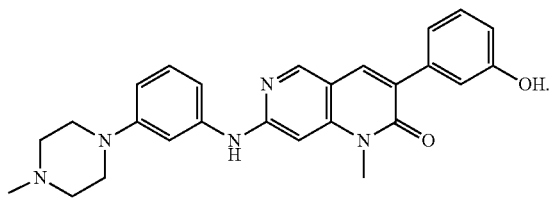 [SMILES: CN1CCN(c2cccc(Nc3cc4c(cn3)cc(-c3cccc(O)c3)c(=O)n4C)c2)CC1]

5. A method of treating an inflammatory disease or condition involving receptor interacting kinase 3 (RIPK3) inhibitory activity comprising administering the pharmaceutical composition according to claim 3, wherein the inflammatory disease or condition involving RIPK3 inhibitory activity is Influenza A virus (IAV) infection.

6. The method of claim 5, wherein the pharmaceutical composition comprises the therapeutically effective amount of

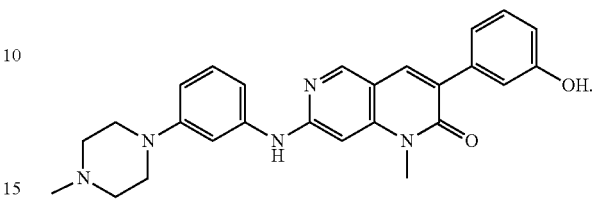

7. The method of claim 5, wherein the inflammatory or degenerative disease or condition involving RIPK3 activity is Influenza A virus (IAV) infection.

8. A method of treating a protein kinase related disease or condition comprising administering the pharmaceutical composition according to claim 3, wherein the protein kinase related disease or condition is Influenza A virus (IAV) infection.

9. The method of claim 8, wherein the pharmaceutical composition comprises the therapeutically effective amount of

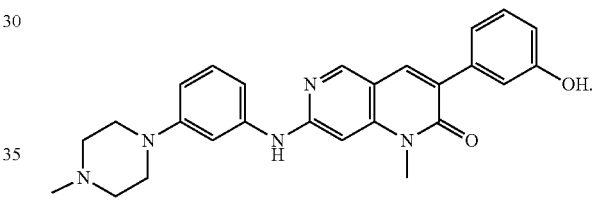

10. The method of claim 5, wherein the inflammatory disease or condition involving RIPK3 activity is IAV-induced respiratory distress syndrome (ARDS).

11. The method of claim 5, wherein the inflammatory disease or condition involving RIPK3 activity is IAV-induced viral pneumonia or bacterial pneumonia.

12. The method of claim 5, wherein the inflammatory disease or condition involving RIPK3 activity is IAV-induced necrotic lung injury.

13. The method of claim 5, wherein the inflammatory disease or condition involving RIPK3 activity is IAV-induced necroptosis.

* * * * *